United States Patent
Beck et al.

(10) Patent No.: US 10,347,937 B2
(45) Date of Patent: Jul. 9, 2019

(54) LITHIUM-STUFFED GARNET ELECTROLYTES WITH SECONDARY PHASE INCLUSIONS

(71) Applicant: QuantumScape Corporation, San Jose, CA (US)

(72) Inventors: Larry Beck, San Jose, CA (US); Cheng-Chieh Chao, San Jose, CA (US); Lei Cheng, San Jose, CA (US); Niall Donnelly, San Jose, CA (US); William H. Gardner, San Jose, CA (US); Tim Holme, San Jose, CA (US); Will Hudson, San Jose, CA (US); Sriram Iyer, San Jose, CA (US); Oleh Karpenko, San Jose, CA (US); Yang Li, San Jose, CA (US); Gengfu Xu, San Jose, CA (US)

(73) Assignee: QuantumScape Corporation, San Jose, CA (US)

( * ) Notice: Subject to any disclaimer, the term of this patent is extended or adjusted under 35 U.S.C. 154(b) by 0 days.

(21) Appl. No.: 15/631,884

(22) Filed: Jun. 23, 2017

(65) Prior Publication Data
US 2018/0375149 A1    Dec. 27, 2018

(51) Int. Cl.
  *H01M 2/00*       (2006.01)
  *H01M 10/0562*    (2010.01)
  (Continued)

(52) U.S. Cl.
  CPC ...... *H01M 10/0562* (2013.01); *C01G 25/006* (2013.01); *H01M 10/0525* (2013.01);
  (Continued)

(58) Field of Classification Search
  CPC ........................................... H01M 4/00
  See application file for complete search history.

(56) References Cited

U.S. PATENT DOCUMENTS

| 4,259,061 A | 3/1981 | Dubetsky |
| 4,340,436 A | 7/1982 | Dubetsky et al. |

(Continued)

FOREIGN PATENT DOCUMENTS

| CN | 1746757 | 3/2006 |
| CN | 101518164 | 8/2009 |

(Continued)

OTHER PUBLICATIONS

Djenadic et al. ("Nebulized spray pyrolysis of Al-doped Li7La3Zr2O12 solid electrolyte for battery applications" Solid State Ionics vol. 263, Oct. 2014, pp. 49-56).*

(Continued)

*Primary Examiner* — Jacob B Marks
(74) *Attorney, Agent, or Firm* — Squire Patton Boggs (US) LLP

(57) ABSTRACT

The instant disclosure sets forth multiphase lithium-stuffed garnet electrolytes having secondary phase inclusions, wherein these secondary phase inclusions are material(s) which is/are not a cubic phase lithium-stuffed garnet but which is/are entrapped or enclosed within a lithium-stuffed garnet. When the secondary phase inclusions described herein are included in a lithium-stuffed garnet at 30-0.1 volume %, the inclusions stabilize the multiphase matrix and allow for improved sintering of the lithium-stuffed garnet. The electrolytes described herein, which include lithium-stuffed garnet with secondary phase inclusions, have an improved sinterability and density compared to phase pure cubic lithium-stuffed garnet having the formula $Li_7La_3Zr_2O_{12}$.

30 Claims, 12 Drawing Sheets

(51) Int. Cl.
   *C01G 25/00*  (2006.01)
   *H01M 10/0585*  (2010.01)
   *H01M 10/0525*  (2010.01)

(52) U.S. Cl.
   CPC ..... *H01M 10/0585* (2013.01); *C01P 2006/40* (2013.01); *H01M 2300/0077* (2013.01)

(56) References Cited

U.S. PATENT DOCUMENTS

| | | |
|---|---|---|
| 4,492,783 A | 1/1985 | Tanaka et al. |
| 5,014,763 A | 5/1991 | Frank |
| 5,130,067 A | 7/1992 | Flaitz et al. |
| 5,256,242 A | 10/1993 | Imaeda et al. |
| 5,279,994 A | 1/1994 | Kerkar |
| 5,296,318 A | 3/1994 | Gozdz et al. |
| 5,456,000 A | 10/1995 | Gozdz et al. |
| 5,460,904 A | 10/1995 | Gozdz et al. |
| 5,620,637 A | 4/1997 | Kaga et al. |
| 5,874,162 A | 2/1999 | Bastian et al. |
| 5,922,493 A | 7/1999 | Humphrey, Jr. et al. |
| 6,277,524 B1 | 8/2001 | Kanno |
| 6,306,535 B1 | 10/2001 | Tomimatsu et al. |
| 6,322,923 B1 | 11/2001 | Spotnitz et al. |
| 6,447,712 B1 | 9/2002 | Dogan et al. |
| 6,656,641 B1 | 12/2003 | Kumar |
| 6,852,138 B1 | 2/2005 | Topsoe et al. |
| 6,863,862 B2 | 3/2005 | Rasouli et al. |
| 6,924,065 B2 | 8/2005 | Noh |
| 7,108,827 B1 | 9/2006 | Hata et al. |
| 7,736,810 B2 | 6/2010 | Noh |
| 7,794,557 B2 | 9/2010 | Hui et al. |
| 7,901,658 B2 | 3/2011 | Weppner et al. |
| 7,923,149 B2 | 4/2011 | Hwang et al. |
| 8,092,941 B2 | 1/2012 | Weppner et al. |
| 8,268,488 B2 | 9/2012 | Neudecker |
| 8,283,843 B2 | 10/2012 | Pan et al. |
| 8,309,258 B2 | 11/2012 | Kanamura et al. |
| 8,329,605 B2 | 12/2012 | Bernard-Granger et al. |
| 8,431,287 B2 | 4/2013 | Teramoto |
| 8,658,317 B2 | 2/2014 | Weppner et al. |
| 8,697,292 B2 | 4/2014 | Kanno et al. |
| 8,828,580 B2 | 9/2014 | Visco et al. |
| 8,865,355 B2 | 10/2014 | Iriyama et al. |
| 8,877,388 B1 | 11/2014 | Ihlefeld et al. |
| 8,940,446 B1 | 1/2015 | Holme et al. |
| 9,034,526 B2 | 5/2015 | Teshima et al. |
| 9,093,717 B2 | 7/2015 | Sakamoto et al. |
| 2002/0054419 A1 | 5/2002 | Beteille et al. |
| 2003/0049499 A1 | 3/2003 | Murakawa et al. |
| 2003/0072870 A1 | 4/2003 | Brandle et al. |
| 2003/0148179 A1 | 8/2003 | Uyama et al. |
| 2004/0191617 A1 | 9/2004 | Visco et al. |
| 2005/0016839 A1 | 1/2005 | Horne et al. |
| 2006/0197245 A1 | 9/2006 | Cheng et al. |
| 2007/0015061 A1 | 1/2007 | Klaassen |
| 2007/0148553 A1 | 6/2007 | Weppner et al. |
| 2007/0231704 A1 | 10/2007 | Inda |
| 2008/0145751 A1 | 6/2008 | Ogumi et al. |
| 2009/0162755 A1 | 6/2009 | Neudecker |
| 2009/0194222 A1 | 8/2009 | Teramoto |
| 2009/0197172 A1 | 8/2009 | Inda |
| 2009/0226790 A1 | 9/2009 | Kanamura et al. |
| 2009/0301769 A1 | 12/2009 | Seppa et al. |
| 2009/0311567 A1 | 12/2009 | Visco et al. |
| 2009/0317724 A1 | 12/2009 | Kumar et al. |
| 2010/0047696 A1 | 2/2010 | Yoshida et al. |
| 2010/0203383 A1 | 8/2010 | Weppner et al. |
| 2011/0045355 A1 | 2/2011 | Ichikawa et al. |
| 2011/0052972 A1 | 3/2011 | Sohn |
| 2011/0053000 A1 | 3/2011 | Kanamura et al. |
| 2011/0053001 A1 | 3/2011 | Babic et al. |
| 2011/0053002 A1 | 3/2011 | Yamamura et al. |
| 2011/0133136 A1 | 6/2011 | Weppner et al. |
| 2011/0223487 A1 | 9/2011 | Johnson et al. |
| 2011/0244337 A1 | 10/2011 | Ohta et al. |
| 2011/0262796 A1 | 10/2011 | Shimooka et al. |
| 2011/0281175 A1 | 11/2011 | Hudson et al. |
| 2012/0196189 A1 | 8/2012 | Babic et al. |
| 2012/0237834 A1 | 9/2012 | Ogasa |
| 2012/0276439 A1 | 11/2012 | Fujita et al. |
| 2013/0085055 A1 | 4/2013 | Raj et al. |
| 2013/0122380 A1 | 5/2013 | Visco et al. |
| 2013/0148179 A1 | 6/2013 | Fridental et al. |
| 2013/0177811 A1 | 7/2013 | Roffat et al. |
| 2013/0189562 A1 | 7/2013 | Dolle et al. |
| 2013/0216783 A1 | 8/2013 | Duan et al. |
| 2013/0230778 A1 | 9/2013 | Saimen et al. |
| 2013/0260257 A1 | 10/2013 | Choi |
| 2013/0288875 A1 | 10/2013 | Miyagawa et al. |
| 2013/0344416 A1 | 12/2013 | Sakamoto et al. |
| 2014/0057153 A1 | 2/2014 | Visco et al. |
| 2014/0060723 A1 | 3/2014 | Herle et al. |
| 2014/0072870 A1 | 3/2014 | Otsuka et al. |
| 2014/0093785 A1 | 4/2014 | Sugiura et al. |
| 2014/0099538 A1 | 4/2014 | Johnson et al. |
| 2014/0120409 A1 | 5/2014 | Ouchi et al. |
| 2014/0120421 A1 | 5/2014 | Ouchi et al. |
| 2014/0134483 A1 | 5/2014 | Ouchi et al. |
| 2014/0162113 A1 | 6/2014 | Ohta et al. |
| 2014/0170504 A1 | 6/2014 | Baek et al. |
| 2014/0186720 A1 | 7/2014 | Kintaka |
| 2014/0193695 A1 | 7/2014 | Hoshina et al. |
| 2014/0205910 A1 | 7/2014 | Weppner et al. |
| 2014/0287305 A1 | 9/2014 | Wachsman et al. |
| 2014/0295287 A1 | 10/2014 | Eisele et al. |
| 2014/0377665 A1 | 12/2014 | Yoshida et al. |
| 2015/0015542 A1 | 1/2015 | Hou |
| 2015/0024292 A1 | 1/2015 | Yamada et al. |
| 2015/0037688 A1 | 2/2015 | Otsuka et al. |
| 2015/0044576 A1 | 2/2015 | Eisele et al. |
| 2015/0056520 A1 | 2/2015 | Thokchom et al. |
| 2015/0099188 A1 | 4/2015 | Holme et al. |
| 2015/0099190 A1 | 4/2015 | Holme et al. |
| 2015/0130115 A1 | 5/2015 | Sung et al. |
| 2015/0180001 A1 | 6/2015 | Johnson et al. |
| 2015/0200420 A1 | 7/2015 | Holme et al. |
| 2015/0243974 A1 | 8/2015 | Holme et al. |
| 2015/0295274 A1 | 10/2015 | Engel et al. |
| 2015/0333307 A1 | 11/2015 | Thokchom et al. |
| 2016/0056500 A1 | 2/2016 | Holme et al. |
| 2016/0087321 A1 | 3/2016 | Wöhrle et al. |
| 2016/0111751 A1 | 4/2016 | Badding et al. |
| 2016/0149260 A1 | 5/2016 | Badding et al. |
| 2016/0190639 A1 | 6/2016 | Sung et al. |
| 2016/0204466 A1 | 7/2016 | Nogami et al. |
| 2016/0211547 A1 | 7/2016 | Hwang et al. |
| 2016/0240887 A1 | 8/2016 | Hatta et al. |
| 2016/0244665 A1 | 8/2016 | Vosgroene et al. |
| 2016/0293988 A1 | 10/2016 | Sakamoto et al. |
| 2016/0308243 A1 | 10/2016 | Herle et al. |
| 2016/0308244 A1 | 10/2016 | Badding et al. |
| 2017/0005367 A1 | 1/2017 | Van Berkel et al. |
| 2017/0054139 A1 | 2/2017 | Kerkamm |
| 2017/0162901 A1 | 6/2017 | Chen et al. |
| 2017/0214048 A1 | 7/2017 | Qian et al. |

FOREIGN PATENT DOCUMENTS

| | | |
|---|---|---|
| CN | 102010183 | 4/2011 |
| CN | 102280659 A | 12/2011 |
| CN | 103117413 | 5/2013 |
| JP | 2000-128629 | 5/2000 |
| JP | 2004-63261 | 2/2004 |
| JP | 2006-8488 | 1/2006 |
| JP | 2012-224520 | 11/2012 |
| JP | 2012-243743 | 12/2012 |
| JP | 2013-107779 A | 6/2013 |
| JP | 2013-134852 | 7/2013 |
| JP | 2013-214421 | 10/2013 |
| JP | 2015-130481 A | 7/2015 |
| JP | 2015-215998 | 12/2015 |
| WO | WO 2011/038773 | 4/2011 |
| WO | WO 2012/114175 | 8/2012 |
| WO | WO 2013/010692 | 1/2013 |

(56) References Cited

FOREIGN PATENT DOCUMENTS

| WO | WO 2013/128769 | 9/2013 |
|---|---|---|
| WO | WO 2015/054320 | 4/2015 |
| WO | WO 2015/076944 | 5/2015 |
| WO | WO 2016/069749 | 5/2016 |
| WO | WO 2017/197406 A1 | 11/2017 |
| WO | WO 2018/075972 A1 | 4/2018 |

OTHER PUBLICATIONS

Ahmad et al., "Concentration and mobility of mobile $Li^+$ ions in $Li_6BaLa_2Ta_2O_{12}$ and $Li_5La_3Ta_2O_{12}$ garnet lithium ion conductors," J Mater Sci: Mater Electron, 2015, 7 pages.
Ahmad, Mohamad M., "Lithium ionic conduction and relaxation dynamics of spark plasma sintered $Li_5La_3Ta_2O_{12}$ nanoceramics," Nanoscale Research Letters, 2015, http://dx.doi.org10.1186/s11671-015-0777-7, 24 pages.
Ahn et al., "Local impedance spectroscopic and microstructural analyses of Al-in-diffused $Li_7La_3Zr_2O_{12}$," Journal of Power Sources, 2014, vol. 254, pp. 287-292.
Allen et al., "Effect of substitution (Ta, Al, Ga) on the conductivity of $Li_7La_3Zr_2O_{12}$", issued on Journal of Power Sources 2012, vol. 206, pp. 315-319.
Aleman et al., "Definitions of Terms Relating to the Structure and Processing of Sols, Gels, Networks, and Inorganic-Organic Hybrid Materials", Pure Appl. Chem., 2007, vol. 79, No. 10, pp. 1801-1829.
Baek et al., "Garnet related lithium ion conductor processed by spark plasma sintering for all solid state batteries," Journal of Power Sources, 2014, vol. 249, pp. 197-206.
Bernuy-Lopez et al., "Atmosphere Controlled Processing of Ga-Substituted Garnets for High Li-Ion Conductivity Ceramics," Chem. Mater. 2014, vol. 26, pp. 3610-3617.
Bonderer et al., "Free-Standing Ultrathin Ceramic Foils," Journal of the American Ceramic Society, 2010, vol. 93, No. 11, pp. 3624-3631.
Bruce et al.,"$Li-O_2$ and Li—S batteries with high energy storage", Nature Materials, Jan. 2012, vol. 11, pp. 19-29.
Buschmann et al. "Lithium metal electrode kinetics and ionic conductivity of the solid lithium ion conductors $Li_7La_3Zr_2O_{12}$ and $Li_7La_3Zr_2Ta_xO_{12}$ with garnet-type strucutre," Journal of Power Sources, 2012, vol. 206, pp. 236-244.
Buschmann et al., "Structure and dynamics of the fast lithium ion conductor :$Li_7La_3Zr_2O_{12}$," Phys. Chem. Chem. Phys., 2011, vol. 13, pp. 19378-19392.
Cao et al., "Effect of Sb—Ba codoping on the ionic conductivity of $Li_7La_3Zr_2O_{12}$ ceramic," Ceramics International, 2015, http://dx.doi.org/10.1016/j.ceramint.2015.01.030, pp. 1-5.
Chen et al., "Origin of High Li+ Conduction in Doped $Li_7La_3Zr_2O_{12}$ Garnets," Chemistry of Materials, 2015, vol. 27, pp. 5491-5494.
Cheng et al., "Effect of Surface Microstructure on Electrochemical Performance of Garnet Solid Electrolytes," ACS Appl. Mater. Interfaces, 2015, vol. 7, pp. 2073-2081.
Cheng et al., "Interrelationships among Grain Size, Surface Composition Air Stability, and Interfacial Resistance of Al-Substitued $Li_7La_3Zr_2O_{12}$ Solid Electrolytes," ACS Appl. Mater. Interfaces, 2015, vol. 7, pp. 17649-17655.
Cheng et al., "The origin of high electrolyte-electrode interfacial resistances in lithium cells containing garnet type solid electrolytes," Phys. Chem. Chem. Phys., 2014, 7 pages.
Cheng, Lei, et al., "Effect of microstructure and surface impurity segregation on the electrical and electrochemical properties of dense Al-substituted $Li_7La_3Zr_2O_{12}$," J. Mater. Chem., 2014, 10 pages.
David et al., "Microstructure and Li-Ion Conductivity of Hot-Pressed Cubic $Li_7La_3Zr_2O_{12}$," J. Am. Cerami. Soc., 2015, pp. 1-16.
Deng et al., "Effect of the morphology of Li—La—Zr—O Solid electrolyte coating on the electrochemical performance of spinel $LiMn_{1.95}Ni_{0.05}O_{3.98}F_{0.02}$ cathode materials," J. Mater. Chem. A, 2014, vol. 2, pp. 18889-18897.
Dhivya et al., "Effect Simultaneous Substitution of Y and Ta on the Stabilization of Cubic Phase, Microstructure, and $Li^+$ Conductivity of of $Li_7La_3Zr_2O_{12}$ Lithium Garnet," ACS Appl. Mater. Interfaces, 2014, vol. 6, pp. 17606-17615.
Dhivya et al., "$Li^+$ transport properties of W substituted $Li_7La_3Zr_2O_{12}$ cubic lithium garnets," AIP Advances, 2013, vol. 3, No. 082115, 22 pages.
Djenadic, Ruzica et al., "Nebulized spray pyrolysis of Al-doped $Li_7La_3Zr_2O_{12}$ solid electrolyte for battery applications," Solid State Ionics, 2014, vol. 263, pp. 49-56.
Dong et al., "Electrochemical perofmrance and lithium-ion insertion/extraction mechanism studies of the novel $Li_2ZrO_3$ anode materials," Electrochimica Acta, 2015, vol. 161, pp. 219-225.
Duvel, Andre, et al., "Mechanosynthesis of Solid Electrolytes: Preparation, Characterization, and Li Ion Transport Properties of Garnet-Type Al-Doped $Li_7La_3Zr_2O_{12}$ Crystallizing with Cubic Symmetry," The Journal of Physical Chemistry, 2012, vol. 116, pp. 15192-15202.
Office Action of Chinese application No. 201480055387.9 dated Dec. 22, 2016 together with English translation; 7 pages.
Office Action of Chinese application No. 201480055386.4 dated Jan. 4, 2017 together with English translation; 9 pages.
Second Office Action of with English translation, Chinese Application No. 201480055386.4 dated Nov. 1, 2017 dtogether with English translation, 10 pages.
Office Action of Japanese application No. 2016-520586 dated Nov. 28, 2017 together with English translation; 8 pages.
Extended European Search Report dated Feb. 22, 2017 for European application No. 14864783.7; 9 pages.
Fries, R. et al., "Fabrication and properties of an anisotropic PZT/Polymer 0-3 composite," J. Mater. Sci.: Mater. in Electronics, 1994, vol. 5, pp. 238-243.
Geiger, Charles, A., et al., "Crystal Chemistry and Stability of "$Li_7La_3Zr_2O_2$" Garnet: A Fast Lithium-Ion Conductor," Inorganic Chemistry, 2011, vol. 50, pp. 1089-1097.
Goodenough, John, B., "Solid Electrolytes for Next Generation Batteries," Texas Materials Institute, The University of Texas at Austin, May 14-18, 2012, DOE Vehicle Technologies Annual Merit Review Meeting, 18 pages.
Gu et al., "Effects of penta-and trivalent dopants on structures and conductivity $Li_7La_3Zr_2O_{12}$," Solid State Ionics, 2015, vol. 274, pp. 100-105.
Han et a., "Experimental visualization of lithium conduction pathways in garnet-type $Li_7La_3Zr_2O_{12}$," Chem. Commun., 2012, vol. 48, pp. 9840-9842.
Hayashi et al., "New Phases in $La_2O_3-Li_2O-Ta_2O_5$ System," Mat. Res. Bull. 1986, vol. 21, No. 3, pp. 289-293.
Herrmann et al., "Micro-segregation in liquid phase sintered silicon carbide ceramics," Journal of the European Ceramic Society, 2010, vol. 30, pp. 1495-1501.
Hitz et al., "Highly Li-Stuffed Garnet-Type $Li_{7+x}La_3Zr_{2-x}Y_xO_{12}$," Journal of the Electrochemical Society, 2013, vol. 160, No. 8, pp. A1248-A1255.
Hyooma et al.,"Crystal Structures of $La_3Li_5M_2O_{12}$ (M=Nb, Ta)," Mat. Res. Bull. 1988, vol. 23, No. 10, pp. 1399-1407.
International Search Report and Written Opinion dated Apr. 15, 2016 in PCT/US2016/015209, 14 pages.
International Search Report and Written Opinion dated Dec. 1, 2016 in PCT/US2016/043428, 11 pages.
International Search Report and Written Opinion dated Mar. 10, 2015 in PCT/US2014/059578, 15 pages.
International Search Report and Written Opinion dated Mar. 23, 2015 in PCT/US2014/059575, 16 pages.
Ishiguro et al., "Stability of Nb-Doped Cubic $Li_7La_3Zr_2O_2$ with Lithium Metal," Journal of the Electrochemical Society, 2013, vol. 160, No. 10, pp. A1690-A1693.
Ito, Seitaro et al., "A rocking chair type all-solid-state lithium ion battery adopting $Li_2O-ZrO_2$ $LiNi_{0.8}Co_{0.15}Al_{0.05}O_2$ and a sulfide based electrolyte," Journal of Power Sources, 248, 2014, pp. 943-950.
Jalem et al., "Effects of Gallium doping in Garnet-Type $Li_7La_3Zr_2O_{12}$ Solid Electrolytes," DOI: 10.1021/cm5045122, Chem. Mater., XXXX, XXX, XXX-XXX, pp. A-K (11 pages).

(56) References Cited

OTHER PUBLICATIONS

Jalem et al., "Insights into the Lithium-Ion Conduction Mechanism of Garnet-Type Cubic $Li_5La_3Ta_2O_{12}$ by ab-Initio Calculations," J. Phys. Chem. C 2015, vol. 119, pp. 20783-20791.
Janani et al., "Influence of sintering additives on densification and $Li^+$ conductivity of Al doped $Li_7La_3Zr_2O_{12}$ lithium garnet," RSC Adv. 2014, vol. 4, pp. 51228-51238.
Janani et al., "Optimization of Lithium Content and Sintering Aid for Maximized Li+ Conductivity and Density in Ta-Doped $Li_7La_3Zr_2O_{12}$," J. Am. Ceram. Soc., 2015, pp. 1-8; DOI: 10.1111/jace.13578.
Jin et al., "Al-doped $Li_7La_3Zr_2O_2$ synthesized by a polymerized complex method," Journal of Power Sources, 2011, vol. 196, pp. 8683-8687.
Jung et al., "Ceramic separators based on Lip-conducting inorganic electrolyte for high-performance lithium-ion batteries with enhanced safety," Journal of Power Sources, 2015, vol. 293, pp. 675-683.
Kang et al., "First-Principles Study of Chemical Stability of Lithium Oxide Garnets $Li_7La_3M_2O_{12}$ (M=Zr, Sn, or Hf)," The Journal of Physical Chemistry C, 2014, vol. 118, pp. 17402-17406.
Kato et al., "Preparation of thick-film electrode-solid electrolyte composites on $Li_7La_3Zr_2O_{12}$ and their electrochemical properties," Journal of Power Sources, 303, 2016, pp. 65-72.
Katsui et al., "Preparation of cubic and tetragonal $Li_7La_3Zr_2O_{12}$ flim by metal organic chemical vapor deposition," Thin Solid Films, vol. 584, Jun. 2015, pp. 130-134.
Kc et al., "Point defects in garnet-type solid electrolyte (c-$Li_7La_3Zr_2O_{12}$) for Li-ion batteries," Solid State Ionics, 2014, vol. 261, pp. 100-105.
Kerman et al. "Review—Practical Challenges Hindering the Development of Solid State Li Ion Batteries", Journal of the Electrochemical Society, 2017, vol. 164. No. 7, pp. A1731-A1744.
Kihira et al., "Effect of Simultaneous Substitution of Alkali Metals and Nb in $Li_7La_3Zr_2O_{12}$ on Lithium-Ion Conductivity," ECS Electrochemistry Letters, 2013, vol. 2, No. 7, pp. A56-A59.
Kim et al., "Characterization of the interface between $LiCoO_2$ and $Li_7La_3Zr_2O_{12}$ in an all-solid-state rechargeable lithium battery," Journal of Power Sources, 196, 2011, pp. 764-767.
Kim et al., "The Effect of Relative Density on the Mechanical Properties of Hot-Pressed Cubic $Li_7La_3Zr_2O_{12}$," J. Am. Ceram. Soc., 2016, pp. 1-8.
Klenk et al., "Local structure and dyanmics of lithium garnet ionic conductors: tetragonal and cubic $Li_7La_3Zr_2O_7$," Phys. Chem. Chem. Phys., 2015, 11 pages.
Kokal et al., "Preparation and characterization of three dimensionally ordered macroporous $Li_5La_3Ta_2O_{12}$ by colloidal crystal templating for all-solid-state lithium-ion batteries," Ceramics International, 2015, vol. 41, pp. 737-741.
Kokal et al., "Sol-gel synthesis and lithium ion conductivity of $Li_7La_3Zr_2O_{12}$ with garnet-related type structure," Solid State Ionics, 2011, vol. 185, pp. 42-46.
Kong et al., "Transparent Ceramics, Topics in Mining," Springer International Publishing Switzerland, 2015, pp. 29-91.
Kotobuki et al., "Compatibility of $Li_7La_3Zr_2O_{12}$ Solid Electrolyte to All-Solid-State Battery Using Li Metal Anode," *Journal of the Electrochemical Society*, 2010, vol. 157, No. 10, pp. A1076-A1079.
Kotobuki et al., "Preparation of Sintered $Li_5La_3Nb_2O_{12}$ Garnet-type Li Ion Conductor via Spark Plasma Sintering Synthesis," Int. J. Electroact. Mater. 2014, vol. 2, pp. 17-21.
Kotobuki et al., "Fabrication of all-solid-state lithium battery with lithium metal anode using $Al_2O_3$-added $Li_7La_3Zr_2O_{12}$ solid electrolyte," Journal of Power Sources, 196, 2011, pp. 7750-7754.
Lai et al., "Ultrahigh-Energy-Density Microbatteries Enabled by New Electrode Architecture and Micropackaging Design," Adv. Mater. 2010, vol. 22, E139-E144.
Lallemant et al., "Transparent polycrystalline alumina obtained by SPS: Green bodies processing effect," Journal of the European Ceramic Society, 2012, vol. 32, pp. 2909-2915.
Langer et al., "Syntheis of single phase cubic Al-substituted $Li_7La_3Zr_2O_{12}$ by solid state lithiation of mixed hydroxides,"Journal of Alloys and Compounds, 2015, vol. 645, pp. 64-69.
Lau et al., "Density Functional Investigation of the Thermodynamic Stability of Lithium Oxide Bulk Crystalline Structures as a Function of Oxygen Pressure", issued on J. Phys. Chem. C XXXX, XXX, 000-000, 9 pages.
Lee et al., "High lithium ion conductivity of $Li_2La_3Zr_2O_{12}$ synthesized by solid state reaction," Solid State Ionics, 2014, vol. 258, pp. 13-17.
Li et al., "Optimizing Li conductivity in a garnet framework," J. Mater. Chem., 2012, vol. 22, pp. 15357-15361.
Li et al., "The reaction of $Li_{6.5}La_3Zr_{1.5}Ta_{0.5}O_{12}$ with water," Solid State Ionics, 2015, vol. 269, pp. 57-61.
Li et al., "W-Doped $Li_7La_3Zr_2O_{12}$ Ceramic Electrolytes for Solid State Li-ion Batteries," Electrochimica Acta, 2015, vol. 180, pp. 37-42.
Liu et al., "High Ion Conductivity in Garnet-type F-doped $Li_7La_3Zr_2O_{12}$," Journal of Inorganic Materials, Sep. 2015, vol. 30, No. 9, pp. 995-1001.
Liu et al., "Reversible ion exchange and structural stability of garnet-type Nb-doped $Li_7La_3Zr_2O_{12}$ in water for applications in lithium batteries," Journal of Power Sources, 2015, vol. 282, pp. 286-293.
Liu et al., "Achieving high capacity in bulk-type solid-state lithium ion battery based on $Li_{6.75}La_3Zr_{Ta0.25}O_{12}$ electrolyte: Interfacial resistance," Journal of Power Sources, 2016, vol. 324, pp. 349-357.
Matsuda et al., "Phase formation of a garnet-type lithium-ion conductor $Li_{7-3x}Al_xLa_3Zr_2O_{12}$," Solid State Ionics, 2015, vol. 277, pp. 23-29.
Matsui et al., "Phase stability of a garnet-type lithium ion conductor $Li_7La_3Zr_2O_{12}$," Dalton Transactions, 2014, vol. 43, pp. 1019-1024.
Matsui et al., "Phase transformation of the garnet structured lithium ion conductor: $Li_7La_3Zr_2O_{12}$,", Solid State Ionics, 2014, 262, pp. 155-159.
McCloskey et al., On the Mechanism of Nonaqueous $Li-O_2$ Electrochemistry on C and Its Kinetic Overpotentials: Some Implications for Li-Air Batteries, issued on "J. Phys. Chem. C XXXX, XXX, XXX-XXX," 9 pages.
Miara et al., "Effect of Rb and Ta Doping on the Ionic Conductivity and Stability of the Garnet $Li_{7+2x-y}(La_{3-x}Rb_x)(Zr_{2-y}Ta_y)O_{12}$ ($0 \leq x \leq 0.375$, $0 \leq y \leq 1$) Superionic Conductor: A First Principles Investigation," Chem. Mater. 2013, vol. 25, pp. 3048-3055.
Miara et al., "First-Principles Studies on Cation Dopants and Electrolyte|Cathode Interphases for Lithium Garnets," Chemestry of Materials, 2015, vol. 27, pp. 4040-4047.
Mitterdorfer et al., "Fabrication of thin electrolytes for second-generation solid oxide fuel cells," Solid State Ionics, 2000, vol. 131, pp. 79-96.
Miyauchi et al., "New Amorphous Thin Films of Lithium Ion Conductive Solid Electrolyte," Solid State Ionics 9 & 10, 1983, pp. 1469-1472.
Mizuno et al., "Environmentally Friendly Flux Growth of High-Quality, Idiomorphic $Li_5La_3Nb_2O_{12}$ Crystals," Cryst. Growth Des., 2013, vol. 13, pp. 479-484.
Moshkovich et al., "The study of the anodic stability of alkyl carbonate solutions by in situ FTIR spectroscopy, EQCM, NMR and MS," Journal of Electroanalytical Chemistry, 2001, vol. 497, pp. 84-96.
Mukhopadhyay et al., "Structure and Stoichiometry in Supervalent Doped $Li_7La_3Zr_2O_{12}$," Chem. Mater., 2015, vol. 27, pp. 3658-3665.
Murugan et al., "Schnelle Lithiumionenleitung in granatartigem $Li_7La_3Zr_2O_{12}$", issued on Angew. Chem. 2007, vol. pp. 7925-7928.
Murugan et al., "Fast Lithium Ion Conduction in Garnet-Type $Li_7La_3Zr_2O_{12}$," Angew. Chem. Int. Ed., 2007, 46, pp. 7778-7781.
Narayanan et al., "Dopant Concentration-Porosity-Li-Ion Conductivity Relationship in Garnet-Type $Li_{5+2x}La_3Ta_{2-x}Y_xO_{12}$ ($0.05 \leq x \leq 0.75$) and Their Stability in Water and 1 M LiCl," Inorg. Chem., XXXX, XXX, XXX-XXX, 10 pages.
Nemori et al., "Stability of garnet-type solid electrolyte $Li_xLa_3A_{2-y}B_yO_{12}$ (A=Nb or Ta, B=Sc or Zr)," Solid State Ionics, 2015, vol. 282, pp. 7-12.
Neudecker et al., "'Lithium-Free' Thin-Film Battery with in Situ Plated Li Anode," Journal of the Electrochemical Society, vol. 147 No. 2, 2000, pp. 517-523.

(56) References Cited

OTHER PUBLICATIONS

Ni et al., "Room temperature elastic moduli and Vickers hardness of hot-pressed LLZO cubic garnet," J. Mater. Sci., 2012, vol. 47, pp. 7979-7985.

Nyman et al., "Alternative Approach to Increasing Li Mobility in Li—La—Nb/Ta Garnet Electrolytes," Chem. Mater., 2010, vol. 22, No. 19, pp. 5401-5410.

Office Action dated May 8, 2015 in U.S. Appl. No. 14/531,929, 12 pages.

Ohta et al., "Co-sinterable lithium garnet-type oxide electrolyte with cathode for all-solid-state lithium ion battery," Journal of Power Sources, 2014, vol. 265, pp. 40-44.

Ohta et al., "High lithium ionic conductivity in the garnet-type oxide $Li_{7-x}La_3(Zr_{2-x}, Nb_x)O_{12}(X=0-2)$," Journal of Power Sources, 2011, vol. 196, pp. 3342-3345.

Ohta et al., "All-solid-state lithium ion battery using garnet-type oxide and Li3BO3 solid electrolytes fabricated by screen-printing," Journal of Power Sources, vol. 238, 2013, pp. 53-56.

Ohta et al., "Electrochemical performance of an all-solid-state lithium ion battery with garnet-type oxide electrolyte," Journal of Power Sources, vol. 202, 2012, pp. 332-335.

Onodera et al., "Flux Growth of Idiomorphic Garnet-Type Solid Electrolyte Crystals for All-Solid-State Lithium-Ion Rechargeable Batteries," 2012, The Electrochemical Society, Abstract #1198, 1 page.

Park et al., "Effects Films, crystallinityo and impurities on the electrical conductivity of Li—La—Zr—O thin films," Thin Solid Films, 2015, vol. 576, pp. 55-60.

Peng et al., "A Reversible and Higher-Rate Li—O2 Battery", issued on http://www.sciencemag.org/content/early/recent / 19 July 2012 / Page 1 / 10.1126/science.1223985, 6 pages.

Puech et al., "Elaboration and characterization of a free standing LiSICON membrane for aqueous lithiumeair battery," Journal of Power Sources, vol. 214, 2012, pp. 330-336.

Ramakumar et al., "Structure and Li+ dyanmics of Sb-doped $Li_7La_3Zr_2O_{12}$ fast lithium ion conductors," Phys. Chem. Chem. Phys. 2013, vol. 15, pp. 11327-11338.

Ramzy et al., "Tailor-Made Development of Fast Li Ion Conducting Garnet-Like Solid Electrolytes," American Chemical Society, Applied Materials and Interfaces, 2010, vol. 2, No. 2, pp. 385-390.

Rangasamy et al., "A High Conducting Oxide—Sulfide Composite Lithium Superionic Conductor," J. Mater. Chem. A, published 2014, vol. 2, pp. 4111-14116.

Rangasamy, E., et al., "The effect of 24c-site (A) cation substitution on the tetragonal-cubic phase transition in $Li_{7-x}La_{3-x}A_xZr_2O_{12}$ garnet-based ceramic electrolyte," Journal of Power Sources, 2013, vol. 230, pp. 261-266.

Rangasamy, E., et al., "The role of Al and Li concentration on the formation of cubic garnet solid electrolyte of nominal composition $Li_7La_3Zr_2O_{12}$," Solid State Ionics, 2012, vol. 206, pp. 28-32.

Rao, R. Prasada et al., "In Situ Neutron Diffraction Monitoring of $Li_7La_3Zr_2O_{12}$ Formation: Toward a Rational Synthesis of Garnet Solid Electrolytes," Chem. Mater. XXXX, XXX, XXX-XXX, 8 pages.

Raskovalov et al, "Structure and transport properties of $Ll_7La_3Zr_{2-075x}Al_xO_{12}$ supersonic solid electrolytes," Journal of Power Sources, 2013, vol. 238, pp. 48-52.

Reed, James S., Principles of Ceramics Processing, 2nd Edition, John Wiley & Sons, Inc., New York, pp. 60-61.

Reinacher et al., "Preparation an electrical properties of garnet-type $Li_6BaLa_2Ta_2O_{12}$ lithium solid electrolyte thin films prepared by pulsed laser deposition," Solid State Ionics, 2014, vol. 258, pp. 1-7.

Ren et al., "Direct observation of lithium dendrites inside garnet-type lithium-ion solid electrolyte," Electrochemistry Communications, 2015, vol. 57, pp. 27-30.

Ren et al., "Effects of Li source microstructure and ionic conductivity of Al-contained $Li_{6.75}La_3Zr_{1.75}Ta_{0.25}O_{12}$ cermics," Journal ofthe European Ceramic Society, 2015, vol. 35, pp. 561-572.

Rettenwander et al., "Site Occupation of Ga and Al in Stabilized Cubic $Li_{7-3(x+y)}Ga_xAl_yLa_3Zr_2O_{12}$ Garnets As Deduced from $^{27}Al$ and $^{71}Ga$ MAS NMR at Ultrahigh Magnetic Fields," Chemistry of Materials, 2015, vol. 27, pp. 3135-3142.

Rettenwander et al., "Synthesis, Crystal Chemistry, and Electrochemical Properties of $Li_{7-2x}La_3Zr_{2-x}Mo_xO_{12}$ (x=0.1-0.4): Stabilization of the Cubic Garnet Polymorph via Substitution of $Zr^{4+}$ by $Mo^{6+}$," Inorganic Chemistry, 2015, vol. 54, pp. 10440-10449.

Rettenwander et al., "DFT study of the role of $Al^{3+}$ in the fast ion-conductor $Li_{7-3x}Al^{3+}{}_xLa_3Zr_2O_{12}$ Garnet," Chem. Mater. 2014, vol. 26, pp. 2617-2623.

Rosero-Navarro et al., "Preparation of $Li_7La_3(Zr_{2-x}, Nb_x)O12$ (x=0-1.5) and $Li_3BO_3/LiBO_2$ composites at low temperatures using a sol-gel process," Solid State Ionics, 2015, http://dx.doi.org/10.1016/j.ssi.2015.06.015, 7 pages.

Sakamoto, Jeff, "Garnet-based ceramic electrolyte: Enabling Li metal anodes and solid state batteries," Beyond Lithium Ion VI, Jun. 4-6, 2013, Boulder, CO., 36 pages.

Satyanarayana et al., "Structure and Li+ dynamics of Sb-doped $Li_7La_3Zr_2O_{12}$ fast lithium ion conductors", Phys. Chem. Chem. Phys., 2013, vol. 15, pp. 11327-11338.

Sharafi et al., Characterizing the $Li-Li_7La_3Zr_2O_{12}$ interface stability and kinetics as a function of temperature and current density, Journal of Power Sources, 2016, vol. 302, pp. 135-139.

Shimonishi et al., "Synthesis of garnet-type $Li_{7-x}La_3Zr_2O_{12-1/2x}$ and its stability in aqueous solutions," Solid State Ionics, 2011, vol. 183, pp. 48-53.

Shin et al., "Synergistic multi-doping effects on $Li_7La_3Zr_2O_{12}$ solid electrolyte for fast lithium ion conduction," Scientific Reports, 2015, pp. 1-9.

Song et al., "Crystal structure, migration mechanism and electrochemical performance of Cr-stabilized garnet," 2014, vol. 268, pp. 135-139.

Suárez et al., "Sintering to Transparency of Polycrystalline Ceramic Materials," Mar. 2, 2012, pp. 527-553: http://www.intechopen.com/books/sintering-of-ceramics-new-emerging-techniques/sintering-to-transparencyof-polycrystalline-ceramic-materials.

Sudo et al., "Interface behavior between garnet-type lithium-conducting solid electrolyte and lithium metal," Solid State Ionics, 2014, vol. 262, pp. 151-154.

Suzuki et al., "Transparent cubic garnet-type solid electrolyte of $Al_2O_3$-doped $Li_7La_3Zr_2O_{12}$," Solid State Ionics, 2015, vol. 278, pp. 172-176.

Tadanaga et al., "Low temperature synthesis of highly ion conductive $Li_7La_3Zr_2O_{12} — Li_3BO_3$ composites," Electrochemistry Communications, 2013, vol. 33, pp. 51-54.

Takeda et al., "High Pressure Form of Fluoride Garnets $Na_3M_2Li_3F_{12}$ (M=& Fe)," Mat. Res. Bull., 1977, vol. 12, No. 7, pp. 689-692.

Tan et al., "Fabrication and characterization of $Li_7La_3Zr_2O_{12}$ thin films for lithium ion battery," ECS Solid Sate Letters, vol. 1, No. 6, Oct. 3, 2012, pp. Q57-Q60.

Teng, Shiang, et al., "Recent Developments in garnet based solid state electrolytes for thin film batteries," Current Opinion in Solid State and Materials Science, Feb. 2014, vol. 18, Issue 18, pp. 29-38.

Thangadurai et al., "Fast Solid-State Li Ion Conducting Garnet-Type Structure Metal Oxides for Energy Storage," J. Phys. Chem. Lett, 2015, vol. 6, pp. 292-299.

Thangadurai et al., "$Li_6ALa_2N O_{12}$ (A=Ca, Sr, Ba): A New Class of Fast Lithium Ion Conductors with Garnet-Like Structure," J. Am. Ceram. Soc., 2005, vol. 88, No. 2, pp. 411-418.

Thangadurai et al., "Novel Fast Lithium Ion Conduction in Garnet-Type $Li_5La_3M_2O_{12}$ (M=NB, Ta)," J. Am. Ceram. Soc., 2003, vol. 86, No. 3, pp. 437-440.

Thompson et al., "A Tale of Two Sites: On Defining the Carrier Concentration in Garnet-Based Ionic Conductors for Advanced Li Batteries," Adv. Energy Mater., 2015, 1500096, pp. 1-9.

Toda, S., et al., "Low temperature cubic garnet-type $CO_2$-doped $Li_7La_3Zr_2O_{12}$," Solid State Ionics, 2013, vol. 233, pp. 102-106.

Tong et al., "Highly Conductive Li Garnets by a Multielement Doping Strategy", Inorganic Chemistry, 2015, vol. 54, pp. 3600-3607.

(56) References Cited

OTHER PUBLICATIONS

Ulissi, Ulderico et al., "All solid-state battery using layered oxide cathode, lithium-carbon composite anode and thio-LISICON electrolyte," Solid State Ionics, vol. 296, 2016, pp. 13-17.
Wainwright et al., "Forces generated by anode growth in cylindrical $Li/MoS_2$ cells," Journal of Power Sources, 1991, vol. 34, pp. 31-38.
Wang et al., "Correlation and mechanism of lithium ion diffusion with the crystal strcutre of $Li_7La_3Zr_2O_{12}$ revealed by an internal friction technique," Phys. Chem. Chem. Phys., 2014, vol. 16, pp. 7006-7014.
Wang et al., "The synergistic effects of al and Te on the structure and Li+-mobility of garnet-type solid electrolytes", J. Mater. Chem. A. 2014, 9 pages.
Wang et al., "Transparent ceramics: Processing, materials and applications," Progress in Solid State Chemistry, vol. 41, 2013, pp. 20-54.
Wang, Dawei et al., "Toward Understanding the Lithium Transport Mechanism in Garnet-type Solid Electrolytes: Li+ Ion Exchanges and Their Mobility at Octahedral/Tetrahedral Sites," Chem. Mater. 2015, vol. 27, pp. 6650-6659.
Wang, Shutao et al., "Syntheses and structures of lithium zirconates for high-temperature $CO_2$ absorption," J. Mater. Chem. A, 2013, vol. 1, pp. 3540-3550.
Wang, Yuxing et al., "Phase transition in lithium garnet oxide ionic conductors $Li_7La_3Zr_2O_{12}$: The role of Ta substitution and $H_2O/CO_2$ exposure," Journal of Power Sources, 2015, vol. 275, pp. 612-620.
Wilkinson et al., "Effects of physical constraints on Li cycability," Journal of Power Sources, 1991, vol. 36, pp. 517-527.
Wolfenstine et al., "A preliminary investigation of fracture toughness of $Li_7La_3Zr_2O_{12}$ and its comparisoin to other solid Li-ion conductors," Materials letters, 2013, vol. 96, pp. 117-120.
Wolfenstine et al., "Chemical stability of cubic $Li_7La_3Zr_2O_{12}$ with molten lithium at elevated temperature", J. Mater. Sci., 2013, vol. 48, pp. 5846-5851.
Xie et al., "Lithium Distribution in Aluminum-Free Cubic $Li_7La_3Zr_2O_{12}$", issued on Chem. Mater. 2011, vol. 23, pp. 3587-3589.
Xie et al., "Low-temperature synthesis of $Li_7La_3Zr_2O_{12}$ with cubic garnet-type structure," Materials Research Bulletin, 2012, vol. 47, pp. 1229-1232.
Xu et al., "Multistep sintering to synthesize fast lithium garnets," Journal of Power Sources, 2016, vol. 302, pp. 291-297.
Yang et al., "Nanostructured Garnet-Type Solid Electrolytes for Lithium Batteries: Electrospinning Synthesis of $Li_7La_3Zr_2O_{12}$ Nanowires and Particle Size-Dependent Phase Transformation,"J. Phys. Chem. C., DOI: 10.1021/acs.jpcc.5b03589, J.Phys.Chem.C. XXXX, XXX, XXX-XXX, pp. A-G (7 pages).
Yi et al., "Flame made nanoparticles permit processing of dense, flexible, Li+ conducting ceramic electrolyte thin films of cubic-$Li_7La_3Zr_2O_{12}$(c-LLZO) ," J. Mater. Chem. A, 2016, vol. 4, pp. 12947-12954.
Yoshima et al., "Thin hybrid electrolyte based on garnet-type lithium-ion conductor $Li_7La_3Zr_2O_{12}$ for 12 V-class bipolar batteries," Journal of Power Sources, 2016, vol. 302, pp. 283-290.
Zaiss et al., "Fast ionic conduction in cubic hafnium garnet $Li_7La_3Hf_2O_{12}$," Ionics, Springer-Verlag, 2010, vol. 16, pp. 855-858.
Zhang et al., "Effect of lithium ion concentration on the microstructure evolution and its association with the ionic conductivity of cubic garnet-type nominal $Li_7Al_{0.25}La_3Zr_2O_{12}$ solid electrolytes", Solid State Ionics, 2016, vol. 284, pp. 53-60.
Zhang et al., "Field assisted sintering of dense Al-substituted cubic phase $Li_7La_3Zr_2O_{12}$ solid electrolytes," Journal of Power Sources, 2014, vol. 268, pp. 960-964.
Zhang et al., "Preparation of cubic $Li_7La_3zr_2O_{12}$ solid electrolyte using a nano-sized core-shell structured precursor," Journal of Alloys and Compounds, 2015, vol. 644, pp. 793-798.
Schmidt et al., "In-situ, non-destructive acoustic characterization of solid state electrolyte cells", Journal of Power Sources, 2016, vol. 324, pp. 126-133.

Agrawal et al., "Solid polymer electrolytes: materials designing and all-solid-state battery applications: an overview", Journal of Physics D: Applied Physics 41, 2008, 223001, 18 pages.
Ahmad et al., "Concentration and mobility of mobile Li+ ions in $Li_6BaLa_2Ta_2O_{12}$ and $Li_5La_3Ta_2O_{12}$ garnet lithium ion conductors," J Mater Sci: Mater Electron, 2015, vol. 26, pp. 8136-8142.
Ahmad, Mohamad M., "Lithium ionic conduction and relaxation dynamics of spark plasma sintered $Li_5La_3Ta_2O_{12}$ garnet nanoceramics," Ahmad Nanoscale Research Letters, 2015, 10:58, 10 pages.
Arora et al., "Battery Separators", Chemical Reviews, 2004, vol. 104, pp. 4419-4462.
Baggetto et al., "High Energy Density All-Solid-State Batteries: A Challenging Concept Towards 3D Integration", Advanced Functional Materials, 2008, vol. 18, pp. 1057-1066.
Cao et al., "Effect of Sb—Ba codoping on the ionic conductivity of $Li_7La_3Zr_2O_{12}$ ceramic," Ceramics International, 2015, vol. 41, pp. 6232-6236.
Chen et al., "Sol-gel derived Li—La—Zr—O thin films as solid electrolytes for lithium-ion batteries", Journal of Materials Chemistry A, 2014, vol. 2, pp. 13277-13282.
Cheng et al., "Effect of microstructure and surface impurity segregation on the electrical and electrochemical properties of dense Al-substituted $Li_7La_3Zr_2O_{12}$," J. Mater. Chem. A, 2014, vol. 2, pp. 172-181.
Cheng et al., "The origin of high electrolyte-electrode interfacial resistances in lithium cells containing garnet type solid electrolytes," Phys. Chem. Chem. Phys., 2014, vol. 16, pp. 18294-18300.
Ferrese et al., "Lithium Redistribution in Lithium-Metal Batteries", Journal of the Electrochemical Society, 159, 2012, pp. A1615-A1623.
Gorte et al., "Anodes for Direct Oxidation of Dry Hydrocarbons in a Solid-Oxide Fuel Cell", Advanced Materials, 2000, vol. 12, No. 19, pp. 1465-1469.
Jalem et al., "Effects of Gallium doping in Garnet-Type $Li_7La_3Zr_2O_{12}$ Solid Electrolytes," Chemistry of Materials, 2015, vol. 27, pp. 2821-2831.
Kerman et al., "Complex oxide nanomembranes for energy conversion and storage: A review ", Journal of Materials Research, vol. 29, No. 3, Feb. 14, 2014, pp. 320-337.
Kim et al., "Epitaxial growth and lithium ion conductivity of lithium-oxide garnet for an all solid-state battery electrolyte†", Dalton Transactions, 2013, vol. 42, pp. 13112-13117.
Klenk et al., "Local structure and dyanmics of lithium garnet ionic conductors: tetragonal and cubic $Li_7La_3Zr_2O_7$," Phys. Chem. Chem. Phys., 2015, vol. 17, pp. 8758-8768.
Lau et al., "Density Functional Investigation of the Thermodynamic Stability of Lithium Oxide Bulk Crystalline Structures as a Function of Oxygen Pressure", J. Phys. Chemistry C, 2011, vol. 115, pp. 23625-23633.
McCloskey et al., "On the Mechanism of Nonaqueous Li—$O_2$ Electrochemistry on C and Its Kinetic Overpotentials: Some Implications for Li-Air Batteries", J. Phys. Chemistry C, 2012, vol. 116, pp. 23897-23905.
Minami et al., "Crystallization Process for Superionic $Li_7P_3S_{11}$ Glass-Ceramic Electrolytes", Journal of the American Ceramic Society, 2011, vol. 94, pp. 1779-1783.
Narayanan et al., "Dopant Concentration-Porosity-Li-Ion Conductivity Relationship in Garnet-Type $Li_{5+2x}La_3Ta_{2-x}Y_xO_{12}$ (0.05≤x≤0.75) and Their Stability in Water and 1 M LiCl," Inorganic Chemistry, 2015, vol. 54, pp. 6968-6977.
Ni et al., "Room temperature elastic moduli and Vickers hardness of hot-pressed LLZO cubic garnet," J. Mater. Sci., 2012, vol. 47, pp. 7978-7985.
Peng et al., "A Reversible and Higher-Rate Li—$O_2$ Battery", Science, Aug. 3, 2012, vol. 337, pp. 563-567.
Quartarone et al., "Electrolytes for solid-state lithium rechargeable batteries: recent advances and perspectives", Chemical Society Reviews, vol. 40, 2011, pp. 2525-2540.
Rao et al.,"In Situ Neutron Diffraction Monitoring of $Li_7La_3Zr_2O_{12}$ Formation: Toward a Rational Synthesis of Garnet Solid Electrolytes," Chemistry of Materials, 2015, vol. 27, pp. 2903-2910.

(56) References Cited

OTHER PUBLICATIONS

Rosero-Navarro et al., "Preparation of $Li_7La_3(Zr_{2-x}Nb_x)O_{12}$ (x=0-1.5) and $Li_3BO_3/LiBO_2$ composites at low temperatures using a sol-gel process," Solid State Ionics, 2016, vol. 285, pp. 6-12.

Sakamoto et al., "Synthesis of nano-scale fast ion conducting cubic $Li_7La_3Zr_2O_{12}$", Nanotechnology, 2013, vol. 24, 424005, 8 pages.

Sakuda et al., "Evaluation of elastic modulus of $Li_2S$—$P_2S_5$ glassy solid electrolyte by ultrasonic sound velocity measurement and compression test", Journal of the Ceramic Society of Japan 121, 2013, pp. 946-949.

Schafbauer et al., "Tape Casting as a Multi Purpose Shaping Technology for Different Applications in Energy Issues", Materials Science Forum vols. 706-709, 2012, pp. 1035-1040.

Suárez et al., "Sintering to Transparency of Polycrystalline Ceramic Materials," 2012, ISBN: 978-953-51-0017-1, 28 pages; InTech, Available from: http://www.intechopen.com/books/sintering-of-ceramics-new-emerging-techniques/sintering-to-transparencyof-polycrystalline-ceramic-materials.

Takada, "Progress and prospective of solid-state lithium batteries", Acta Materialia 61, 2013, pp. 759-770.

Thangadurai et al., "Garnet-type solid-state fast Li ion conductors for Li batteries: critical review", Chemical Society Reviews, 2014, vol. 43, pp. 4714-4727.

Wang et al., "The synergistic effects of al and Te on the structure and Li+-mobility of garnet-type solid electrolytes", J. Mater. Chem. A, 2014, vol. 2, pp. 20271-20279.

Yang et al., "Nanostructured Garnet-Type Solid Electrolytes for Lithium Batteries: Electrospinning Synthesis of $Li_7La_3Zr_2O_{12}$ Nanowires and Particle Size-Dependent Phase Transformation", J. Physical Chemistry C, 2015, vol. 119, pp. 14947-14953.

Fu et al., "Stabilizing the Garnet Solid-Electrolyte/Polysulfide Interface in Li—S Batteries", Chemistry of Materials, vol. 29, No. 19, Sep. 26, 2017, pp. 8037-8041.

Fu et al., "Toward Garnet Electrolyte-based Li Metal Batteries: An ultrathin, highly effective, artificial solid-state electrolyte/metallic Li interface", Science Advances, vol. 3, No. 4, Apr. 7, 2017, pp. 1-11.

\* cited by examiner

LITHIUM-STUFFED GARNET ELECTROLYTES WITH SECONDARY PHASE INCLUSIONS

BACKGROUND OF THE INVENTION

Cleaner forms of storing energy are in great demand. Examples of clean energy storage include rechargeable lithium (Li) ion batteries (i.e., Li-secondary batteries), in which $Li^+$ ions move from the negative electrode to the positive electrode during discharge. In numerous applications (e.g., portable electronics and transportation), it is advantageous to use a solid-state Li ion battery which consists of primarily all solid-state materials as opposed to one that includes liquid components (e.g., flammable liquid electrolytes which include organic solvents such as alkylene carbonates), due to safety as well as energy density considerations. Solid-state Li ion batteries, which incorporate a Li-metal negative electrode, advantageously, have significantly lower electrode volumes and correspondingly increased energy densities.

Components of a solid-state battery include the solid-state electrolyte, which electrically isolates the positive and negative electrodes, and, often, also a catholyte, which is mixed with a positive electrode active material to improve the ionic conductivity in the space between positive electrode active material particles within the positive electrode region. Limitations in solid-state electrolytes have been a factor in preventing the commercialization of solid-state batteries. A third component, in some Li ion solid-state batteries, is an anolyte, which is laminated to, or in contact with, a negative electrode material (e.g., Li-metal). Many currently available electrolyte, catholyte, and anolyte materials, however, may not be stable within solid-state battery operating voltage ranges or when in contact with certain cathode (e.g., metal fluorides) or anode active materials (e.g., Li-metal).

Li-stuffed garnet is a class of oxides that has the potential to be suitable for use as a catholyte, electrolyte, and/or, anolyte in a solid-state battery. Certain garnet materials and processing techniques are known (e.g., U.S. Pat. Nos. 8,658, 317; 8,092,941; and 7,901,658; US Patent Application Publication Nos. 2013/0085055, 2011/0281175, 2014/0093785, and 2014/0170504; also Bonderer, et al. "Free-Standing Ultrathin Ceramic Foils," Journal of the American Ceramic Society, 2010, 93(11):3624-3631; and Murugan, et al., *Angew Chem. Int. Ed.* 2007, 46, 7778-7781), but these materials and techniques suffer from deficiencies which must be overcome for solid-state batteries to be commercially viable.

The state of the art teaches that lithium-stuffed garnet-based electrolytes, when used for Li ion rechargeable batteries, should be phase pure-cubic $Li_7La_3Zr_2O_{12}$, only, or cubic $Li_7La_3Zr_2O_{12}$ doped with the minimal amount of Al and/or $Al_2O_3$ that will not form secondary crystalline phases or inclusions in the primary cubic $Li_7La_3Zr_2O_{12}$ phase. The state of the art teaches that to prepare a lithium-stuffed garnet-based electrolyte with the highest $Li^+$ ionic conductivity it is important to make the garnet phase pure—having only a single type of crystalline phase present. For example, the state of the art teaches that it is important to keep the amount of Al and/or $Al_2O_3$ below their solubility limit in $Li_7La_3Zr_2O_{12}$ in order not to precipitate insoluble secondary crystalline phases. See, for example, Matsuda, et. al., RSC Adv., 2016, 6, 78210, which sets forth that cubic phase garnet structures have a higher ionic conductivity than tetragonal phase garnet structures and which also sets forth certain compositions, e.g., a tetragonal phase aluminum doped garnet, $Li_{7-x}Al_yLa_3Zr_{2-x}Ta_xO_{12}$, which remains tetragonal when x+3y<0.4 and which transforms to a cubic garnet when the empirical formula is $Li_{6.6-z/2}Al_{z/2}$ $0.4La_3Zr_{1.6+z}Ta_{0.4-z}O_{12}$.

Certain garnets, which don't include lithium, are known to have a certain amount of secondary phase content therein (e.g., U.S. Pat. No. 8,461,535; U.S. Patent Application Publication No. 2016/0362341).

Lithium-stuffed garnet has the empirical formula $Li_7La_3Zr_2O_{12}$ (and is referred to in the art as "LLZO" or "LLZ"). This composition can exist in a variety of crystalline phases. For example, this composition is stable in a tetragonal phase at room temperature and this tetragonal phase has a low lithium-conductivity. This composition also forms a cubic phase, which has a much higher conductivity than the tetragonal phase. The cubic phase is formed by doping LLZO with aliovalent dopants such as aluminum (Al), niobium (Nb), tantalum (Ta) and similar dopants. Another example of LLZO is $Li_{7-3x}Al_xLa_3Zr_2O_{12}$, wherein x is a rational number greater than zero and less than or equal to 0.2. In $Li_{7-3x}Al_xLa_3Zr_2O_{12}$, the solubility limit of aluminum (Al) in the LLZO lattice is near 0.2. This means that if more than 0.2 moles of Al per LLZO mole are present, that additional amount of Al will precipitate out as a secondary phase (e.g., $LaAlO_3$, $LiAlO_2$, and $La_2Zr_2O_7$). The state of the art teaches that LLZO should not be doped with Al beyond this solubility limit because these secondary phases will precipitate. For example, see Kotobuki, et. al., *Journal of Power Sources* 196 (2011) 7750-7754, which teaches that $La_2Zr_2O_7$ impurities (a type of secondary phase) should be avoided during the formation of LLZO in order to produce a phase pure LLZO-based electrolyte which has a high Li ion conductivity.

Further improvements in garnet-based electrolytes are needed in order to commercialize solid-state batteries. Set forth herein are such improvements in addition to other disclosures.

SUMMARY OF THE INVENTION

In a first embodiment, set forth herein is a multiphase thin film solid-state electrolyte which includes a primary cubic phase lithium-stuffed garnet characterized by the chemical formula $Li_ALa_BAl_CM''_DZr_EO_F$, wherein 5<A<8, 1.5<B<4, 0.1<C<2, 0≤D<2; 1<E<3, 10<F<13, and M" is selected from the group consisting of Mo, W, Nb, Y, Ta, Ga, Sb, Ca, Ba, Sr, Ce, Hf, and Rb; and a secondary phase inclusion(s) in the primary cubic phase lithium-stuffed garnet; further, wherein the primary cubic phase lithium-stuffed garnet is present in the multiphase thin film solid-state electrolyte at about 70-99.9 vol % with respect to the volume of the multiphase thin film electrolyte; and the secondary phase inclusion(s) is/are present in the multiphase thin film solid-state electrolyte at about 30-0.1 vol % with respect to the volume of the multiphase thin film electrolyte.

In a second embodiment, set forth herein is a composition which includes a primary cubic phase lithium-stuffed garnet characterized by the chemical formula $Li_ALa_BAl_CM''_D$ $Zr_EO_F$, wherein 5<A<8, 1.5<B<4, 0.1<C<2, 0≤D<2; 1<E<3, 10<F<13, and M" is selected from the group consisting of Mo, W, Nb, Y, Ta, Ga, Sb, Ca, Ba, Sr, Ce, Hf, and Rb; a secondary phase inclusion(s) in the primary cubic phase lithium-stuffed garnet; wherein: the primary cubic phase lithium-stuffed garnet is present at about 70-99.9 vol % with respect to the volume of the composition; and the secondary phase inclusion(s) is/are present at about 30-0.1 vol % with respect to the volume of the composition.

In a third embodiment, set forth herein is a process of making a composition, wherein the compositions includes a primary cubic phase lithium-stuffed garnet characterized by the chemical formula $Li_4La_BAl_cM''_DZr_EO_F$, wherein $5<A<8$, $1.5<B<4$, $0.1<C<2$, $0≤D<2$; $1<E<3$, $10<F<13$, and M" is selected from the group consisting of Mo, W, Nb, Y, Ta, Ga, Sb, Ca, Ba, Sr, Ce, Hf, and Rb; a secondary phase inclusion(s) in the primary cubic phase lithium-stuffed garnet; wherein the primary cubic phase lithium-stuffed garnet is present at about 70-99.9 vol % with respect to the volume of the composition; and the secondary phase inclusion is present at about 30-0.1 vol % with respect to the volume of the composition; the process includes the following steps: (a) providing a mixture of chemical precursors to the composition, wherein the amount of Al in the mixture exceeds the solubility limit of Al in LLZO; and (b) calcining the mixture by heating it to at least 800° C.

BRIEF DESCRIPTION OF THE DRAWINGS

FIG. 1A shows a plan view of the lithium-stuffed garnet thin film with secondary phase inclusions. FIG. 1B shows a focused ion-beam (FIB) cross-section showing the second phase inclusions $LiAlO_2$ and $Li_2ZrO_3$.

DETAILED DESCRIPTION OF THE INVENTION

Figure 1A:
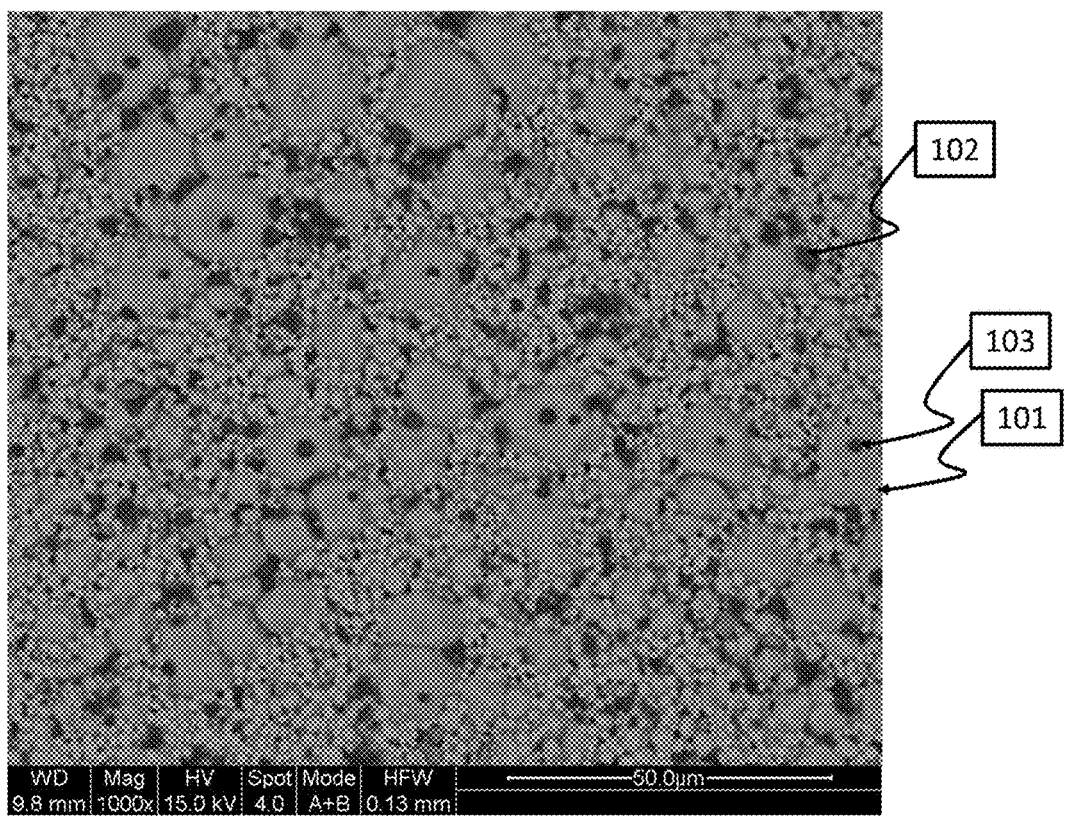
FIGS. 1A and 1B show scanning electron microscope (SEM) images and focused ion beam (FIB) microscopy images of the sintered thin film lithium-stuffed garnet from Example 8. The SEM images show the volume fraction of secondary phases in the lithium-stuffed garnet.

Disclosed herein are processes for making and using thin film lithium-stuffed garnet electrolytes, which, in addition to a primary cubic phase lithium-stuffed garnet, also incorporate secondary phase inclusions, such as but not limited to tetragonal garnet, lithium aluminate, lithium zirconate, lanthanum aluminate, lanthanum zirconate, lanthanum oxide, and lithium lanthanum oxide. In contrast to known phase pure cubic phase lithium-stuffed garnets materials, the processes and materials set forth herein are uniquely designed for electrochemical devices (e.g., solid-state batteries), and have a microstructure, stability between 0 and 4.5 Volts (V) versus (v.) Lithium (Li), chemical compatibility with Li metal, mechanical strength, and sinterability to high density, which improves upon that which is known in the relevant art. For example, by far exceeding the solubility limit of Al in LLZO, the instant disclosure shows how to produce lithium-stuffed garnet electrolytes with secondary phase inclusions that have electrochemical and processing properties that are improved upon those known in the relevant art.

The following description is presented to enable one of ordinary skill in the art to make and use the inventions set forth herein and to incorporate these inventions in the context of particular applications. Various modification, as well as a variety of uses in different application will be clear to those skilled in the art, and the general principles defined herein may be applied to a wide range of embodiments. Thus the present invention is not intended to be limited to the embodiments present, but is to be accorded the widest scope consisted with the principles and novel features disclosed herein.

The reader's attention is directed to all paper and documents which are filed concurrently with this specification and which are open to public inspection with this specification, and the contents of all such papers and documents are incorporated herein by reference. Unless expressly stated otherwise, each feature disclosed is one example only of a series of equivalent or similar features.

Furthermore, any element in a claim that does not explicitly state "means for" performing a specified function, or "step for" performing a specific function is not to be particularly interpreted as a "means" or "Step" clause as specified in post-America Invents Act 35 U.S.C. Section 112(f).

Please note, if used, the labels left, right, front, back, top, bottom, forward, reverse, clockwise, and counter clockwise have been used for convenience purposes only, and are not intended to imply any particular fixed direction. Instead, these are used to reflect relative locations and/or directions between various portions of an object.

I. Definitions

As used herein, the term "about," when qualifying a number, e.g., 15% w/w, refers to the number qualified and optionally the numbers included in a range about that qualified number that includes ±10% of the number. For example, about 15% w/w includes 15% w/w as well as 13.5% w/w, 14% w/w, 14.5% w/w, 15.5% w/w, 16% w/w, or 16.5% w/w. For example, "about 75° C.," includes 75° C. as well 68° C., 69° C., 70° C., 71° C., 72° C., 73° C., 74° C., 75° C., 76° C., 77° C., 78° C., 79° C., 80° C., 81° C., 82° C., or 83° C.

As used herein, the phrase "at least one member selected from the group," includes a single member from the group, more than one member from the group, or a combination of members from the group. At least one member selected from the group consisting of A, B, and C includes, for example, A, only, B, only, or C, only, as well as A and B as well as A and C as well as B and C as well as A, B, and C or any combination of A, B, and C.

As used herein, the term "electrolyte," refers to an ionically conductive and electrically insulating material. Electrolytes are useful for electrically insulating the positive and negative electrodes of a rechargeable battery while allowing for the conduction of ions, e.g., $Li^+$, through the electrolyte.

As used herein, the phrase "lithium-stuffed garnet" refers to oxides that are characterized by a crystal structure related to a garnet crystal structure. Lithium-stuffed garnets include compounds having the formula $Li_A La_B M'_C M''_D Zr_E O_F$, or $Li_A La_B M'_C M''_D Nb_E O_F$, wherein $4<A<8.5$, $1.5<B<4$, $0≤C≤2$, $0≤D≤2$; $0≤E<2$, $10<F<13$, and M' and M" are each, independently in each instance selected from Al, Mo, W, Nb, Sb, Ca, Ba, Sr, Ce, Hf, Rb, and Ta; or $Li_A La_b Zr_c Al_d Me''_e O_f$, wherein $5<a<7.7$; $2<b<4$; $0<c≤2.5$; $0≤d<2$; $0≤e<2$, $10<f<13$ and Me" is a metal selected from Nb, V, W, Mo, and Sb. Garnets, as used herein, also include those garnets described above that are doped with Al or $Al_2O_3$. Also, garnets as used herein include, but are not limited to, $Li_xLa_3Zr_2O_{12}$+ $yAl_2O_3$. As used herein, garnet does not include YAG-garnets (i.e., yttrium aluminum garnets, or, e.g., $Y_3Al_{15}O_{12}$). As used herein, garnet does not include silicate-based garnets such as pyrope, almandine, spessartine, grossular, hessonite, or cinnamon-stone, tsavorite, uvarovite and andradite and the solid solutions pyrope-almandine-spessarite and uvarovite-grossular-andradite. Garnets herein do not include nesosilicates having the general formula $X_3Y_2(SiO_4)_3$ wherein X is Ca, Mg, Fe, and, or, Mn; and Y is Al, Fe, and, or, Cr.

As used herein, the phrase "phase pure" refers to a material characterized as having a single phase (i.e., type of solid matter) as determined by x-ray powder diffraction (XRD) analysis. For example, phase pure cubic lithium-stuffed garnet is a material having a cubic crystalline structure. The material includes lithium (Li), lanthanum (La), zirconium (Zr), oxygen (O) and optionally dopant atoms (e.g., Al) bonded in a polycrystalline array, wherein each unit cell in the crystallite has cubic symmetry. Phase pure lithium-stuffed garnet includes the solid material, $Li_7La_3Zr_2O_{12}$, wherein the amounts of Li, La, Zr, and O may vary so long as the material remains polycrystalline, with cubic crystalline symmetry. $Li_7La_3Zr_2O_{12}$ can form several crystal phases. One phase that $Li_7La_3Zr_2O_{12}$ forms in addition to a cubic phase is a tetragonal crystalline phase which includes Li, La, Zr, and O atoms bonded in a polycrystalline array, wherein each unit cell within the crystallite has tetragonal symmetry. Phase pure cubic lithium-stuffed garnet is a lithium-stuffed garnet that is at least 99% or more by volume cubic lithium-stuffed garnet. Phase pure cubic lithium-stuffed garnet is phase pure even though the respective amounts of Li, La, Zr, O, and/or Al change so long as the lithium-stuffed garnet remains polycrystalline, with cubic crystalline symmetry. For example, $Li_7La_3Zr_2O_{12}$ may be doped with Al or $Al_2O_3$ and remain phase pure so long as the doped composition, e.g., $Li_7La_3Zr_2O_{12}Al_2O_3$, is polycrystalline, with each unit cell having cubic crystalline symmetry. A lithium-stuffed garnet that includes more than trace amounts (more than 1% by volume) of secondary phases is not phase pure.

As used herein, the phrase "secondary phase" refers to a distinct phase within or adjacent to a primary phase, wherein the primary phase is the phase present is the greatest amount. For example, a small amount of $LiAlO_2$ phase within a bulk $Li_7La_3Zr_2O_{12}Al_x$ phase is a secondary phase. The secondary phase may be identified and quantified, for example, by quantitative x-ray powder diffraction analysis. The secondary phase may be identified and quantified, for example, by quantitative electron microscopy, e.g., SEM in back-scattered electron imaging mode, which shows density contrast. As another example, glancing incidence XRD may be used to identify small secondary phases on the surface of a body, such as but not limited to a pellet or thin film. As another example, selected area x-ray diffraction patterns in transmission electron microscopy may identify microscopic secondary phases. Some secondary phases may be amorphous, weakly diffracting, or thin or small enough as to not be easily identifiable via diffraction techniques. When cubic lithium-stuffed garnet is the primary phase (i.e., the phase present in largest amount by volume), the secondary phases include, but are not limited to tetragonal phase garnet; $La_2Zr_2O_7$; $La_2O_3$; $LaAlO_3$; $La_2(Li_{0.5}Al_{0.5})O_4$; $LiLaO_2$; $LiZr_2O_3$; $Li_a Zr_b O_c$, wherein $1≤a≤8$, $1≤b≤2$, and $1≤c≤7$, and wherein subscripts a, b, and c are selected so that $Li_aZr_bO_c$ is charge neutral; $Li_gAl_hO_i$, wherein $1≤g≤5$, $1≤h≤5$, and $2≤i≤8$, and wherein subscripts g, h, i are selected so that $Li_gAl_hO_i$ is charge neutral; $La_dTa_eO_f$, wherein $1≤d≤3$, $1≤e≤7$, and $4≤f≤19$, and wherein subscripts d, e, and f are selected so that $La_dTa_eO_f$ is charge neutral; $Li_rTa_sO_t$, wherein $1≤r≤2$, $1≤s≤3$, and $3≤t≤7$, and wherein subscripts r, s, and t are selected so that $Li_rTa_sO_t$ is charge neutral; $La_nNb_pO_q$, wherein $1≤n≤3$, $1≤p≤7$, and $4≤q≤19$, and wherein subscripts n, p, and q are selected so that $La_nNb_pO_q$ is charge neutral; $Li_uNb_vO_x$, wherein $1≤u≤3$, $1≤p≤3$, and $3≤x≤9$, and wherein subscripts u, v, and x are selected so that $Li_uNb_vO_x$ is charge neutral; and any combination thereof.

As used herein, the phase "multiphase thin film solid-state electrolyte," refers to a solid-state electrolyte in a film format wherein the film is 10 nm to 100 μm in thickness and wherein the film includes at least two different phases, e.g., cubic lithium-stuffed garnet and $LiZr_2O_3$.

As used herein, the phase "primary cubic phase lithium-stuffed garnet," refers to a material in which the phase present in largest amounts is cubic phase lithium-stuffed garnet.

As used herein, the phase "secondary phase inclusion in the primary cubic phase lithium-stuffed garnet," refers to a secondary phase that is entrapped, surrounded, enclosed by, included within or otherwise encapsulated by a primary cubic phase lithium-stuffed garnet. The secondary phase inclusion may be included within amorphous or crystalline lithium-stuffed garnet.

As used herein, the phrase "garnet precursor chemicals" or "chemical precursor to a Garnet-type electrolyte" or "chemical precursors," refers to chemicals, which react to form a lithium-stuffed garnet material described herein. These chemical precursors include, but are not limited to lithium hydroxide (e.g., LiOH), lithium oxide (e.g., $Li_2O$), zirconium oxide (e.g., $ZrO_{-2}$), zirconium nitrate, zirconium acetate, lanthanum oxide (e.g., $La_2O_3$), lanthanum nitrate, lanthanum acetate, aluminum oxide (e.g., $Al_2O_3$), aluminum (e.g., Al), aluminum nitrate (e.g., $AlNO_3$), aluminum nitrate nonahydrate, aluminum (oxy) hydroxide (gibbsite and boehmite), gallium oxide, corundum, niobium oxide (e.g., $Nb_2O_5$), tantalum oxide (e.g., $Ta_2O_5$).

As used herein the phrase "garnet-type electrolyte," or "garnet-based electrolyte," refers to an electrolyte that includes a garnet or lithium-stuffed garnet material described herein as the ionic conductor.

As used herein, the term "grains" refers to domains of material within the bulk of a material that have a physical boundary that distinguishes the grain from the rest of the material. For example, in some materials both crystalline and amorphous components of a material, often having the same chemical composition, are distinguished from each other by the boundary between the crystalline component and the amorphous component. As another example, two crystalline "grains", or regions of different orientation, have a boundary where they meet. The approximate diameter of the regions between boundaries of a crystalline component with an orientation, or of an amorphous component, is referred herein as the grain size.

As used herein, the phrase "$d_{50}$ grain size," "$d_{50}$ diameter," or "median diameter ($d_{50}$)" refers to the median size, in a distribution of sizes, measured by microscopy techniques or other particle size analysis techniques, such as, but not limited to, scanning electron microscopy or dynamic light scattering. $D_{50}$ by number describes a characteristic dimension of particles in a collection of particles at which 50% of the particles in the collection are smaller than the recited size. $D_{50}$ by volume describes a characteristic dimension of particles in a collection of particles at which 50% of the volume is occupied by smaller particles. Unless otherwise specified, a $D_{50}$ herein refers to a $D_{50}$ by volume. $D_{50}$ by area describes a characteristic dimension of particles in a collection of particles at which 50% of the area is occupied by smaller particles; area $D_{50}$ may be measured by cross-section electron microscopy.

As used herein, the phrase "subscripts and molar coefficients in the empirical formulas are based on the quantities of raw materials initially batched to make the described examples" means the subscripts, (e.g., 7, 3, 2, 12 in $Li_7La_3Zr_2O_{12}$ and the coefficient 0.35 in $0.35Al_2O_3$) refer to the respective elemental ratios in the chemical precursors (e.g., LiOH, $La_2O_3$, $ZrO_2$, $Al_2O_3$) used to prepare a given material, (e.g., $Li_7La_3Zr_2O_{12} \cdot 0.35Al_2O_3$).

As used herein, the term "rational number" refers to any number, which can be expressed as the quotient or fraction (e.g., p/q) of two integers (e.g., p and q), with the denominator (e.g., q) not equal to zero. Example rational numbers include, but are not limited to, 1, 1.1, 1.52, 2, 2.5, 3, 3.12, and 7.

As used herein, the phrases "electrochemical cell" or "battery cell" shall, unless specified to the contrary, mean a single cell including a positive electrode and a negative electrode, which have ionic communication between the two using an electrolyte. In some embodiments, a battery or module includes multiple positive electrodes and/or multiple negative electrodes enclosed in one container, i.e., stacks of electrochemical cells. A symmetric cell is unless specified to the contrary a cell having two Li metal anodes separated by a solid-state electrolyte.

As used herein the phrase "electrochemical stack," refers to one or more units which each include at least a negative electrode (e.g., Li, $LiC_6$), a positive electrode (e.g., Li-nickel-manganese-oxide or $FeF_3$, optionally combined with a solid state electrolyte or a gel electrolyte), and a solid electrolyte (e.g., lithium-stuffed garnet electrolyte set forth herein) between and in contact with the positive and negative electrodes. In some examples, between the solid electrolyte and the positive electrode, there is an additional layer comprising a gel electrolyte. An electrochemical stack may include one of these aforementioned units. An electrochemical stack may include several of these aforementioned units arranged in electrical communication (e.g., serial or parallel electrical connection). In some examples, when the electrochemical stack includes several units, the units are layered or laminated together in a column. In some examples, when the electrochemical stack includes several units, the units are layered or laminated together in an array. In some examples, when the electrochemical stack includes several units, the stacks are arranged such that one negative electrode is shared with two or more positive electrodes. Alternatively, in some examples, when the electrochemical stack includes several units, the stacks are arranged such that one positive electrode is shared with two or more negative electrodes. Unless specified otherwise, an electrochemical stack includes one positive electrode, one solid electrolyte, and one negative electrode, and optionally includes a gel electrolyte layer between the positive electrode and the solid electrolyte.

As used herein, the phrase "solid-state battery" refers to a battery wherein all components are in a non-liquid state; they may be gel, ceramic, solid, and/or polymer. The catholyte of a solid-state battery may be a polymer, gel, or solid. The electrolyte separator of a solid-state battery may be a polymer, gel, or solid. A gel in a solid-state battery may be infiltrated with a liquid, but the gel, macroscopically, has non-liquid state properties.

As used herein, the phrase "gel" refers to a material that has a storage modulus that exceeds the loss modulus as measured by rheometry. A gel may be a polymer swollen or infiltrated by a liquid, or a two-phase material with a porous polymer with pores occupied by liquid. A gel does not appreciably flow in response to gravity over short times (minutes). Examples include, but are not limited to, a PVDF-HFP with electrolyte solvent and salt, and PAN with electrolyte solvent and salt.

As used herein, the phrases "gel electrolyte," unless specified otherwise, refers to a suitable $Li^+$ ion conducting gel or liquid-based electrolyte, for example, those gels set forth in U.S. Pat. No. 5,296,318, entitled RECHARGEABLE LITHIUM INTERCALATION BATTERY WITH HYBRID POLYMERIC ELECTROLYTE. A gel electrolyte has lithium ion conductivity of greater than $10^{-5}$ S/cm at room temperature, a lithium transference number between 0.05-0.95, and a storage modulus greater than the loss modulus at some temperature. A gel may comprise a polymer matrix, a solvent that gels the polymer, and a lithium containing salt that is at least partly dissociated into $Li^+$ ions and anions.

As used herein, the phrase "positive electrode" refers to the electrode in a secondary battery towards which positive ions, e.g., $Li^+$, conduct during discharge of the battery. As used herein, the phrase "negative electrode" refers to the electrode in a secondary battery from where positive ions, e.g., $Li^+$, conduct during discharge of the battery. In a battery comprised of a Li-metal electrode and a conversion chemistry electrode (i.e., active material; e.g., $NiF_x$), the electrode having the conversion chemistry materials is referred to as the positive electrode. In some common usages, cathode is used in place of positive electrode, and anode is used in place of negative electrode. When a Li-secondary battery is charged, Li ions conduct from the positive electrode (e.g., $NiF_x$) towards the negative electrode (Li-metal). When a Li-secondary battery is discharged, Li ions conduct towards the positive electrode (e.g., $NiF_x$; i.e., cathode) and from the negative electrode (e.g., Li-metal; i.e., anode).

As used herein the phrase "active electrode material," or "active material," refers to a material that is suitable for use as a Li rechargeable battery and which undergoes a mostly reversible chemical reaction during the charging and discharging cycles. For examples, and "active cathode material," includes a metal fluoride that converts to a metal and lithium fluoride during the discharge cycle of a Li rechargeable battery.

As used herein the phrase "active anode material" refers to an anode material that is suitable for use in a Li rechargeable battery that includes an active cathode material as defined above. In some examples, the active material is Lithium metal. In some of the processes set forth herein, the sintering temperatures are high enough to melt the Lithium metal used as the active anode material.

As used herein, the phrase "current collector" refers to a component or layer in a secondary battery through which electrons conduct, to or from an electrode in order to complete an external circuit, and which are in direct contact with the electrode to or from which the electrons conduct. In some examples, the current collector is a metal (e.g., Al, Cu, or Ni, steel, alloys thereof, or combinations thereof) layer, which is laminated to a positive or negative electrode. During charging and discharging, electrons conduct in the opposite direction to the flow of Li ions and pass through the current collector when entering or exiting an electrode.

As used herein, the term "laminating" refers to the process of sequentially depositing a layer of one precursor specie, e.g., a lithium precursor specie, onto a deposition substrate and then subsequently depositing an additional layer onto an already deposited layer using a second precursor specie, e.g., a transition metal precursor specie. This laminating process can be repeated to build up several layers of deposited vapor phases. As used herein, the term "laminating" also refers to the process whereby a layer comprising an electrode, e.g., positive electrode or cathode active material comprising layer, is contacted to a layer comprising another material, e.g., garnet electrolyte. The laminating process may include a reaction or use of a binder which adheres of physically maintains the contact between the layers which are laminated.

As used herein, the phrase "green film" refers to an unsintered film including at least one member selected from garnet materials, precursors to garnet materials, binder, solvent, carbon, dispersant, or combinations thereof.

As used herein, the phrase "solid-state catholyte," or the term "catholyte" refers to an electrolyte that is intimately mixed with, or surrounded by, a cathode (i.e., positive electrode) active material (e.g., a metal fluoride optionally including lithium).

As used herein, the phrase "film" refers to a thin membrane of less than 0.5 mm thickness and greater than 5 mm in a lateral dimension. A "film" may be produced by a continuous process such as tape-casting, slip casting, or screen-printing. A film may be a "green film", i.e. before heating, calcining or sintering, or a "sintered film", i.e. after sintering at elevated temperatures to cause densification.

As used herein, the phrase "film thickness" refers to the distance, or median measured distance, between the top and bottom faces of a film. As used herein, the top and bottom faces refer to the sides of the film having the largest surface area.

As used herein, the phrase "pellet" refers to a body of material produced by a batch process with at least one compaction step. The pellet may be a "green pellet", i.e., before heating or sintering, or a "sintered pellet", i.e., after heating or sintering at elevated temperatures to cause densification.

As used herein, the phrase "monolith" refers to a body of material that, on a length scale of ≥0.1 mm, is substantially uniform or homogeneous in structure and composition.

As used herein the phrase "sintering the film," refers to a process whereby a thin film, as described herein, is densified (made denser, or made with a reduced porosity) using heat and or pressure. Sintering includes the process of forming a solid mass of material by heat and/or pressure without melting it to the point of complete liquification.

As used herein the term "binder," refers to a material that assists in the adhesion of another material. For example, as used herein, polyvinyl butyral is a binder because it is useful for adhering garnet materials. Other binders include polycarbonates. Other binders may include polymethylmethacrylates. These examples of binders are not limiting as to the entire scope of binders contemplated here but merely serve as examples.

As used herein the phrase "casting a film," refers to the process of delivering or transferring a liquid or a slurry into a mold, or onto a substrate, such that the liquid or the slurry forms, or is formed into, a film. Casting may be done via doctor blade, meyer rod, comma coater, gravure coater, microgravure, reverse comma coater, slot die, slip and/or tape casting, and other processes known to those skilled in the art.

As used herein the phrase "stable at voltages greater than about 3.8V," refers to a material that does not undergo a destructive chemical reaction when a voltage of more than 3.8V relative to a lithium reference electrode that is applied thereto. A destructive chemical reaction as used herein refers to a chemical reaction that degrades the functionality of the material for which the material is used.

As used herein, the phrase "fracture strength," refers to a measure of force required to break a material, e.g., a thin film electrolyte, by inducing a crack or fracture therein. Fracture strength values recited herein were measured using the ring on ring test. The ring-on-ring test is a measure of equibiaxial flexural strength and may be measured as specified in the ASTM C1499-09 standard. The test is performed at ambient temperature unless stated explicitly otherwise.

As used herein, the phrase "density as determined by geometric measurements," refers to measurements of density obtained by physical mass and volume measurements. Density is determined by the ratio of measured mass to the measured volume. Customary techniques including the Archimedes method may be employed for such determinations. Unless stated otherwise, the density as determined by geometric measurements is the Archimedes method.

As used herein, the phrase "density as measured by the Archimedes method," refers to a density measurement inclusive of closed porosity but exclusive of open porosity. The dimensions of a dry material are measured and the volume is calculated and recorded as $V_d$; the mass of the dry material is measured and recorded as ma. Vacuum infiltration of the material with a solvent such as toluene or IPA is then conducted by, for example, pulling a vacuum on the material for at least one hour to a pressure less than −20 inHg and then submerging the material in a solvent to infiltrate the material with the solvent for at least 30 minutes. Next, the vacuum is released, while keeping the material submerged in the solvent. Then, the surface liquid is wiped off of the material. Next, the mass, $m_w$, of the material when wet is recorded. Finally, the mass, $m_s$, of the material when submerged is recorded. The Archimedes bulk density is calculated as $m_d/(m_w-m_s)\rho_s$, where $\rho_s$ is the solvent density, and the open porosity is $(m_w-m_d)/(m_w-m_s)$.

As used herein, the phrases "density as determined by scanning electron microscopy (SEM)," and "porosity as determined by SEM," refers to the analysis of scanning electron microscopy (SEM) images. This analysis includes measuring the relative amounts of the electrolyte separator which are porous or vacant with respect to the electrolyte separator which is fully dense. The SEM images useful for this analysis include those obtained by SEM cross-sectional analysis using focused ion beam (FIB) milling. The density measurement uses image analysis software and an SEM image. First, a user or the software assigns pixels and/or regions of an SEM image as porosity. Second, the area fraction of those regions is summed by the software. The porosity fraction determined by SEM is equal to the area fraction of the porous region of the image.

As used herein the phrase "free-standing thin film," refers to a film that is not adhered or supported by an underlying substrate. In some examples, free-standing thin film is a film that is self-supporting, which can be mechanically manipulated or moved without need of a substrate adhered or fixed thereto.

II. Multiphase Films

In some examples, set forth herein is a multiphase thin film solid-state electrolyte which is polycrystalline and has a thickness between 10 nm and 200 μm. The majority phase in the poly-crystallites is a primary cubic phase lithium-stuffed garnet characterized by the chemical formula $Li_ALa_BAl_CM''_DZr_EO_F$, wherein $5<A<8$, $1.5<B<4$, $0.1<C<2$, $0 \leq D<2$; $1<E<3$, $10<F<13$, and M" is selected from the group consisting of Mo, W, Nb, Y, Ta, Ga, Sb, Ca, Ba, Sr, Ce, Hf, and Rb. Also present in the multiphase film is a secondary phase inclusion in the primary cubic phase lithium-stuffed garnet; wherein the primary cubic phase lithium-stuffed garnet is present in the multiphase thin film solid-state electrolyte at about 70-99.9 vol % with respect to the volume of the multiphase thin film electrolyte, and the secondary phase inclusion is present in the multiphase thin film solid-state electrolyte at about 30-0.1 vol % with respect to the volume of the multiphase thin film electrolyte.

In some examples, the multiphase film is a sintered film made by sintering a green (i.e., unsintered) film which comprises chemical precursors to lithium-stuffed garnet and/or lithium-stuffed garnet. In some examples, the amount of primary material relative to the amount of secondary material is greater in the sintered film than is present in the corresponding unsintered films before the unsintered film was sintered. The multiphase thin films herein can be made, in part, by providing green films with secondary phases, which assist in the sintering and densification of the primary phase cubic lithium-stuffed garnet. In some examples, the green films include calcined powders, which include primary phase cubic lithium-stuffed garnet and secondary phases, which assist in the sintering of the green film to make the sintered films herein.

In some examples, including any of the foregoing, the amount of primary cubic phase lithium-stuffed garnet and the amount of secondary phase inclusion sum to the total amount of material in the multiphase thin film solid-state electrolyte.

In some examples, including any of the foregoing, the secondary phase inclusion $d_{50}$ grain size is less than 10 μm.

In some examples, including any of the foregoing, the secondary phase inclusion $d_{50}$ grain size is from about 1 μm to about 10 μm.

In some examples, including any of the foregoing, the primary cubic phase lithium-stuffed garnet $d_{50}$ grain size is smaller than the secondary phase inclusion $d_{50}$ grain size.

In some examples, including any of the foregoing, the primary cubic phase lithium-stuffed garnet $d_{50}$ grain size is from about 10 μm to about 20 μm.

In some examples, including any of the foregoing, the primary cubic phase lithium-stuffed garnet grain size $d_{50}$ is from about 0.5 μm-10 μm.

In some examples, including any of the foregoing, the $d_{90}$ grain size of any phase in the multiphase thin film solid-state electrolyte is from about 1 μm to 5 μm.

In some examples, including any of the foregoing, the $d_{50}$ grain sizes are substantially as shown in any one of FIG. 1a, 1B, 9, or 12.

In some examples, including any of the foregoing, the secondary phase inclusions are homogenously distributed in the multiphase film.

In some examples, including any of the foregoing, the secondary phase inclusions include more than one type of secondary phase inclusions.

In some examples, including any of the foregoing, the secondary phase inclusions include at least two, three or four types of secondary phase inclusions.

In some examples, including any of the foregoing, the secondary phase inclusions are homogenously distributed over a volume of 100 μm³ or more.

In some examples, including any of the foregoing, the inclusions are homogenously distributed over a volume of 1000 μm³ or more.

In some examples, including any of the foregoing, the ratio of the secondary phase inclusion $d_{50}$ grain size to the primary cubic phase lithium-stuffed garnet $d_{50}$ grain size is between 0.1 and 10.

In some examples, including any of the foregoing, the multiphase thin film solid-state electrolyte has a fracture strength of 50 MPa-1000 MPa as measured a ring-on-ring flexural strength test.

In some examples, including any of the foregoing, the multiphase thin film solid-state electrolyte has a fracture strength of 50 MPa-2000 MPa as measured a ring-on-ring flexural strength test.

In some examples, including any of the foregoing, the multiphase thin film solid-state electrolyte has a fracture strength of 50 MPa-1200 MPa as measured a ring-on-ring flexural strength test.

In some examples, including any of the foregoing, the multiphase thin film solid-state electrolyte has a fracture strength of 200 MPa-800 MPa as measured a ring-on-ring flexural strength test.

In some examples, including any of the foregoing, the multiphase thin film solid-state electrolyte has a fracture strength of at least 50 MPa as measured by a ring-on-ring flexural strength test.

In some examples, including any of the foregoing, the multiphase thin film solid-state electrolyte has a fracture strength of at least 25 MPa as measured by a ring-on-ring flexural strength test.

In some examples, including any of the foregoing, the thickness of the thin film solid-state electrolyte is between about 0.1 μm to about 200 μm.

In some examples, including any of the foregoing, the thickness of the thin film solid-state electrolyte is between 10 nm and 100 μm.

In some examples, including any of the foregoing, the thin film solid-state electrolyte is a circular shaped disc having a diameter of at least 10 mm.

In some examples, including any of the foregoing, the thin film solid-state electrolyte has an area of at least 25 cm$^2$.

In some examples, including any of the foregoing, the secondary phase inclusion is a material selected from the group consisting of:
- tetragonal phase garnet; $La_2Zr_2O_7$; $La_2O_3$; $LaAlO_3$; $La_2(Li_{0.5}Al_{0.5})O_4$; $LiLaO_2$; $LiZr_2O_3$;
- $Li_aZr_bO_c$, wherein $1 \leq a \leq 8$, $1 \leq b \leq 2$, and $1 \leq c \leq 7$, and wherein subscripts a, b, and c are selected so that $Li_aZr_bO_c$ is charge neutral;
- $Li_gAl_hO_i$, wherein $1 \leq g \leq 5$, $1 \leq h \leq 5$, and $2 \leq i \leq 8$, and wherein subscripts g, h, i are selected so that $Li_gAl_hO_i$ is charge neutral;
- $La_dTa_eO_f$, wherein $1 \leq d \leq 3$, $1 \leq e \leq 7$, and $4 \leq f \leq 19$, and wherein subscripts d, e, and f are selected so that $La_dTa_eO_f$ is charge neutral;
- $Li_rTa_sO_t$, wherein $1 \leq r \leq 2$, $1 \leq s \leq 3$, and $3 \leq t \leq 7$, and wherein subscripts r, s, and t are selected so that $Li_rTa_sO_t$ is charge neutral;
- $La_nNb_pO_q$, wherein $1 \leq n \leq 3$, $1 \leq p \leq 7$, and $4 \leq q \leq 19$, and wherein subscripts n, p, and q are selected so that $La_nNb_pO_q$ is charge neutral;
- $Li_uNb_vO_x$, wherein $1 \leq u \leq 3$, $1 \leq p \leq 3$, and $3 \leq x \leq 9$, and wherein subscripts u, v, and x are selected so that $Li_uNb_vO_x$ is charge neutral; and
- combinations thereof.

In some examples, including any of the foregoing, the secondary phase inclusions include at least two materials selected from the group consisting of:
- tetragonal phase garnet; $La_2Zr_2O_7$; $La_2O_3$; $LaAlO_3$; $La_2(Li_{0.5}Al_{0.5})O_4$; $LiLaO_2$; $LiZr_2O_3$;
- $Li_aZr_bO_c$, wherein $1 \leq a \leq 8$, $1 \leq b \leq 2$, and $1 \leq c \leq 7$, and wherein subscripts a, b, and c are selected so that $Li_aZr_bO_c$ is charge neutral;
- $Li_gAl_hO_i$, wherein $1 \leq g \leq 5$, $1 \leq h \leq 5$, and $2 \leq i \leq 8$, and wherein subscripts g, h, i are selected so that $Li_gAl_hO_i$ is charge neutral;
- $La_dTa_eO_f$, wherein $1 \leq d \leq 3$, $1 \leq e \leq 7$, and $4 \leq f \leq 19$, and wherein subscripts d, e, and f are selected so that $La_dTa_eO_f$ is charge neutral;
- $Li_rTa_sO_t$, wherein $1 \leq r \leq 2$, $1 \leq s \leq 3$, and $3 \leq t \leq 7$, and wherein subscripts r, s, and t are selected so that $Li_rTa_sO_t$ is charge neutral;
- $La_nNb_pO_q$, wherein $1 \leq n \leq 3$, $1 \leq p \leq 7$, and $4 \leq q \leq 19$, and wherein subscripts n, p, and q are selected so that $La_nNb_pO_q$ is charge neutral; and
- $Li_uNb_vO_x$, wherein $1 \leq u \leq 3$, $1 \leq p \leq 3$, and $3 \leq x \leq 9$, and wherein subscripts u, v, and x are selected so that $Li_uNb_vO_x$ is charge neutral.

In some examples, including any of the foregoing, the secondary phase inclusions include at least three materials selected from the group consisting of:
- tetragonal phase garnet; $La_2Zr_2O_7$; $La_2O_3$; $LaAlO_3$; $La_2(Li_{0.5}Al_{0.5})O_4$; $LiLaO_2$; $LiZr_2O_3$;
- $Li_aZr_bO_c$, wherein $1 \leq a \leq 8$, $1 \leq b \leq 2$, and $1 \leq c \leq 7$, and wherein subscripts a, b, and c are selected so that $Li_aZr_bO_c$ is charge neutral;
- $Li_gAl_hO_i$, wherein $1 \leq g \leq 5$, $1 \leq h \leq 5$, and $2 \leq i \leq 8$, and wherein subscripts g, h, i are selected so that $Li_gAl_hO_i$ is charge neutral;
- $La_dTa_eO_f$, wherein $1 \leq d \leq 3$, $1 \leq e \leq 7$, and $4 \leq f \leq 19$, and wherein subscripts d, e, and f are selected so that $La_dTa_eO_f$ is charge neutral;
- $Li_rTa_sO_t$, wherein $1 \leq r \leq 2$, $1 \leq s \leq 3$, and $3 \leq t \leq 7$, and wherein subscripts r, s, and t are selected so that $Li_rTa_sO_t$ is charge neutral;
- $La_nNb_pO_q$, wherein $1 \leq n \leq 3$, $1 \leq p \leq 7$, and $4 \leq q \leq 19$, and wherein subscripts n, p, and q are selected so that $La_nNb_pO_q$ is charge neutral; and
- $Li_uNb_vO_x$, wherein $1 \leq u \leq 3$, $1 \leq p \leq 3$, and $3 \leq x \leq 9$, and wherein subscripts u, v, and x are selected so that $Li_uNb_vO_x$ is charge neutral.

In some examples, including any of the foregoing, the secondary phase inclusions include at least four materials selected from the group consisting of:
- tetragonal phase garnet; $La_2Zr_2O_7$; $La_2O_3$; $LaAlO_3$; $La_2(Li_{0.5}Al_{0.5})O_4$; $LiLaO_2$; $LiZr_2O_3$;
- $Li_aZr_bO_c$, wherein $1 \leq a \leq 8$, $1 \leq b \leq 2$, and $1 \leq c \leq 7$, and wherein subscripts a, b, and c are selected so that $Li_aZr_bO_c$ is charge neutral;
- $Li_gAl_hO_i$, wherein $1 \leq g \leq 5$, $1 \leq h \leq 5$, and $2 \leq i \leq 8$, and wherein subscripts g, h, i are selected so that $Li_gAl_hO_i$ is charge neutral;
- $La_dTa_eO_f$, wherein $1 \leq d \leq 3$, $1 \leq e \leq 7$, and $4 \leq f \leq 19$, and wherein subscripts d, e, and f are selected so that $La_dTa_eO_f$ is charge neutral;
- $Li_rTa_sO_t$, wherein $1 \leq r \leq 2$, $1 \leq s \leq 3$, and $3 \leq t \leq 7$, and wherein subscripts r, s, and t are selected so that $Li_rTa_sO_t$ is charge neutral;
- $La_nNb_pO_q$, wherein $1 \leq n \leq 3$, $1 \leq p \leq 7$, and $4 \leq q \leq 19$, and wherein subscripts n, p, and q are selected so that $La_nNb_pO_q$ is charge neutral; and
- $Li_uNb_vO_x$, wherein $1 \leq u \leq 3$, $1 \leq p \leq 3$, and $3 \leq x \leq 9$, and wherein subscripts u, v, and x are selected so that $Li_uNb_vO_x$ is charge neutral.

In some examples, including any of the foregoing, the total amount of secondary phase inclusion is 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 vol %.

In some examples, including any of the foregoing, wherein the secondary phase inclusion comprises $La_2Zr_2O_7$; $LiAlO_2$; $LaAlO_3$; tetragonal garnet; and $Li_2ZrO_3$.

In some examples, including any of the foregoing, the secondary phase inclusions include $La_2Zr_2O_7$; tetragonal garnet; $Li_aZr_bO_c$, wherein $1 \leq a \leq 8$, $1 \leq b \leq 2$, and $1 \leq c \leq 7$, and wherein subscripts a, b, and c are selected so that $Li_aZr_bO_c$ is charge neutral; $La_dTa_eO_f$, wherein $1 \leq d \leq 3$, $1 \leq e \leq 7$, and $4 \leq f \leq 19$, and wherein subscripts d, e, and f are selected so that $La_dTa_eO_f$ is charge neutral; and $Li_rTa_sO_t$, wherein $1 \leq r \leq 2$, $1 \leq s \leq 3$, and $3 \leq t \leq 7$, and wherein subscripts r, s, and t are selected so that $Li_rTa_sO_t$ is charge neutral.

In some examples, including any of the foregoing, the secondary phase inclusion includes $La_2Zr_2O_7$; tetragonal garnet; $Li_aZr_bO_c$, wherein $1 \leq a \leq 8$, $1 \leq b \leq 2$, and $1 \leq c \leq 7$, and wherein subscripts a, b, and c are selected so that $Li_aZr_bO_c$ is charge neutral; $La_nNb_pO_q$, wherein $1 \leq n \leq 3$, $1 \leq p \leq 7$, and $4 \leq q \leq 19$, and wherein subscripts n, p, and q are selected so that $La_nNb_pO_q$ is charge neutral; and $Li_uNb_vO_x$, wherein $1 \leq u \leq 3$, $1 \leq p \leq 3$, and $3 \leq x \leq 9$, and wherein subscripts u, v, and x are selected so that $Li_uNb_vO_x$ is charge neutral.

In some examples, including any of the foregoing, the secondary phase inclusion in the multiphase thin film solid-state electrolyte includes $LiAlO_2$ present in the multiphase thin film solid-state electrolyte at about 0.1-25 vol %, $Li_2ZrO_3$ present in the multiphase thin film solid-state electrolyte at about 0.1-15 vol % and $LaAlO_3$ present in the multiphase thin film solid-state electrolyte at about 0.1-15 vol %, as measured by quantitative XRD.

In some examples, including any of the foregoing, the secondary phase inclusion in the multiphase thin film solid-state electrolyte includes $LiAlO_2$ present in the multiphase thin film solid-state electrolyte at about 3-8 vol %, $Li_2ZrO_3$ present in the multiphase thin film solid-state electrolyte at about 1-10 vol % and $LaAlO_3$ present in the multiphase thin film solid-state electrolyte at about 1-8 vol %, as measured by quantitative XRD.

In some examples, including any of the foregoing, the density of the multiphase thin film solid-state electrolyte is 4.6-5.2 $g/cm^3$ as measured by the Archimedes method.

In some examples, including any of the foregoing, the density of the multiphase thin film solid-state electrolyte is about 4.9 $g/cm^3$ as measured by the Archimedes method.

In some examples, including any of the foregoing, pyrochlore is present in the multiphase thin film solid-state electrolyte at less than 20 vol % as measured by quantitative XRD after the multiphase film is heated at 850° C. for 2 hours.

In some examples, including any of the foregoing, the bulk conductivity is greater than $1-5\times10^{-4}$ S/cm at 20° C.

In some examples, including any of the foregoing, the bulk conductivity is greater than $2\times10^{-4}$ S/cm at 20° C.

In some examples, including any of the foregoing, the interfacial area specific resistance (ASR) of the multiphase thin film solid-state electrolyte with lithium metal is 1-200 $\Omega cm^2$ at −15° C.

In some examples, including any of the foregoing, the interfacial ASR of the multiphase thin film solid-state electrolyte with lithium metal is 2000 $\Omega cm^2$ at −15° C.

In some examples, including any of the foregoing, the interfacial ASR of the multiphase thin film solid-state electrolyte with lithium metal is less than 2000 $\Omega cm^2$ at −15° C.

In some examples, including any of the foregoing, the specific ASR of the multiphase thin film solid-state electrolyte with lithium metal is less than 10 $\Omega cm^2$ at −15° C.

In some examples, including any of the foregoing, the multiphase thin film solid-state electrolyte has a total porosity of less than 5 vol % as determined by SEM.

In some examples, including any of the foregoing, the 90th percentile largest pore has no lateral extent larger than 5 μm as measured by cross-section electron microscopy.

In some examples, including any of the foregoing, the multiphase film is sintered and has a thickness of about 10 nm. In some other examples, the multiphase film has a thickness of about 11 nm. In certain examples, the multiphase film has a thickness of about 12 nm. In certain other examples, the multiphase film has a thickness of about 13 nm. In some other examples, the multiphase film has a thickness of about 14 nm. In some examples, the multiphase film has a thickness of about 15 nm. In some of these examples, the multiphase film has a thickness of about 16 nm. In some examples, the multiphase film has a thickness of about 17 nm. In some other examples, the multiphase film has a thickness of about 18 nm. In certain examples, the multiphase film has a thickness of about 19 nm. In some of these examples, the multiphase film has a thickness of about 20 nm. In some other examples, the multiphase film has a thickness of about 21 nm. In certain examples, the multiphase film has a thickness of about 22 nm. In certain other examples, the multiphase film has a thickness of about 23 nm. In some other examples, the multiphase film has a thickness of about 24 nm. In some examples, the sintered film has a thickness of about 25 nm. In some examples, the multiphase film has a thickness of about 26 nm. In some of these examples, the multiphase film has a thickness of about 27 nm. In some examples, the multiphase film has a thickness of about 28 nm. In some other examples, the multiphase film has a thickness of about 29 nm. In certain examples, the multiphase film has a thickness of about 30 nm. In some of these examples, the multiphase film has a thickness of about 31 nm. In some other examples, the multiphase film has a thickness of about 32 nm. In certain examples, the multiphase film has a thickness of about 33 nm. In certain other examples, the multiphase film has a thickness of about 34 nm. In some other examples, the multiphase film has a thickness of about 35 nm. In some examples, the multiphase film has a thickness of about 36 nm. In some of these examples, the multiphase film has a thickness of about 37 nm. In some examples, the multiphase film has a thickness of about 38 nm. In some other examples, the multiphase film has a thickness of about 39 nm. In certain examples, the multiphase film has a thickness of about 40 nm. In some of these examples, the multiphase film has a thickness of about 41 nm. In some other examples, the multiphase film has a thickness of about 42 nm. In certain examples, the multiphase film has a thickness of about 43 nm. In certain other examples, the multiphase film has a thickness of about 44 nm. In some other examples, the multiphase film has a thickness of about 45 nm. In some examples, the multiphase film has a thickness of about 46 nm. In some of these examples, the multiphase film has a thickness of about 47 nm. In some examples, the multiphase film has a thickness of about 48 nm. In some other examples, the multiphase film has a thickness of about 49 nm. In certain examples, the multiphase film has a thickness of about 50 nm. In some of these examples, the multiphase film has a thickness of about 51 nm. In some other examples, the multiphase film has a thickness of about 52 nm. In certain examples, the multiphase film has a thickness of about 53 nm. In certain other examples, the multiphase film has a thickness of about 54 nm. In some other examples, the multiphase film has a thickness of about 55 nm. In some examples, the multiphase film has a thickness of about 56 nm. In some of these examples, the multiphase film has a thickness of about 57 nm. In some examples, the multiphase film has a thickness of about 58 nm. In some other examples, the multiphase film has a thickness of about 59 nm. In certain examples, the multiphase film has a thickness of about 60 nm.

In some of these examples, the multiphase film has a thickness of about 1 μm. In some of these examples, the multiphase film has a thickness of about 2 μm. In some of these examples, the multiphase film has a thickness of about 3 μm. In some of these examples, the multiphase film has a thickness of about 4 μm. In some of these examples, the multiphase film has a thickness of about 5 μm. In some of these examples, the multiphase film has a thickness of about 6 μm. In some of these examples, the multiphase film has a thickness of about 7 μm. In some of these examples, the multiphase film has a thickness of about μm. In some of these examples, the multiphase film has a thickness of about 9 μm. In some of these examples, the multiphase film has a thickness of about 10 μm. In some of these examples, the multiphase film has a thickness of about 11 μm. In some other examples, the multiphase film has a thickness of about 12 μm. In certain examples, the multiphase film has a thickness of about 13 μm. In certain other examples, the multiphase film has a thickness of about 14 μm. In some other examples, the multiphase film has a thickness of about 15 μm. In some examples, the multiphase film has a thickness of about 16 μm. In some of these examples, the multiphase film has a thickness of about 17 μm. In some examples, the multiphase film has a thickness of about 18 μm. In some other examples, the multiphase film has a thickness of about 19 μm. In certain examples, the multiphase film has a thickness of about 20 μm. In some of these examples, the multiphase film has a thickness of about 21 μm. In some other examples, the multiphase film has a thickness of about 22 μm. In certain examples, the multiphase film has a thickness of about 23 μm. In certain other examples, the multiphase film has a thickness of about 24 μm. In some other examples, the multiphase film has a thickness of about 25 μm. In some examples, the multiphase film has a thickness of about 26 μm. In some of these examples, the multiphase film has a thickness of about 27 μm. In some examples, the multiphase film has a thickness of about 28 μm. In some other examples, the multiphase film has a thickness of about 29 μm. In certain examples, the multiphase film has a thickness of about 30 μm. In some of these examples, the multiphase film has a thickness of about 31 μm. In some other examples, the multiphase film has a thickness of about 32 μm. In certain examples, the multiphase film has a thickness of about 33 μm. In certain other examples, the multiphase film has a thickness of about 34 μm. In some other examples, the multiphase film has a thickness of about 35 μm. In some examples, the multiphase film has a thickness of about 36 μm. In some of these examples, the multiphase film has a thickness of about 37 μm. In some examples, the multiphase film has a thickness of about 38 μm. In some other examples, the multiphase film has a thickness of about 39 μm. In certain examples, the multiphase film has a thickness of about 40 μm. In some of these examples, the multiphase film has a thickness of about 41 μm. In some other examples, the multiphase film has a thickness of about 42 μm. In certain examples, the multiphase film has a thickness of about 43 μm. In certain other examples, the multiphase film has a thickness of about 44 μm. In some other examples, the multiphase film has a thickness of about 45 μm. In some examples, the multiphase film has a thickness of about 46 μm. In some of these examples, the multiphase film has a thickness of about 47 μm. In some examples, the multiphase film has a thickness of about 48 μm. In some other examples, the multiphase film has a thickness of about 49 μm. In certain examples, the multiphase film has a thickness of about 50 μm. In some of these examples, the multiphase film has a thickness of about 51 μm. In some other examples, the multiphase film has a thickness of about 52 μm. In certain examples, the multiphase film has a thickness of about 53 μm. In certain other examples, the multiphase film has a thickness of about 54 μm. In some other examples, the multiphase film has a thickness of about 55 μm. In some examples, the multiphase film has a thickness of about 56 μm. In some of these examples, the multiphase film has a thickness of about 57 μm. In some examples, the multiphase film has a thickness of about 58 μm. In some other examples, the multiphase film has a thickness of about 59 μm. In certain examples, the multiphase film has a thickness of about 60 μm.

In some of these examples, the multiphase film has a thickness of about 61 μm. In some other examples, the multiphase film has a thickness of about 62 μm. In certain examples, the multiphase film has a thickness of about 63 μm. In certain other examples, the multiphase film has a thickness of about 64 μm. In some other examples, the multiphase film has a thickness of about 65 μm. In some examples, the multiphase film has a thickness of about 66 μm. In some of these examples, the multiphase film has a thickness of about 67 μm. In some examples, the multiphase film has a thickness of about 68 μm. In some other examples, the multiphase film has a thickness of about 69 μm. In certain examples, the multiphase film has a thickness of about 70 μm. In some of these examples, the multiphase film has a thickness of about 71 μm. In some other examples, the multiphase film has a thickness of about 72 μm. In certain examples, the multiphase film has a thickness of about 73 μm. In certain other examples, the multiphase film has a thickness of about 74 μm. In some other examples, the multiphase film has a thickness of about 75 μm. In some examples, the multiphase film has a thickness of about 76 μm. In some of these examples, the multiphase film has a thickness of about 77 μm. In some examples, the multiphase film has a thickness of about 78 μm. In some other examples, the multiphase film has a thickness of about 79 μm. In certain examples, the multiphase film has a thickness of about 80 μm. In some of these examples, the multiphase film has a thickness of about 81 μm. In some other examples, the multiphase film has a thickness of about 82 μm. In certain examples, the multiphase film has a thickness of about 83 μm. In certain other examples, the multiphase film has a thickness of about 84 μm. In some other examples, the multiphase film has a thickness of about 85 μm. In some examples, the multiphase film has a thickness of about 86 μm. In some of these examples, the multiphase film has a thickness of about 87 μm. In some examples, the multiphase film has a thickness of about 88 μm. In some other examples, the multiphase film has a thickness of about 89 μm. In certain examples, the multiphase film has a thickness of about 90 μm. In some of these examples, the multiphase film has a thickness of about 91 μm. In some other examples, the multiphase film has a thickness of about 92 μm. In certain examples, the multiphase film has a thickness of about 93 μm. In certain other examples, the multiphase film has a thickness of about 94 μm. In some other examples, the multiphase film has a thickness of about 95 μm. In some examples, the multiphase film has a thickness of about 96 μm. In some of these examples, the multiphase film has a thickness of about 97 μm. In some examples, the multiphase film has a thickness of about 98 μm. In some other examples, the multiphase film has a thickness of about 99 μm. In certain examples, the multiphase film has a thickness of about 100 μm.

In some of these examples, the multiphase film has a thickness of about 101 μm. In some other examples, the multiphase film has a thickness of about 102 μm. In certain examples, the multiphase film has a thickness of about 103 μm. In certain other examples, the multiphase film has a thickness of about 104 μm. In some other examples, the multiphase film has a thickness of about 105 μm. In some examples, the multiphase film has a thickness of about 106 μm. In some of these examples, the multiphase film has a thickness of about 107 μm. In some examples, the multiphase film has a thickness of about 108 μm. In some other examples, the multiphase film has a thickness of about 109 μm. In certain examples, the multiphase film has a thickness of about 110 μm. In some of these examples, the multiphase film has a thickness of about 111 μm. In some other examples, the multiphase film has a thickness of about 112 μm. In certain examples, the multiphase film has a thickness of about 113 μm. In certain other examples, the multiphase film has a thickness of about 114 μm. In some other examples, the multiphase film has a thickness of about 115 μm. In some examples, the multiphase film has a thickness of about 116 μm. In some of these examples, the multiphase film has a thickness of about 117 μm. In some examples, the multiphase film has a thickness of about 118 μm. In some other examples, the multiphase film has a thickness of about 119 μm. In certain examples, the multiphase film has a thickness of about 120 μm. In some of these examples, the multiphase film has a thickness of about 121 µm. In some other examples, the multiphase film has a thickness of about 122 µm. In certain examples, the multiphase film has a thickness of about 123 µm. In certain other examples, the multiphase film has a thickness of about 124 µm. In some other examples, the multiphase film has a thickness of about 125 µm. In some examples, the multiphase film has a thickness of about 126 µm. In some of these examples, the multiphase film has a thickness of about 127 µm. In some examples, the multiphase film has a thickness of about 128 µm. In some other examples, the multiphase film has a thickness of about 129 µm. In certain examples, the multiphase film has a thickness of about 130 µm. In some of these examples, the multiphase film has a thickness of about 131 µm. In some other examples, the multiphase film has a thickness of about 132 µm. In certain examples, the multiphase film has a thickness of about 133 µm. In certain other examples, the multiphase film has a thickness of about 134 µm. In some other examples, the multiphase film has a thickness of about 135 µm. In some examples, the multiphase film has a thickness of about 136 µm. In some of these examples, the multiphase film has a thickness of about 137 µm. In some examples, the multiphase film has a thickness of about 138 µm. In some other examples, the multiphase film has a thickness of about 139 µm. In certain examples, the multiphase film has a thickness of about 140 µm.

In some of these examples, the multiphase film has a thickness of about 141 µm. In some other examples, the multiphase film has a thickness of about 142 µm. In certain examples, the multiphase film has a thickness of about 143 µm. In certain other examples, the multiphase film has a thickness of about 144 µm. In some other examples, the multiphase film has a thickness of about 145 µm. In some examples, the multiphase film has a thickness of about 146 µm. In some of these examples, the multiphase film has a thickness of about 147 µm. In some examples, the multiphase film has a thickness of about 148 µm. In some other examples, the multiphase film has a thickness of about 149 µm. In certain examples, the multiphase film has a thickness of about 150 µm.

In some examples, provided herein is a multiphase film having grains with a $d_{50}$ diameter less than 10 nm. In certain examples, the multiphase film has grains having a $d_{50}$ diameter less than 900 nm. In other examples, the grains having a $d_{50}$ diameter less than 800 nm. In some examples, the grains have a $d_{50}$ diameter less than 700 nm. In certain examples, the multiphase film has grains having a $d_{50}$ diameter less than 600 nm. In other examples, the multiphase film has grains having a $d_{50}$ diameter less than 500 nm. In some examples, the multiphase film has grains having a $d_{50}$ diameter less than 400 nm. In other examples, the multiphase film has grains having a $d_{50}$ diameter less than 300 nm. In certain examples, the multiphase film has grains having a $d_{50}$ diameter less than 200 nm. In other examples, the multiphase film has grains having a $d_{50}$ diameter less than 100 nm.

In some examples, provided herein is a multiphase film having grains with a $d_{50}$ diameter less than 10 µm. In certain examples, the multiphase film has grains having a $d_{50}$ diameter less than 9 µm. In other examples, the grains having a $d_{50}$ diameter less than 8 µm. In some examples, the grains have a $d_{50}$ diameter less than 7 µm. In certain examples, the multiphase film has grains having a $d_{50}$ diameter less than 6 µm. In other examples, the multiphase film has grains having a $d_{50}$ diameter less than 5 µm. In some examples, the multiphase film has grains having a $d_{50}$ diameter less than 4 µm. In other examples, the multiphase film has grains having a $d_{50}$ diameter less than 3 µm. In certain examples, the multiphase film has grains having a $d_{50}$ diameter less than 2 µm. In other examples, the multiphase film has grains having a $d_{50}$ diameter less than 1 µm.

In some examples, the grains in the multiphase films set forth herein have $d_{50}$ diameters of between 10 nm and 10 µm. In some examples, the grains in the multiphase films set forth herein have $d_{50}$ diameters of between 100 nm and 10 µm.

In some examples, the disclosure sets forth herein sets forth a free-standing thin multiphase film garnet-based electrolyte prepared by the process set forth herein.

In some embodiments, the thickness of the free-standing film is less than 50 µm. In certain embodiments, the thickness of the film is less than 40 µm. In some embodiments, the thickness of the film is less than 30 µm. In some other embodiments, the thickness of the film is less than 20 µm. In other embodiments, the thickness of the film is less than 10 µm. In yet other embodiments, the thickness of the film is less than 5 µm.

In some embodiments, the thickness of the film is less than 45 µm. In certain embodiments, the thickness of the film is less than 35 µm. In some embodiments, the thickness of the film is less than 25 µm. In some other embodiments, the thickness of the film is less than 15 µm. In other embodiments, the thickness of the film is less than 5 µm. In yet other embodiments, the thickness of the film is less than 1 µm.

In some embodiments, the thickness of the film is about 1 µm to about 50 µm. In certain embodiments, the thickness of the film about 10 µm to about 50 µm. In some embodiments, the thickness of the film is about 20 µm to about 50 µm. In some other embodiments, the thickness of the film is about 30 µm to about 50 µm. In other embodiments, the thickness of the film is about 40 µm to about 50 µm.

In some embodiments, the thickness of the film is about 1 µm to about 40 µm. In certain embodiments, the thickness of the film about 10 µm to about 40 µm. In some embodiments, the thickness of the film is about 20 µm to about 40 µm. In some other embodiments, the thickness of the film is about 30 µm to about 40 µm. In other embodiments, the thickness of the film is about µm to about 30 µm.

In some examples, set forth herein is a thin and free standing sintered garnet film, wherein the film thickness is less than 50 µm and greater than 10 nm, and wherein the film is substantially flat; and wherein the garnet is optionally bonded to a current collector (CC) film including a metal or metal powder on at least one side of the film. A free standing film can be bonded to a current collector or to other components, but the free-standing film is only a free-standing film when it is not bonded to a current collector or to other components.

In some examples, the thin and free standing sintered garnet film has thickness is less than 20 µm or less than 10 µm. In some examples, the thin and free standing sintered garnet film has a surface roughness of less than 5 µm. In some examples, the thin and free standing sintered garnet film has a surface roughness of less than 4 µm. In some examples, the thin and free standing sintered garnet film has a surface roughness of less than 2 µm. In some examples, the thin and free standing sintered garnet film has a surface roughness of less than 1 µm. In certain examples, the garnet has a median grain size of between 0.1 µm to 10 µm. In certain examples, the garnet has a median grain size of between 2.0 µm to 5.0 µm.

In some of the multiphase films set forth herein, the multiphase film is bound to a substrate that is selected from a polymer, a glass, or a metal. In some of these examples, the substrate adhered to or bound to the multiphase film is a current collector (CC). In some of these examples, the CC includes a metal selected from the group consisting of Nickel (Ni), Copper (Cu), combinations thereof, and alloys thereof. In some of these examples, the multiphase film is bonded to a metal current collector (CC) on one side of the multiphase film. In some other examples, the multiphase film is bonded to a metal current collector (CC) on two sides of the multiphase film. In yet other examples, the CC is positioned between, and in contact with, two multiphase films.

In some examples, set forth herein is a trilayer including a metal foil or metal powder positioned between, and in contact with, two distinct lithium-stuffed garnet multiphase thin films. In some examples, the middle layer is metal foil. In some other examples, the middle layer is a metal powder. In some examples, the metal is Ni. In other examples, the metal is Al. In still other examples, the metal is Fe. In some examples, the metal is steel or stainless steel. In some examples, the metal is an alloy or combination of Ni, Cu, Al, or Fe. In some examples, the trilayer has a structure. In some examples, the trilayer has a structure.

In some examples, set forth herein is a bilayer including a metal foil or metal powder positioned in contact with a lithium-stuffed garnet thin multiphase film. In some examples, one layer of the bilayer is a metal foil. In other examples, one layer of the bilayer is a metal powder. In some examples, the metal is Ni. In other examples, the metal is Al. In other examples, the metal is Cu. In still other examples, the metal is Fe. In some examples, the metal is steel or stainless steel. In some examples, the metal is an alloy or combination of Ni, Cu, Al, or Fe. In some examples, the bilayer has a structure. In some examples, the bilayer has the structure shown between the sintering plates.

In some examples, set forth herein are multiple stacks or combinations of the aforementioned layers, bilayers, and, or, trilayers. In some examples, two or more bilayers are stacked in serial combination. In some other examples, two or more trilayers are stacked in serial combination. In some examples, interposed between these serial combination stacks are cathode active materials, anode active materials, and, or, current collectors.

In some examples, the thin multiphase films set forth herein are less than 50 µm in thickness. In some other examples, the thin multiphase films set forth herein are less than 45 µm in thickness. In certain examples, the thin multiphase films set forth herein are less than 40 µm in thickness. In still other examples, the thin multiphase films set forth herein are less than 35 µm in thickness. In some examples, the thin multiphase films set forth herein are less than 30 µm in thickness. In some other examples, the thin multiphase films set forth herein are less than 25 µm in thickness. In certain examples, the thin multiphase films set forth herein are less than 20 µm in thickness. In still other examples, the thin multiphase films set forth herein are less than 15 µm in thickness. In some examples, the thin multiphase films set forth herein are less than 10 µm in thickness. In some other examples, the thin multiphase films set forth herein are less than 5 µm in thickness. In certain examples, the thin multiphase films set forth herein are less than 0.5 µm in thickness. In still other examples, the thin multiphase films set forth herein are less than 0.1 µm in thickness.

In some examples, provided herein is a composition formulated as a thin film having a film thickness of about 100 nm to about 100 µm. In certain examples, the thickness is about 50 µm. In other examples, the thickness is about 40 µm. In some examples, the thickness is about 30 µm. In other examples, the thickness is about 20 µm. In certain examples, the thickness is about 10 µm. In other examples, the thickness is about 5 µm. In some examples, the thickness is about 1 µm. In yet other examples, the thickness is about 0.5 µm.

In some of these examples, the multiphase films are about 1 mm in at least one lateral dimension. In some other of these examples, the multiphase films are about 5 mm in at least one lateral dimension. In yet other examples, the multiphase films are about 10 mm in at least one lateral dimension. In still other examples, the multiphase films are about 15 mm in at least one lateral dimension. In certain examples, the multiphase films are about 25 mm in at least one lateral dimension. In other examples, the multiphase films are about 30 mm in at least one lateral dimension. In some examples, the multiphase films are about 35 mm in at least one lateral dimension. In some other examples, the multiphase films are about 40 mm in at least one lateral dimension. In still other examples, the multiphase films are about 45 mm in at least one lateral dimension. In certain examples, the multiphase films are about 50 mm in at least one lateral dimension. In other examples, the multiphase films are about 30 mm in at least one lateral dimension. In some examples, the multiphase films are about 55 mm in at least one lateral dimension. In some other examples, the multiphase films are about 60 mm in at least one lateral dimension. In yet other examples, the multiphase films are about 65 mm in at least one lateral dimension. In still other examples, the multiphase films are about 70 mm in at least one lateral dimension. In certain examples, the multiphase films are about 75 mm in at least one lateral dimension. In other examples, the multiphase films are about 80 mm in at least one lateral dimension. In some examples, the multiphase films are about 85 mm in at least one lateral dimension. In some other examples, the multiphase films are about 90 mm in at least one lateral dimension. In still other examples, the multiphase films are about 95 mm in at least one lateral dimension. In certain examples, the multiphase films are about 100 mm in at least one lateral dimension. In other examples, the multiphase films are about 30 mm in at least one lateral dimension.

In some examples, the multiphase films are about 1 cm in at least one lateral dimension. In some other examples, the multiphase films are about 2 cm in at least one lateral dimension. In other examples, the multiphase films are about 3 cm in at least one lateral dimension. In yet other examples, the multiphase films are about 4 cm in at least one lateral dimension. In some examples, the multiphase films are about 5 cm in at least one lateral dimension. In other examples, the multiphase films are about 6 cm in at least one lateral dimension. In yet other examples, the multiphase films are about 7 cm in at least one lateral dimension. In some other examples, the multiphase films are about 8 cm in at least one lateral dimension. In yet other examples, the multiphase films are about 9 cm in at least one lateral dimension. In still other examples, the multiphase films are about 10 cm in at least one lateral dimension. In some examples, the multiphase films are about 11 cm in at least one lateral dimension. In some other examples, the multiphase films are about 12 cm in at least one lateral dimension. In other examples, the multiphase films are about 13 cm in at least one lateral dimension. In yet other examples, the multiphase films are about 14 cm in at least one lateral dimension. In some examples, the multiphase films are about 15 cm in at least one lateral dimension. In other examples, the multiphase films are about 16 cm in at least one lateral dimension. In yet other examples, the multiphase films are about 17 cm in at least one lateral dimension. In some other examples, the multiphase films are about 18 cm in at least one lateral dimension. In yet other examples, the multiphase films are about 19 cm in at least one lateral dimension. In still other examples, the multiphase films are about 20 cm in at least one lateral dimension. In some examples, the multiphase films are about 21 cm in at least one lateral dimension. In some other examples, the multiphase films are about 22 cm in at least one lateral dimension. In other examples, the multiphase films are about 23 cm in at least one lateral dimension. In yet other examples, the multiphase films are about 24 cm in at least one lateral dimension. In some examples, the multiphase films are about 25 cm in at least one lateral dimension. In other examples, the multiphase films are about 26 cm in at least one lateral dimension. In yet other examples, the multiphase films are about 27 cm in at least one lateral dimension. In some other examples, the multiphase films are about 28 cm in at least one lateral dimension. In yet other examples, the multiphase films are about 29 cm in at least one lateral dimension. In still other examples, the multiphase films are about 30 cm in at least one lateral dimension. In some examples, the multiphase films are about 31 cm in at least one lateral dimension. In some other examples, the multiphase films are about 32 cm in at least one lateral dimension. In other examples, the multiphase films are about 33 cm in at least one lateral dimension. In yet other examples, the multiphase films are about 34 cm in at least one lateral dimension. In some examples, the multiphase films are about 35 cm in at least one lateral dimension. In other examples, the multiphase films are about 36 cm in at least one lateral dimension. In yet other examples, the multiphase films are about 37 cm in at least one lateral dimension. In some other examples, the multiphase films are about 38 cm in at least one lateral dimension. In yet other examples, the multiphase films are about 39 cm in at least one lateral dimension. In still other examples, the multiphase films are about 40 cm in at least one lateral dimension. In some examples, the multiphase films are about 41 cm in at least one lateral dimension. In some other examples, the multiphase films are about 42 cm in at least one lateral dimension. In other examples, the multiphase films are about 43 cm in at least one lateral dimension. In yet other examples, the multiphase films are about 44 cm in at least one lateral dimension. In some examples, the multiphase films are about 45 cm in at least one lateral dimension. In other examples, the multiphase films are about 46 cm in at least one lateral dimension. In yet other examples, the multiphase films are about 47 cm in at least one lateral dimension. In some other examples, the multiphase films are about 48 cm in at least one lateral dimension. In yet other examples, the multiphase films are about 49 cm in at least one lateral dimension. In still other examples, the multiphase films are about 50 cm in at least one lateral dimension. In some examples, the multiphase films are about 51 cm in at least one lateral dimension. In some other examples, the multiphase films are about 52 cm in at least one lateral dimension. In other examples, the multiphase films are about 53 cm in at least one lateral dimension. In yet other examples, the multiphase films are about 54 cm in at least one lateral dimension. In some examples, the multiphase films are about 55 cm in at least one lateral dimension. In other examples, the multiphase films are about 56 cm in at least one lateral dimension. In yet other examples, the multiphase films are about 57 cm in at least one lateral dimension. In some other examples, the multiphase films are about 58 cm in at least one lateral dimension. In yet other examples, the multiphase films are about 59 cm in at least one lateral dimension. In still other examples, the multiphase films are about 60 cm in at least one lateral dimension. In some examples, the multiphase films are about 61 cm in at least one lateral dimension. In some other examples, the multiphase films are about 62 cm in at least one lateral dimension. In other examples, the multiphase films are about 63 cm in at least one lateral dimension. In yet other examples, the multiphase films are about 64 cm in at least one lateral dimension. In some examples, the multiphase films are about 65 cm in at least one lateral dimension. In other examples, the multiphase films are about 66 cm in at least one lateral dimension. In yet other examples, the multiphase films are about 67 cm in at least one lateral dimension. In some other examples, the multiphase films are about 68 cm in at least one lateral dimension. In yet other examples, the multiphase films are about 69 cm in at least one lateral dimension. In still other examples, the multiphase films are about 70 cm in at least one lateral dimension. In some examples, the multiphase films are about 71 cm in at least one lateral dimension. In some other examples, the multiphase films are about 72 cm in at least one lateral dimension. In other examples, the multiphase films are about 73 cm in at least one lateral dimension. In yet other examples, the multiphase films are about 74 cm in at least one lateral dimension. In some examples, the multiphase films are about 75 cm in at least one lateral dimension. In other examples, the multiphase films are about 76 cm in at least one lateral dimension. In yet other examples, the multiphase films are about 77 cm in at least one lateral dimension. In some other examples, the multiphase films are about 78 cm in at least one lateral dimension. In yet other examples, the multiphase films are about 79 cm in at least one lateral dimension. In still other examples, the multiphase films are about 80 cm in at least one lateral dimension. In some examples, the multiphase films are about 81 cm in at least one lateral dimension. In some other examples, the multiphase films are about 82 cm in at least one lateral dimension. In other examples, the multiphase films are about 83 cm in at least one lateral dimension. In yet other examples, the multiphase films are about 84 cm in at least one lateral dimension. In some examples, the multiphase films are about 85 cm in at least one lateral dimension. In other examples, the multiphase films are about 86 cm in at least one lateral dimension. In yet other examples, the multiphase films are about 87 cm in at least one lateral dimension. In some other examples, the multiphase films are about 88 cm in at least one lateral dimension. In yet other examples, the multiphase films are about 89 cm in at least one lateral dimension. In still other examples, the multiphase films are about 90 cm in at least one lateral dimension. In some examples, the multiphase films are about 91 cm in at least one lateral dimension. In some other examples, the multiphase films are about 92 cm in at least one lateral dimension. In other examples, the multiphase films are about 93 cm in at least one lateral dimension. In yet other examples, the multiphase films are about 94 cm in at least one lateral dimension. In some examples, the multiphase films are about 95 cm in at least one lateral dimension. In other examples, the multiphase films are about 96 cm in at least one lateral dimension. In yet other examples, the multiphase films are about 97 cm in at least one lateral dimension. In some other examples, the multiphase films are about 98 cm in at least one lateral dimension. In yet other examples, the multiphase films are about 99 cm in at least one lateral dimension. In still other examples, the multiphase films are about 100 cm in at least one lateral dimension. In some examples, the multiphase films are about 101 cm in at least one lateral dimension. In some other examples, the multiphase films are about 102 cm in at least one lateral dimension. In other examples, the multiphase films are about 103 cm in at least one lateral dimension. In yet other examples, the multiphase films are about 104 cm in at least one lateral dimension. In some examples, the multiphase films are about 105 cm in at least one lateral dimension. In other examples, the multiphase films are about 106 cm in at least one lateral dimension. In yet other examples, the multiphase films are about 107 cm in at least one lateral dimension. In some other examples, the multiphase films are about 108 cm in at least one lateral dimension. In yet other examples, the multiphase films are about 109 cm in at least one lateral dimension. In still other examples, the multiphase films are about 110 cm in at least one lateral dimension. In some examples, the multiphase films are about 111 cm in at least one lateral dimension. In some other examples, the multiphase films are about 112 cm in at least one lateral dimension. In other examples, the multiphase films are about 113 cm in at least one lateral dimension. In yet other examples, the multiphase films are about 114 cm in at least one lateral dimension. In some examples, the multiphase films are about 115 cm in at least one lateral dimension. In other examples, the multiphase films are about 116 cm in at least one lateral dimension. In yet other examples, the multiphase films are about 117 cm in at least one lateral dimension. In some other examples, the multiphase films are about 118 cm in at least one lateral dimension. In yet other examples, the multiphase films are about 119 cm in at least one lateral dimension. In still other examples, the multiphase films are about 120 cm in at least one lateral dimension.

In some examples, the garnet-based multiphase films are prepared as a monolith useful for a lithium secondary battery cell. In some of these cells, the form factor for the garnet-based film is a film with a top surface area of about 10 $cm^2$. In certain cells, the form factor for the garnet-based film with a top surface area of about 100 $cm^2$.

In some examples, the multiphase films set forth herein have a Young's Modulus of about 130-150 GPa. In some other examples, the multiphase films set forth herein have a Vicker's hardness of about 5-7 GPa.

In some examples, the multiphase films set forth herein have a porosity less than 20%. In other examples, the multiphase films set forth herein have a porosity less than 10%. In yet other examples, the multiphase films set forth herein have a porosity less than 5%. In still other examples, the multiphase films set forth herein have a porosity less than 4%. In still other examples, the multiphase films set forth herein have a porosity less than 3%. In still other examples, the multiphase films set forth herein have a porosity less than 2%. In still other examples, the multiphase films set forth herein have a porosity less than 1%. Percent (%) porosity is by volume.

In some examples, including any of the foregoing, provided herein is an electrochemical cell having an electrolyte that is a multiphase film described herein.

III. Powders

In some examples, set forth herein are powders. In some examples, the powders include mixtures that include chemical precursors to lithium-stuffed garnet. In some examples, the powders include the calcined products of mixtures, which include chemical precursors to lithium-stuffed garnet. In some examples, the powders include the sintered products of the calcined products of mixtures which include chemical precursors to lithium-stuffed garnet In some examples, the powders herein include a primary cubic phase lithium-stuffed garnet characterized by the chemical formula $Li_A La_B Al_C M''_D Zr_E O_F$, wherein $5<A<8$, $1.5<B<4$, $0.1<C<2$, $0 \leq D<2$; $1<E<3$, $10<F<13$, and M'' is selected from the group consisting of Mo, W, Nb, Y, Ta, Ga, Sb, Ca, Ba, Sr, Ce, Hf, and Rb; a secondary phase inclusion in the primary cubic phase lithium-stuffed garnet; wherein: the primary cubic phase lithium-stuffed garnet is present at about 70-99.9 vol % with respect to the volume of the composition; and the secondary phase inclusion is present at about 30-0.1 vol % with respect to the volume of the composition.

In some examples, including any of the foregoing, the amount of primary cubic phase lithium-stuffed garnet and the amount of secondary phase inclusion sum to the total amount of material in the composition.

In some examples, including any of the foregoing, the secondary phase inclusion $d_{50}$ grain size is less than 10 µm.

In some examples, including any of the foregoing, the secondary phase inclusion $d_{50}$ grain size is from about 1 µm to about 10 µm.

In some examples, including any of the foregoing, the primary cubic phase lithium-stuffed garnet $d_{50}$ grain size is smaller than the secondary phase inclusion $d_{50}$ grain size. In some examples, including any of the foregoing, the primary cubic phase lithium-stuffed garnet $d_{50}$ grain size is larger than the secondary phase inclusion $d_{50}$ grain size.

In some examples, including any of the foregoing, the primary cubic phase lithium-stuffed garnet $d_{50}$ grain size is from about 10 µm to about 20 µm.

In some examples, including any of the foregoing, the primary cubic phase lithium-stuffed garnet grain size $d_{50}$ is from about 0.5 µm-10 µm.

In some examples, including any of the foregoing, the $d_{90}$ grain size of any phase in the powder is from about 1 µm to 5 µm.

Figure 1B:
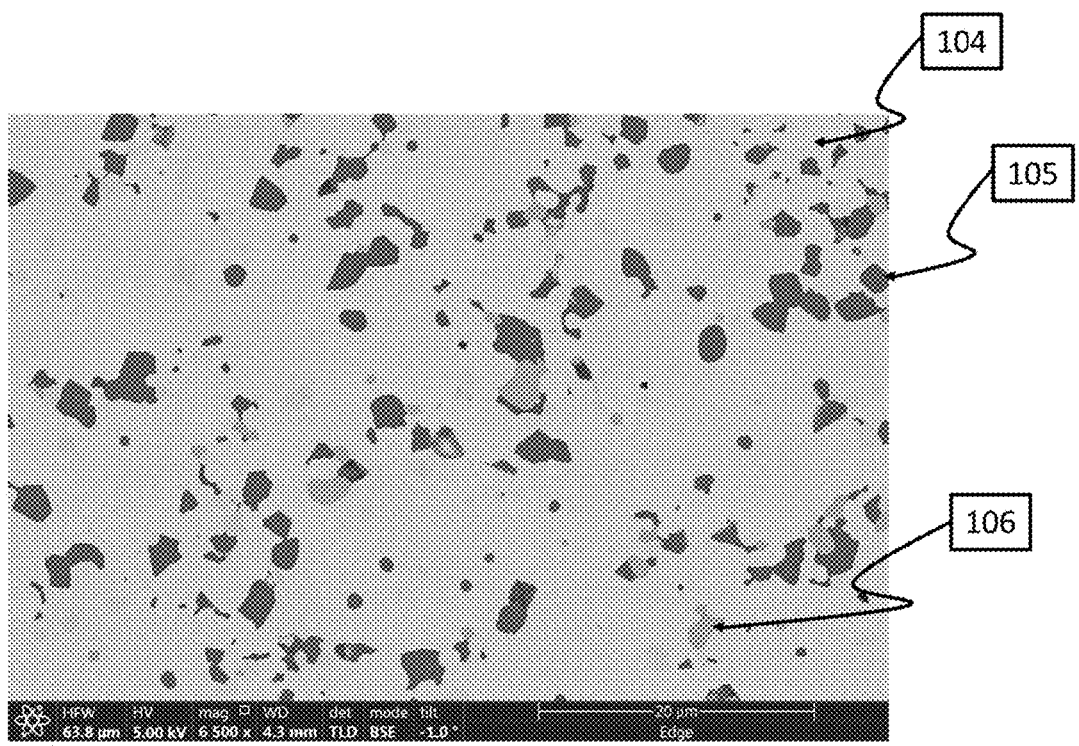
Figure 9:
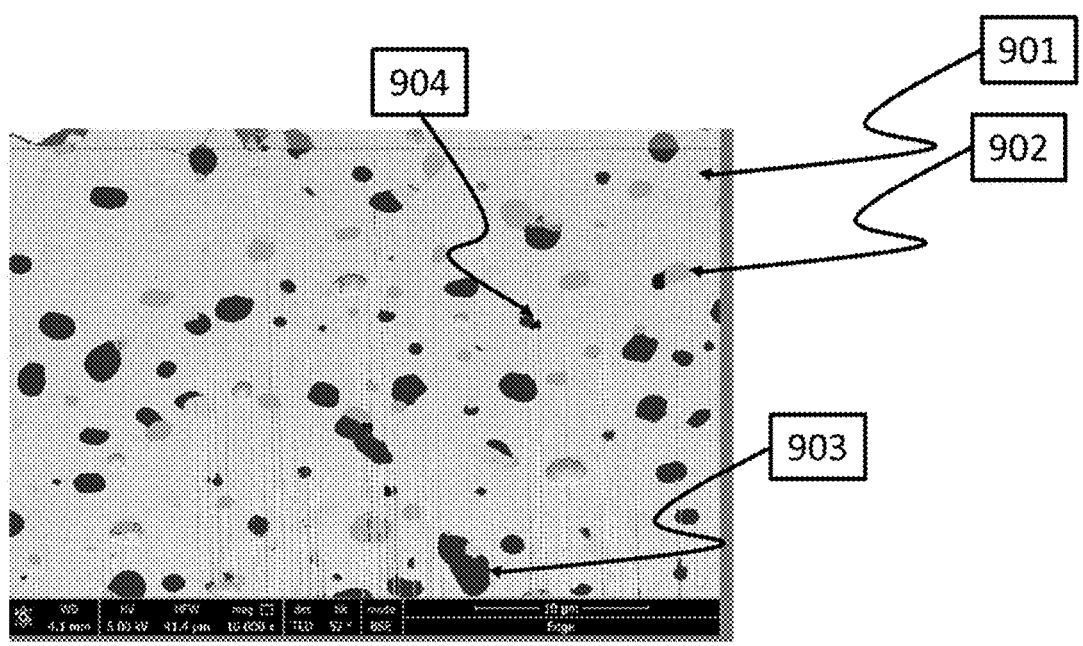
FIG. 9 shows an SEM image of a sintered thin film from Example 8 used for back-scattered imaging and quantification of primary and secondary phases.

In some examples, including any of the foregoing, the $d_{50}$ grain sizes are substantially as shown in any one of FIG. 1B or 9.

In some examples, including any of the foregoing, the secondary phase inclusions are homogenously distributed.

In some examples, including any of the foregoing, the secondary phase inclusions include more than one type of secondary phase inclusions.

In some examples, including any of the foregoing, the secondary phase inclusions include at least two, three or four types of secondary phase inclusions.

In some examples, including any of the foregoing, the secondary phase inclusions are homogenously distributed over a volume of 10000 $µm^3$ or more.

In some examples, including any of the foregoing, the inclusions are homogenously distributed over a volume of 1000 $µm^3$ or more.

In some examples, including any of the foregoing, the ratio of the secondary phase inclusion $d_{50}$ grain size to the primary cubic phase lithium-stuffed garnet $d_{50}$ grain size is between 0.1 and 10.

In some examples, including any of the foregoing, the powder is present in a pellet.

In some examples, including any of the foregoing, the powder is present in a green film.

In some examples, including any of the foregoing, the secondary phase inclusion is a material selected from the group consisting of:

tetragonal phase garnet; $La_2Zr_2O_7$; $La_2O_3$; $LaAlO_3$; $La_2(Li_{0.5}Al_{0.5})O_4$; $LiLaO_2$; $LiZr_2O_3$;

$Li_aZr_bO_c$, wherein $1 \leq a \leq 8$, $1 \leq b \leq 2$, and $1 \leq c \leq 7$, and wherein subscripts a, b, and c are selected so that $Li_aZr_bO_c$ is charge neutral;

$Li_gAl_hO_i$, wherein $1 \leq g \leq 5$, $1 \leq h \leq 5$, and $2 \leq i \leq 8$, and wherein subscripts g, h, i are selected so that $Li_gAl_hO_i$ is charge neutral;

$La_dTa_eO_f$, wherein $1 \leq d \leq 3$, $1 \leq e \leq 7$, and $4 \leq f \leq 19$, and wherein subscripts d, e, and f are selected so that $La_dTa_eO_f$ is charge neutral;

$Li_rTa_sO_t$, wherein $1 \leq r \leq 2$, $1 \leq s \leq 3$, and $3 \leq t \leq 7$, and wherein subscripts r, s, and t are selected so that $Li_rTa_sO_t$ is charge neutral;

$La_nNb_pO_q$, wherein $1 \leq n \leq 3$, $1 \leq p \leq 7$, and $4 \leq q \leq 19$, and wherein subscripts n, p, and q are selected so that $La_nNb_pO_q$ is charge neutral;

$Li_uNb_vO_x$, wherein $1 \leq u \leq 3$, $1 \leq p \leq 3$, and $3 \leq x \leq 9$, and wherein subscripts u, v, and x are selected so that $Li_uNb_vO_x$ is charge neutral; and combinations thereof.

In some examples, including any of the foregoing, the secondary phase inclusion includes at least two materials selected from the group consisting of:

tetragonal phase garnet; $La_2Zr_2O_7$; $La_2O_3$; $LaAlO_3$; $La_2(Li_{0.5}Al_{0.5})O_4$; $LiLaO_2$; $LiZr_2O_3$;

$Li_aZr_bO_c$, wherein $1 \leq a \leq 8$, $1 \leq b \leq 2$, and $1 \leq c \leq 7$, and wherein subscripts a, b, and c are selected so that $Li_aZr_bO_c$ is charge neutral;

$Li_gAl_hO_i$, wherein $1 \leq g \leq 5$, $1 \leq h \leq 5$, and $2 \leq i \leq 8$, and wherein subscripts g, h, i are selected so that $Li_gAl_hO_i$ is charge neutral;

$La_dTa_eO_f$, wherein $1 \leq d \leq 3$, $1 \leq e \leq 7$, and $4 \leq f \leq 19$, and wherein subscripts d, e, and f are selected so that $La_dTa_eO_f$ is charge neutral;

$Li_rTa_sO_t$, wherein $1 \leq r \leq 2$, $1 \leq s \leq 3$, and $3 \leq t \leq 7$, and wherein subscripts r, s, and t are selected so that $Li_rTa_sO_t$ is charge neutral;

$La_nNb_pO_q$, wherein $1 \leq n \leq 3$, $1 \leq p \leq 7$, and $4 \leq q \leq 19$, and wherein subscripts n, p, and q are selected so that $La_nNb_pO_q$ is charge neutral; and $Li_uNb_vO_x$, wherein $1 \leq u \leq 3$, $1 \leq p \leq 3$, and $3 \leq x \leq 9$, and wherein subscripts u, v, and x are selected so that $Li_uNb_vO_x$ is charge neutral.

In some examples, including any of the foregoing, the secondary phase inclusion includes at least three materials selected from the group consisting of:

tetragonal phase garnet; $La_2Zr_2O_7$; $La_2O_3$; $LaAlO_3$; $La_2(Li_{0.5}Al_{0.5})O_4$; $LiLaO_2$; $LiZr_2O_3$;

$Li_aZr_bO_c$, wherein $1 \leq a \leq 8$, $1 \leq b \leq 2$, and $1 \leq c \leq 7$, and wherein subscripts a, b, and c are selected so that $Li_aZr_bO_c$ is charge neutral;

$Li_gAl_hO_i$, wherein $1 \leq g \leq 5$, $1 \leq h \leq 5$, and $2 \leq i \leq 8$, and wherein subscripts g, h, i are selected so that $Li_gAl_hO_i$ is charge neutral;

$La_dTa_eO_f$, wherein $1 \leq d \leq 3$, $1 \leq e \leq 7$, and $4 \leq f \leq 19$, and wherein subscripts d, e, and f are selected so that $La_dTa_eO_f$ is charge neutral;

$Li_rTa_sO_t$, wherein $1 \leq r \leq 2$, $1 \leq s \leq 3$, and $3 \leq t \leq 7$, and wherein subscripts r, s, and t are selected so that $Li_rTa_sO_t$ is charge neutral;

$La_nNb_pO_q$, wherein $1 \leq n \leq 3$, $1 \leq p \leq 7$, and $4 \leq q \leq 19$, and wherein subscripts n, p, and q are selected so that $La_nNb_pO_q$ is charge neutral; and $Li_uNb_vO_x$, wherein $1 \leq u \leq 3$, $1 \leq p \leq 3$, and $3 \leq x \leq 9$, and wherein subscripts u, v, and x are selected so that $Li_uNb_vO_x$ is charge neutral.

In some examples, including any of the foregoing, the secondary phase inclusion includes at least four materials selected from the group consisting of:

tetragonal phase garnet; $La_2Zr_2O_7$; $La_2O_3$; $LaAlO_3$; $La_2(Li_{0.5}Al_{0.5})O_4$; $LiLaO_2$; $LiZr_2O_3$;

$Li_aZr_bO_c$, wherein $1 \leq a \leq 8$, $1 \leq b \leq 2$, and $1 \leq c \leq 7$, and wherein subscripts a, b, and c are selected so that $Li_aZr_bO_c$ is charge neutral;

$Li_gAl_hO_i$, wherein $1 \leq g \leq 5$, $1 \leq h \leq 5$, and $2 \leq i \leq 8$, and wherein subscripts g, h, i are selected so that $Li_gAl_hO_i$ is charge neutral;

$La_dTa_eO_f$, wherein $1 \leq d \leq 3$, $1 \leq e \leq 7$, and $4 \leq f \leq 19$, and wherein subscripts d, e, and f are selected so that $La_dTa_eO_f$ is charge neutral;

$Li_rTa_sO_t$, wherein $1 \leq r \leq 2$, $1 \leq s \leq 3$, and $3 \leq t \leq 7$, and wherein subscripts r, s, and t are selected so that $Li_rTa_sO_t$ is charge neutral;

$La_nNb_pO_q$, wherein $1 \leq n \leq 3$, $1 \leq p \leq 7$, and $4 \leq q \leq 19$, and wherein subscripts n, p, and q are selected so that $La_nNb_pO_q$ is charge neutral; and $Li_uNb_vO_x$, wherein $1 \leq u \leq 3$, $1 \leq p \leq 3$, and $3 \leq x \leq 9$, and wherein subscripts u, v, and x are selected so that $Li_uNb_vO_x$ is charge neutral.

In some examples, including any of the foregoing, the total amount of secondary phase inclusion is 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 vol %.

In some examples, including any of the foregoing, the secondary phase inclusion comprises $La_2Zr_2O_7$; $LiAlO_2$; $LaAlO_3$; tetragonal garnet; and $Li_2ZrO_3$.

In some examples, including any of the foregoing, the secondary phase inclusion includes $La_2Zr_2O_7$; tetragonal garnet; $Li_aZr_bO_c$, wherein $1 \leq a \leq 8$, $1 \leq b \leq 2$, and $1 \leq c \leq 7$, and wherein subscripts a, b, and c are selected so that $Li_aZr_bO_c$ is charge neutral; $La_dTa_eO_f$, wherein $1 \leq d \leq 3$, $1 \leq e \leq 7$, and $4 \leq f \leq 19$, and wherein subscripts d, e, and f are selected so that $La_dTa_eO_f$ is charge neutral; and $Li_rTa_sO_t$, wherein $1 \leq r \leq 2$, $1 \leq s \leq 3$, and $3 \leq t \leq 7$, and wherein subscripts r, s, and t are selected so that $Li_rTa_sO_t$ is charge neutral.

In some examples, including any of the foregoing, the secondary phase inclusion includes $La_2Zr_2O_7$; tetragonal garnet; $Li_aZr_bO_c$, wherein $1 \leq a \leq 8$, $1 \leq b \leq 2$, and $1 \leq c \leq 7$, and wherein subscripts a, b, and c are selected so that $Li_aZr_bO_c$ is charge neutral; $La_nNb_pO_q$, wherein $1 \leq n \leq 3$, $1 \leq p \leq 7$, and $4 \leq q \leq 19$, and wherein subscripts n, p, and q are selected so that $La_nNb_pO_q$ is charge neutral; and $Li_uNb_vO_x$, wherein $1 \leq u \leq 3$, $1 \leq p \leq 3$, and $3 \leq x \leq 9$, and wherein subscripts u, v, and x are selected so that $Li_uNb_vO_x$ is charge neutral.

In some examples, including any of the foregoing, the secondary phase inclusion in the powder includes $LiAlO_2$ present in the composition at about 0.1-25 vol %, $Li_2ZrO_3$ present in the composition at about 0.1-15 vol % and $LaAlO_3$ present in the composition at about 0.1-15 vol %, as measured by quantitative XRD.

In some examples, including any of the foregoing, the secondary phase inclusion in the composition comprises $LiAlO_2$ present in the composition at about 3-8 vol %, $Li_2ZrO_3$ present in the composition at about 1-10 vol % and $LaAlO_3$ present in the composition at about 1-8 vol %, as measured by quantitative XRD.

In some examples, including any of the foregoing, the density of the composition is 4.6-5.2 $g/cm^3$ as measured by the Archimedes method.

In some examples, including any of the foregoing, the density of the composition is about 4.9 $g/cm^3$ as measured by the Archimedes method.

In some examples, including any of the foregoing, pyrochlore is present in the powder at less than 20 vol % as measured by quantitative XRD after the electrolyte is heated at 850° C. for 2 hours.

In some examples, including any of the foregoing, the composition has a total porosity of less than 5 vol % as determined by SEM.

In some examples, including any of the foregoing, the 90th percentile largest pore has no lateral extent larger than 5 Lm as measured by cross-section electron microscopy.

In some examples, including any of the foregoing, provided herein is a green film comprising a powder.

In some examples, the lithium-stuffed garnet powders set forth herein are nanodimensioned or nanostructured. As such, these powders comprise crystalline domains of lithium-stuffed garnet wherein the median crystalline domains have a $d_{50}$ median crystalline domain size are about 0.5 nm to about 10 Lm in physical dimensions (e.g., diameter). Grains, herein is used interchangeably to describe crystallite domains, unless specified otherwise to the contrary. In some examples, the median crystalline domains are about 0.5 nm in diameter. In some other examples, the median crystalline domains are about 1 nm in diameter. In other examples, the median crystalline domains are about 1.5 nm in diameter. In yet other examples, the median crystalline domains are about 2 nm in diameter. In still other examples, the median crystalline domains are about 2.5 nm in diameter. In some examples, the median crystalline domains are about 3.0 nm in diameter. In yet other examples, the median crystalline domains are about 3.5 nm in diameter. In other examples, the median crystalline domains are about 4.0 nm in diameter. In some examples, the median crystalline domains are about 5 nm in diameter. In some other examples, the median crystalline domains are about 5.5 nm in diameter. In other examples, the median crystalline domains are about 6.0 nm in diameter. In yet other examples, the median crystalline domains are about 6.5 nm in diameter. In still other examples, the median crystalline domains are about 7.0 nm in diameter. In some examples, the median crystalline domains are about 7.5 nm in diameter. In yet other examples, the median crystalline domains are about 8.0 nm in diameter. In other examples, the median crystalline domains are about 8.5 nm in diameter. In some examples, the median crystalline domains are about 8.5 nm in diameter. In some other examples, the median crystalline domains are about 9 nm in diameter. In other examples, the median crystalline domains are about 9.5 nm in diameter. In yet other examples, the median crystalline domains are about 10 nm in diameter. In still other examples, the median crystalline domains are about 10.5 nm in diameter. In some examples, the median crystalline domains are about 11.0 nm in diameter. In yet other examples, the median crystalline domains are about 11.5 nm in diameter. In other examples, the median crystalline domains are about 12.0 nm in diameter. In some examples, the median crystalline domains are about 12.5 nm in diameter. In some other examples, the median crystalline domains are about 13.5 nm in diameter. In other examples, the median crystalline domains are about 14.0 nm in diameter. In yet other examples, the median crystalline domains are about 14.5 nm in diameter. In still other examples, the median crystalline domains are about 15.0 nm in diameter. In some examples, the median crystalline domains are about 15.5 nm in diameter. In yet other examples, the median crystalline domains are about 16.0 nm in diameter. In other examples, the median crystalline domains are about 16.5 nm in diameter. In some examples, the median crystalline domains are about 17 nm in diameter. In some other examples, the median crystalline domains are about 17.5 nm in diameter. In other examples, the median crystalline domains are about 18 nm in diameter. In yet other examples, the median crystalline domains are about 18.5 nm in diameter. In still other examples, the median crystalline domains are about 19 nm in diameter. In some examples, the median crystalline domains are about 19.5 nm in diameter. In yet other examples, the median crystalline domains are about 20 nm in diameter. In other examples, the median crystalline domains are about 20.5 nm in diameter. In some examples, the median crystalline domains are about 21 nm in diameter. In some other examples, the median crystalline domains are about 21.5 nm in diameter. In other examples, the median crystalline domains are about 22.0 nm in diameter. In yet other examples, the median crystalline domains are about 22.5 nm in diameter. In still other examples, the median crystalline domains are about 23.0 nm in diameter. In some examples, the median crystalline domains are about 23.5 nm in diameter. In yet other examples, the median crystalline domains are about 24.0 nm in diameter. In other examples, the median crystalline domains are about 24.5 nm in diameter. In some examples, the median crystalline domains are about 25.5 nm in diameter. In some other examples, the median crystalline domains are about 26 nm in diameter. In other examples, the median crystalline domains are about 26.5 nm in diameter. In yet other examples, the median crystalline domains are about 27 nm in diameter. In still other examples, the median crystalline domains are about 27.5 nm in diameter. In some examples, the median crystalline domains are about 28.0 nm in diameter. In yet other examples, the median crystalline domains are about 28.5 nm in diameter. In other examples, the median crystalline domains are about 29.0 nm in diameter. In some examples, the median crystalline domains are about 29.5 nm in diameter. In some other examples, the median crystalline domains are about 30 nm in diameter. In other examples, the median crystalline domains are about 30.5 nm in diameter. In yet other examples, the median crystalline domains are about 31 nm in diameter. In still other examples, the median crystalline domains are about 32 nm in diameter. In some examples, the median crystalline domains are about 33 nm in diameter. In yet other examples, the median crystalline domains are about 34 nm in diameter. In other examples, the median crystalline domains are about 35 nm in diameter. In some examples, the median crystalline domains are about 40 nm in diameter. In some other examples, the median crystalline domains are about 45 nm in diameter. In other examples, the median crystalline domains are about 50 nm in diameter. In yet other examples, the median crystalline domains are about 55 nm in diameter. In still other examples, the median crystalline domains are about 60 nm in diameter. In some examples, the median crystalline domains are about 65 nm in diameter. In yet other examples, the median crystalline domains are about 70 nm in diameter. In other examples, the median crystalline domains are about 80 nm in diameter. In some examples, the median crystalline domains are about 85 nm in diameter. In some other examples, the median crystalline domains are about 90 nm in diameter. In other examples, the median crystalline domains are about 100 nm in diameter. In yet other examples, the median crystalline domains are about 125 nm in diameter. In still other examples, the median crystalline domains are about 150 nm in diameter. In some examples, the median crystalline domains are about 200 nm in diameter. In yet other examples, the median crystalline domains are about 250 nm in diameter. In other examples, the median crystalline domains are about 300 nm in diameter. In some examples, the median crystalline domains are about 350 nm in diameter. In some other examples, the median crystalline domains are about 400 nm in diameter. In other examples, the median crystalline domains are about 450 nm in diameter. In yet other examples, the median crystalline domains are about 500 nm in diameter. In still other examples, the median crystallite domains are about 550 nm in diameter. In some examples, the median crystalline domains are about 600 nm in diameter. In yet other examples, the median crystalline domains are about 650 nm in diameter. In other examples, the median crystalline domains are about 700 nm in diameter. In some examples, the median crystalline domains are about 750 nm in diameter. In some other examples, the median crystalline domains are about 800 nm in diameter. In other examples, the median crystalline domains are about 850 nm in diameter. In yet other examples, the median crystalline domains are about 900 nm in diameter. In still other examples, the median crystalline domains are about 950 nm in diameter. In some examples, the median crystalline domains are about 1000 nm in diameter. In some examples, the median crystalline domains are about 2 µm in diameter. In some examples, the median crystalline domains are about 3 µm in diameter. In some examples, the median crystalline domains are about 4 µm in diameter. In some examples, the median crystalline domains are about 5 µm in diameter. In some examples, the median crystalline domains are about 6 µm in diameter. In some examples, the median crystalline domains are about 7 µm in diameter. In some examples, the median crystalline domains are about 8 µm in diameter. In some examples, the median crystalline domains are about 9 µm in diameter. In some examples, the median crystalline domains are about 10 µm in diameter.

IV. Garnet Materials Suitable for Use in the Multiphase Films and Powders

In some examples, disclosed herein are nanostructured lithium-stuffed garnet-based powder. Also, disclosed herein are lithium-stuffed garnet thin films that have grains therein less than 10 µm in physical dimensions, e.g., $d_{50}$ grain sizes less than 10 µm. In some examples, these films are less than 200 µm in film thickness. In some examples, these films are less than 100 µm in film thickness. In some examples, these films are less than 75 µm in film thickness. In some examples, these films are less than 50 µm in film thickness. In some of these examples, the films, which are less than 50 µm in film thickness, are several centimeters to several meters in length. In some examples, the films have a high ionic conductivity, which in some examples is greater than $10^{-4}$ S/cm at room temperature. In some examples, the films are strong, have good mechanical integrity, and prevent the ingress of lithium dendrites when used as an electrolyte in lithium secondary batteries. Some of these films are layered onto cathode active materials and optionally binders, dispersants, solvents, salts, and other electron and ionic conductors.

In certain examples, the garnet material is selected from $Li_4La_BM'_CM''_DZr_EO_F$, wherein $4<A<8.5$, $1.5<B<4$, $0.1<C\leq2$, $0\leq D\leq2$; $1\leq E<3$, $10<F<13$, and M'=Al and M'' is selected from Mo, W, Y, Nb, Sb, Ca, Ba, Sr, Ce, Hf, and Rb.

In certain examples, the garnet material is selected from $Li_aLa_bZr_cAl_dM''_eO_f$, wherein $5<a<7.7$; $2<b<4$; $0<c\leq2.5$; $0\leq d<2$; $0\leq e<3$, $10<f<14$ and M'' is a metal selected from Nb, Ta, V, W, Ga, Mo, and Sb.

In some examples, the garnet material described herein is used as an electrolyte. In some of these embodiments, the garnet has the formula $Li_xLa_3Zr_2O_{12}\cdot y\frac{1}{2}Al_2O_3$; wherein $5.0<x<9$ and $0.1<y<1.5$. In some of these examples, the electrolyte is $Li_xLa_3Zr_2O_{12}\cdot 0.35Al_2O_3$. In other of these examples, the electrolyte is $Li_7La_3Zr_2O_{12}\cdot 0.35Al_2O_3$.

In some of the examples wherein the garnet is an electrolyte, the garnet does not include any Nb, W or Mo.

In some examples, the lithium-stuffed garnet is $Li_7La_3Zr_2O_{12}$ (LLZ) and is doped with alumina. In certain examples, the LLZ is doped by adding $Al_2O_3$ to the mixture of chemical precursors that is used to make the LLZ. In certain other examples, the LLZ is doped by the aluminum in an aluminum reaction vessel that contacts the LLZ.

In some examples, the alumina doped LLZ has a high ionic conductivity, e.g., greater than $10^{-4}$ S/cm at room temperature.

In some examples, a higher conductivity is observed when some of the Zr in LLZ is partially replaced by a higher valence species, e.g., Nb, Sb, or combinations thereof. In some examples, the conductivity reaches as high as $10^{-3}$ S/cm at room temperature.

In some examples, the lithium-stuffed garnet set forth herein is $Li_xA_3M_2O_{12}$ doped with 0.35 molar amount of Al per $Li_xA_3M_2O_{12}$. In certain of these examples, x is about 5. In certain other examples, x is about 5.5. In yet other examples, x is about 6.0. In some other examples, x is about 6.5. In still other examples, x is about 7.0. In some other examples, x is about 7.5.

In some examples, the lithium-stuffed garnet is doped with about 0.2, 0.25, 0.3, 0.35, 0.4, 0.45, 0.5, 0.55, 0.6, 0.65, 0.7, 0.75, 0.8, 0.85, 0.9, 0.95, or 1, 1.1, 1.2, 1.3, 1.4 molar amount of Al per $Li_xA_3M_2O_{12}$.

In some examples, the lithium-stuffed garnet is doped with 0.35 molar amount of Al per $Li_xA_3M_2O_{12}$.

In the examples, herein, the subscripts and molar coefficients in the empirical formulas are based on the quantities of raw materials initially batched to make the described examples.

In some examples, the instant disclosure provides a composition including a lithium-stuffed garnet and $Al_2O_3$. In certain examples, the lithium-stuffed garnet is doped with alumina. In some examples, the lithium-stuffed garnet is characterized by the empirical formula $Li_ALa_BM'_CM''_DZr_EO_F$, wherein $5<A<8$, $1.5<B<4$, $0.1<C\leq2$, $0\leq D\leq2$; $1\leq E\leq2$, $10<F\leq13$, and M'=Al and M'' is either absent or is independently selected from Mo, W, Nb, Sb, Ca, Ba, Sr, Ce, Hf, and Rb; and wherein the molar ratio of Garnet:$Al_2O_3$ is between 1:0.05 and 1:0.7.

In some examples, the lithium-stuffed garnet is $Li_ALa_BZr_CM'_DM''_EO_{12}$ and $5<A<7.7$, $2<B<4$, $0<C<2.5$, M' comprises a metal dopant selected from a material including Al and $0<D<2$, M'' comprises a metal dopant selected from a material including Nb, V, W, Mo, Sb, and wherein $0<e<2$. In some of the examples above, A is about 5.9-7. In some examples, A is 5.9. In other examples, A is 6.0. In some other examples, A is 6.1. In some examples, A is 6.2. In some examples, A is 6.3. In some examples, A is 6.4. In some examples, A is 6.5. In some other examples, A is 6.6. In other examples, A is 6.6. In some examples, A is 6.7. In some other examples, A is 6.8. In some examples, A is 6.9. In some examples, A is 7.0. In other examples, A is 7.1. In some examples, A is 7.2. In some other examples, A is 7.3. In some examples, A is 7.4. In some other examples, A is 7.5. In some examples, A is 7.6. In some other examples, A is 7.7. In some examples, A is 7.8. In some other examples, A is 7.9. In some examples, A is 8.0. In some other examples, A is 8.1. In some examples, A is 8.2. In some other examples, A is 8.3. In some examples, A is 8.4. In some other examples, A is 8.5. In some examples, A is 8.6. In some other examples, A is 8.7. In some examples, A is 8.8. In some other examples, A is 8.9. In some examples, A is 9.0. In some other examples, A is 9.1. Yet in some other examples, A is 9.2. In some examples, A is 9.3. In some other examples, A is 9.4. In some other examples, A is 9.5. In some other examples, A is 9.6. In some examples, A is 9.7.

In some examples, including any of the foregoing, B is about 2. In some other examples, B is about 2.5. In other examples, B is about 3.0. In certain other examples, B is about 3.5. In yet other examples, B is about 3.5. In yet other examples, B is about 4.0.

In some examples, including any of the foregoing, C is 0.5. In other examples, C is 0.6. In some other examples, C is 0.7. In some other examples, C is 0.8. In certain other examples, C is 0.9. In other examples, C is 1.0. In yet other examples, C is 1.1. In certain examples, C is 1.2. In other examples, C is 1.3. In some other examples, C is 1.4. In some other examples, C is 1.5. In certain other examples, C is 1.6. In other examples, C is 1.7. In yet other examples, C is 1.8. In certain examples, C is 1.9. In yet other examples, C is 2.0. In other examples, C is 2.1. In some other examples, C is 2.2. In some other examples, C is 2.3. In certain other examples, C is 2.4. In other examples, C is 2.5. In yet other examples, C is 2.6. In certain examples, C is 2.7. In yet other examples, C is 2.8. In other examples, C is 2.9. In some other examples, C is 3.0.

In some examples, including any of the foregoing, D is 0.5. In other examples, D is 0.6. In some other examples, D is 0.7. In some other examples, D is 0.8. In certain other examples, D is 0.9. In other examples, D is 1.0. In yet other examples, D is 1.1. In certain examples, D is 1.2. In other examples, D is 1.3. In some other examples, D is 1.4. In some other examples, D is 1.5. In certain other examples, D is 1.6. In other examples, D is 1.7. In yet other examples, D is 1.8. In certain examples, D is 1.9. In yet other examples, D is 2.0. In other examples, D is 2.1. In some other examples, D is 2.2. In some other examples, D is 2.3. In certain other examples, D is 2.4. In other examples, D is 2.5. In yet other examples, D is 2.6. In certain examples, D is 2.7. In yet other examples, D is 2.8. In other examples, D is 2.9. In some other examples, D is 3.0.

In some examples, including any of the foregoing, E is 0.5. In other examples, E is 0.6. In some other examples, E is 0.7. In some other examples, E is 0.8. In certain other examples, E is 0.9. In other examples, E is 1.0. In yet other examples, E is 1.1. In certain examples, E is 1.2. In other examples, E is 1.3. In some other examples, E is 1.4. In some other examples, E is 1.5. In certain other examples, E is 1.6. In other examples, E is 1.7. In yet other examples, E is 1.8. In certain examples, E is 1.9. In yet other examples, E is 2.0. In other examples, E is 2.1. In some other examples, E is 2.2. In some other examples, E is 2.3. In certain other examples, E is 2.4. In other examples, E is 2.5. In yet other examples, E is 2.6. In certain examples, E is 2.7. In yet other examples, E is 2.8. In other examples, E is 2.9. In some other examples, E is 3.0.

In some examples, including any of the foregoing, F is 11.1. In other examples, F is 11.2. In some other examples, F is 11.3. In some other examples, F is 11.4. In certain other examples, F is 11.5. In other examples, F is 11.6. In yet other examples, F is 11.7. In certain examples, F is 11.8. In other examples, F is 11.9. In some other examples, F is 12. In some other examples, F is 12.1. In certain other examples, F is 12.2. In other examples, F is 12.3. In yet other examples, F is 12.3. In certain examples, F is 12.4. In yet other examples, F is 12.5. In other examples, F is 12.6. In some other examples, F is 12.7. In some other examples, F is 12.8. In certain other examples, E is 12.9. In other examples, F is 13.

In some examples, including any of the foregoing, provided herein is a composition characterized by the empirical formula $Li_xLa_3Zr_2O_{12} \cdot y\frac{1}{2}Al_2O_3$; wherein $5.0<x<9$ and $0.1<y<1.5$. In some examples, x is 5. In other examples, x is 5.5. In some examples, x is 6. In some examples, x is 6.5. In other examples, x is 7. In some examples, x is 7.5. In other examples x is 8. In some examples, y is 0.3. In some examples, y is 0.35. In other examples, y is 0.4. In some examples, y is 0.45. In some examples, y is 0.5. In other examples, y is 0.55. In some examples, y is 0.6. In other examples y is 0.7. In some examples, y is 0.75. In other examples, y is 0.8. In some examples, y is 0.85. In other examples y is 0.9. In some examples, y is 0.95. In other examples, y is 1.0. x and y are selected to that the compound, $Li_xLa_3Zr_2O_{12} \cdot y^{12}Al_2O_3$, is charge neutral.

In some examples, including any of the foregoing, herein is a composition is characterized by the empirical formula $Li_7La_3Zr_2O_{12} \cdot 0.35Al_2O_3$.

In some examples, including any of the foregoing, A is 5, 6, 7, or 8. In certain examples, wherein A is 7.

In some examples, including any of the foregoing, E is 1, 1.5, or 2. In certain examples, E is 2.

In some examples, including any of the foregoing, C and D are 0.

In some examples, provided herein is a composition wherein the molar ratio of Garnet:$Al_2O_3$ is between 1:0.1 and 1:0.65.

In some examples, provided herein is a composition wherein the molar ratio of Garnet:$Al_2O_3$ is between 1:0.15 and 1:0.55.

In some examples, provided herein is a composition wherein the molar ratio of Garnet:$Al_2O_3$ is between 1:0.25 and 1:0.45.

In some examples, provided herein is a composition wherein the molar ratio of Garnet:$Al_2O_3$ is 1:0.35.

In some examples, provided herein is a composition wherein the molar ratio of Al to garnet is 0.35.

In some examples, provided herein is a composition wherein the lithium-stuffed garnet is characterized by the empirical formula $Li_7La_3Zr_2O_{12}$ and is doped with aluminum.

In some examples, the lithium-stuffed garnet is $Li_7La_3Zr_2O_{12}$ (LLZ) and is doped with alumina. In certain examples, the LLZ is doped by adding $Al_2O_3$ to the reactant precursor mix that is used to make the LLZ. In certain other examples, the LLZ is doped by the aluminum in an aluminum reaction vessel that contacts the LLZ. When the LLZ is doped with alumina, results suggest that, without being bound by theory, $Al^{3+}$ replaces $Li^+$. In these examples, one $Al^{3+}$ replaces 3 $Li^+$ ions. In doing so, the doping of $Al^{3+}$ in LLZ creates $Li^+$ vacancies. These $Li^+$ vacancies create holes into which conducting $Li^+$ ions can conduct. Doping lithium-stuffed garnets with alumina (or replacing $Li^+$ with $Al^{3+}$) increases the stability of the cubic, conducting phase of the lithium-stuffed garnet relative to the tetragonal, lower conductivity phase of garnet. In some examples, this increased conductivity is referred to as increased ionic conductivity. In some examples, this increased conductivity is referred to as increased Li conductivity.

V. Secondary Phases in the Multiphase Films and Powders

Set forth herein are compositions, powders, films, multiphase films, pellets, and monoliths that include cubic lithium-stuffed garnet and secondary phases.

In some examples, including any of the foregoing, the secondary phase is selected from the group consisting tetragonal garnet, $Li_xAl_yO_z$ (x is 1-5; y is 1-5; z is 2-8), $LiZr_2O_3$, $La_2Zr_2O_7$, $La_2O_3$, $Li_xZr_yO_z$ (x is 2-8; y is 0-1; z is 1-6), $LaAlO_3$, $La_2(Li_{0.5}Al_{0.5})O_4$, $LiLaO_2$, and any combination thereof.

In some examples, including any of the foregoing, the secondary phase is tetragonal garnet.

In some examples, including any of the foregoing, the secondary phase is $Li_xAl_yO_z$ (x is 1-5; y is 1-5; z is 2-8) and $LiZr_2O_3$.

In some examples, including any of the foregoing, the secondary phase is $Li_xAl_yO_z$ (x is 1-5; y is 1-5; z is 2-8) and $La_2Zr_2O_7$.

In some examples, including any of the foregoing, the secondary phase is $Li_xAl_yO_z$ (x is 1-5; y is 1-5; z is 2-8) and $Li_xZr_yO_z$ (x is 2-8; y is 0-1; z is 1-6).

In some examples, including any of the foregoing, the secondary phase is $Li_xAl_yO_z$ (x is 1-5; y is 1-5; z is 2-8) and $LaAlO_3$.

In some examples, including any of the foregoing, the secondary phase is $Li_xAl_yO_z$ (x is 1-5; y is 1-5; z is 2-8) and tetragonal garnet.

In some examples, including any of the foregoing, the secondary phase is $Li_xAl_yO_z$ (x is 1-5; y is 1-5; z is 2-8) and $La_2(Li_{0.5}Al_{0.5})O_4$.

In some examples, including any of the foregoing, the secondary phase is $Li_xAl_yO_z$ (x is 1-5; y is 1-5; z is 2-8) and $LiLaO_2$.

In some examples, including any of the foregoing, the secondary phase is $LiZr_2O_3$ and $La_2Zr_2O_7$.

In some examples, including any of the foregoing, the secondary phase is $LiZr_2O_3$ and $La_2O_3$.

In some examples, including any of the foregoing, the secondary phase is $LiZr_2O_3$ and $Li_xZr_yO_z$ (x is 2-8; y is 0-1; z is 1-6).

In some examples, including any of the foregoing, the secondary phase is $LiZr_2O_3$ and $LaAlO_3$.

In some examples, including any of the foregoing, the secondary phase is $LiZr_2O_3$ and $La_2(Li_{0.5}Al_{0.5})O_4$.

In some examples, including any of the foregoing, the secondary phase is $LiZr_2O_3$ and $LiLaO_2$. In some examples, including any of the foregoing, the secondary phase is $LiZr_2O_3$ and tetragonal garnet.

In some examples, including any of the foregoing, the secondary phase is $Li_xAl_yO_z$ (x is 1-5; y is 1-5; z is 2-8). In some examples, in $Li_xAl_yO_z$, x is 1. In other examples, x is 1.5. In other examples, x is 2. In other examples, x is 2.5. In other examples, x is 3. In other examples, x is 3.5. In other examples, x is 4. In other examples, x is 4.5. In other examples, x is 5.

In some examples, including any of the foregoing, the secondary phase is $Li_xAl_yO_z$ (x is 1-5; y is 1-5; z is 2-8). In some examples, in $Li_xAl_yO_z$, y is 1. In other examples, y is 1.5. In other examples, y is 2. In other examples, y is 2.5. In other examples, y is 3. In other examples, y is 3.5. In other examples, y is 4. In other examples, y is 4.5. In other examples, y is 5.

In some examples, including any of the foregoing, the secondary phase is $Li_xAl_yO_z$ (x is 1-5; y is 1-5; z is 2-8). In some examples, in $Li_xAl_yO_z$, z is 2. In other examples, z is 2.5. In other examples, z is 3. In other examples, z is 3.5. In other examples, z is 4. In other examples, z is 4.5. In other examples, z is 5. In other examples, z is 5.5. In other examples, z is 6. In other examples, z is 6.5. In other examples, z is 7. In other examples, z is 7.5. In other examples, z is 8.

In some examples, including any of the foregoing, the secondary phase is $Li_xZr_yO_z$ (x is 2-8; y is 0-1; z is 1-6). In some examples, in $Li_xZr_yO_z$, x is 2. In other examples, x is 2.5. In other examples, x is 3. In other examples, x is 3.5. In other examples, x is 4. In other examples, x is 4.5. In other examples, x is 5. In other examples, x is 5.5. In other examples, x is 6. In other examples, x is 7. In other examples, x is 7.5. In other examples, x is 8.

In some examples, including any of the foregoing, the secondary phase is $Li_xZr_yO_z$ (x is 2-8; y is 0-1; z is 1-6). In some examples, in $Li_xZr_yO_z$, y is 0. In other examples, y is 1. In other examples, y is 2.

In some examples, the secondary phase material is $Li_xZr_yO_z$ (x is 2-8; y is 0-1; z is 1-7). In some examples, in $Li_xZr_yO_z$, z is 1. In other examples, z is 1.5. In other examples, z is 2. In other examples, z is 2.5. In other examples, z is 3. In other examples, z is 3.5. In other examples, z is 4. In other examples, z is 4.5. In other examples, z is 5. In other examples, z is 5.5. In other examples, z is 6. In other examples, z is 7.

In some examples, including any of the foregoing, the secondary phase, the secondary phase may include $Li_5GaO_4$, $LiGaO_2$, $LiGa_5O_8$, $La_3Ga_5O_{12}$, or $La_4Ga_2O_9$.

In some examples, including any of the foregoing, the secondary phase the secondary phase material may include $Li_2O$ or $Li_2O_2$.

In some examples, including any of the foregoing, the secondary phase the secondary phase material may include $Li_3NbO_4$, $Li_8Nb_2O_9$, $LiNb_3O_8$, $LiNbO_2$, $LiNbO_3$, $La_3NbO_7$, $LaNb_7O_{12}$, $LaNbO_4$, $NbO$, $NbO_2$, or $Nb_2O_5$.

In some examples, including any of the foregoing, the secondary phase the secondary phase material may include $Li_3TaO_4$, $Li_5TaO_5$, $LiTa_3O_5$, $LiTaO_3$, $Ta_2O_5$, $La_3TaO_7$, $LaTa_3O_9$, $LaTa_7O_{19}$, or $LaTaO_4$.

In some examples, including any of the foregoing, the secondary phase the total secondary phase material is between 30-0.1 vol % as measured by quantitative XRD or back-scattered electron microscopy with quantitative image analysis after preparation by a focused-ion beam cross-section.

In some examples, including any of the foregoing, the amount of secondary phase present, with respect to the total amount of primary and secondary phases, is 0.1% by volume. In some examples, the amount of secondary phase present, with respect to the total amount of primary and secondary phases, is 0.5% by volume. In some examples, the amount of secondary phase present, with respect to the total amount of primary and secondary phases, is 1% by volume. In some examples, the amount of secondary phase present, with respect to the total amount of primary and secondary phases, is 1.5% by volume. In some examples, the amount of secondary phase present, with respect to the total amount of primary and secondary phases, is 2% by volume. In some examples, the amount of secondary phase present, with respect to the total amount of primary and secondary phases, is 2.5% by volume. In some examples, the amount of secondary phase present, with respect to the total amount of primary and secondary phases, is 3% by volume. In some examples, the amount of secondary phase present, with respect to the total amount of primary and secondary phases, is 3.5% by volume. In some examples, the amount of secondary phase present, with respect to the total amount of primary and secondary phases, is 4% by volume. In some examples, the amount of secondary phase present, with respect to the total amount of primary and secondary phases, is 4.5% by volume. In some examples, the amount of secondary phase present, with respect to the total amount of primary and secondary phases, is 5% by volume. In some examples, the amount of secondary phase present, with respect to the total amount of primary and secondary phases, is 5.5% by volume. In some examples, the amount of secondary phase present, with respect to the total amount of primary and secondary phases, is 6% by volume. In some examples, the amount of secondary phase present, with respect to the total amount of primary and secondary phases, is 6.5% by volume. In some examples, the amount of secondary phase present, with respect to the total amount of primary and secondary phases, is 7% by volume. In some examples, the amount of secondary phase present, with respect to the total amount of primary and secondary phases, is 7.5% by volume. In some examples, the amount of secondary phase present, with respect to the total amount of primary and secondary phases, is 8% by volume. In some examples, the amount of secondary phase present, with respect to the total amount of primary and secondary phases, is 8.5% by volume. In some examples, the amount of secondary phase present, with respect to the total amount of primary and secondary phases, is 9% by volume. In some examples, the amount of secondary phase present, with respect to the total amount of primary and secondary phases, is 9.5% by volume. In some examples, the amount of secondary phase present, with respect to the total amount of primary and secondary phases, is 10% by volume. In some examples, the amount of secondary phase present, with respect to the total amount of primary and secondary phases, is 10.5% by volume. In some examples, the amount of secondary phase present, with respect to the total amount of primary and secondary phases, is 11% by volume. In some examples, t the amount of secondary phase present, with respect to the total amount of primary and secondary phases, is 11.5% by volume. In some examples, the amount of secondary phase present, with respect to the total amount of primary and secondary phases, is 12% by volume. In some examples, the amount of secondary phase present, with respect to the total amount of primary and secondary phases, is 12.5% by volume. In some examples, the amount of secondary phase present, with respect to the total amount of primary and secondary phases, is 13% by volume. In some examples, the amount of secondary phase present, with respect to the total amount of primary and secondary phases, is 13.5% by volume. In some examples, the amount of secondary phase present, with respect to the total amount of primary and secondary phases, is 14% by volume. In some examples, the amount of secondary phase present, with respect to the total amount of primary and secondary phases, is 14.5% by volume. In some examples, the amount of secondary phase present, with respect to the total amount of primary and secondary phases, is 15% by volume. In some examples, the amount of secondary phase present, with respect to the total amount of primary and secondary phases, is 15.5% by volume. In some examples, the amount of secondary phase present, with respect to the total amount of primary and secondary phases, is 16% by volume. In some examples, the amount of secondary phase present, with respect to the total amount of primary and secondary phases, is 16.5% by volume. In some examples, the amount of secondary phase present, with respect to the total amount of primary and secondary phases, is 17% by volume. In some examples, the amount of secondary phase present, with respect to the total amount of primary and secondary phases, is 17.5% by volume. In some examples, the amount of secondary phase present, with respect to the total amount of primary and secondary phases, is 18% by volume. In some examples, the amount of secondary phase present, with respect to the total amount of primary and secondary phases, is 18.5% by volume. In some examples, the amount of secondary phase present, with respect to the total amount of primary and secondary phases, is 19% by volume. In some examples, the amount of secondary phase present, with respect to the total amount of primary and secondary phases, is 19.5% by volume. In some examples, the amount of secondary phase present, with respect to the total amount of primary and secondary phases, is 20% by volume. In some examples, the amount of secondary phase present, with respect to the total amount of primary and secondary phases, is 20.5% by volume. In some examples, the amount of secondary phase present, with respect to the total amount of primary and secondary phases, is 21% by volume. In some examples, the amount of secondary phase present, with respect to the total amount of primary and secondary phases, is 21.5% by volume. In some examples, the amount of secondary phase present, with respect to the total amount of primary and secondary phases, is 22% by volume. In some examples, the amount of secondary phase present, with respect to the total amount of primary and secondary phases, is 22.5% by volume. In some examples, the amount of secondary phase present, with respect to the total amount of primary and secondary phases, is 23% by volume. In some examples, the amount of secondary phase present, with respect to the total amount of primary and secondary phases, is 23.5% by volume. In some examples, the amount of secondary phase present, with respect to the total amount of primary and secondary phases, is 24% by volume. In some examples, the amount of secondary phase present, with respect to the total amount of primary and secondary phases, is 24.5% by volume. In some examples, the amount of secondary phase present, with respect to the total amount of primary and secondary phases, is 25% by volume. In some examples, the amount of secondary phase present, with respect to the total amount of primary and secondary phases, is 25.5% by volume. In some examples, the amount of secondary phase present, with respect to the total amount of primary and secondary phases, is 26% by volume. In some examples, the amount of secondary phase present, with respect to the total amount of primary and secondary phases, is 26.5% by volume. In some examples, the amount of secondary phase present, with respect to the total amount of primary and secondary phases, is 27% by volume. In some examples, the amount of secondary phase present, with respect to the total amount of primary and secondary phases, is 27.5% by volume. In some examples, the amount of secondary phase present, with respect to the total amount of primary and secondary phases, is 28% by volume. In some examples, the amount of secondary phase present, with respect to the total amount of primary and secondary phases, is 28.5% by volume. In some examples, the amount of secondary phase present, with respect to the total amount of primary and secondary phases, is 29% by volume. In some examples, the amount of secondary phase present, with respect to the total amount of primary and secondary phases, is 29.5% by volume. In some examples, the amount of secondary phase present, with respect to the total amount of primary and secondary phases, is 30% by volume.

Grain sizes, as used herein and unless otherwise specified, are measured by either microscopy, e.g., transmission electron microscopy or scanning electron microscopy, or by x-ray diffraction processes.

In some examples, provided herein is a film having grains with a $d_{50}$ diameter less than 10 μm. In certain examples, the film has grains having a $d_{50}$ diameter less than 9 μm. In other examples, the grains having a $d_{50}$ diameter less than 8 μm.

In some examples, the grains have a $d_{50}$ diameter less than 7 μm. In certain examples, the film has grains having a $d_{50}$ diameter less than 6 μm. In other examples, the film has grains having a $d_{50}$ diameter less than 5 μm. In some examples, the film has grains having a $d_{50}$ diameter less than 4 μm. In other examples, the film has grains having a $d_{50}$ diameter less than 3 μm. In certain examples, the film has grains having a $d_{50}$ diameter less than 2 μm. In other examples, the film has grains having a $d_{50}$ diameter less than 1 μm.

In some examples, the grains in the films set forth herein have $d_{50}$ diameters of between 10 nm and 10 μm. In some examples, the grains in the films set forth herein have $d_{50}$ diameters of between 100 nm and 10 μm.

In some examples, the films set forth herein have a Young's Modulus of about 130-150 GPa. In some other examples, the films set forth herein have a Vicker's hardness of about 5-7 GPa.

In some examples, the films set forth herein have a porosity less than 20% by volume. In other examples, the films set forth herein have a porosity less than 10% by volume. In yet other examples, the films set forth herein have a porosity less than 5% by volume. In still other examples, the films set forth herein have a porosity less than 3% by volume as measured by the Archimedes' method, or by quantitative analysis of electron microscope images of cross-sections.

VI. Pellets

Set forth herein are pellets that include calcined garnet powders, optionally with secondary phases present. Also set forth herein are garnet precursor powders such as aluminum hydroxides, oxides, and/or nitrates. Precursors may also include lithium carbonate, lithium hydroxide, lithium oxide, zirconium oxide, lanthanum oxide, lanthanum nitrate, gallium oxide, gallium nitrate, niobium oxide, etc. Garnet precursors may or may not be hydrates. The pellets may optionally include a binder, dispersant, surfactant, and/or plasticizer. The pellets are formed in a press, by centrifugation or by gel-casting. The pellets may be further densified via a WIP or CIP process.

The unsintered pellets set forth herein may be sintered by heating the pellets to about 200° C. to 1200° C. for about 20 minutes to 30 hours or until crystallization occurs. Sintering may occur with the assistance of pressure, as in FAST sintering, hot press sintering, sinter forging, WIP, or HIP. Sintering may occur with the assistance of an electric field, as in FAST sintering or SPS.

VII. Processes of Making the Materials Described Herein

Set forth herein are processes for making a composition. The composition may be a powder, a pellet, a thin film, or a monolith.

In some examples, the composition includes: a primary cubic phase lithium-stuffed garnet characterized by the chemical formula $Li_A La_B Al_C M''_D Zr_E O_F$, wherein 5<A<8, 1.5<B<4, 0.1<C<2, 0≤D<2; 1<E<3, 10<F<13, and M" is selected from the group consisting of Mo, W, Nb, Y, Ta, Ga, Sb, Ca, Ba, Sr, Ce, Hf, and Rb; a secondary phase inclusion in the primary cubic phase lithium-stuffed garnet; wherein the primary cubic phase lithium-stuffed garnet is present at about 70-99.9 vol % with respect to the volume of the composition; and the secondary phase inclusion is present at about 30-0.1 vol % with respect to the volume of the composition.

In some examples, including any of the foregoing, the process includes the following steps: (a) providing a mixture of chemical precursors to the composition, wherein the amount of Al in the mixture exceeds the solubility limit of Al in LLZO; and (b) calcining the mixture by heating it to at least 800° C.

In some examples, including any of the foregoing, the chemical precursors include a precursor selected from lithium hydroxide (e.g., LiOH), lithium oxide (e.g., $Li_2O$), zirconium oxide (e.g., $ZrO_2$), zirconium nitrate, zirconium acetate, lanthanum oxide (e.g., $La_2O_3$), lanthanum nitrate, lanthanum acetate, aluminum oxide (e.g., $Al_2O_3$), aluminum (e.g., Al), aluminum nitrate (e.g., $AlNO_3$), aluminum nitrate nonahydrate, aluminum (oxy) hydroxide (gibbsite and boehmite), gallium oxide, corundum, niobium oxide (e.g., $Nb_2O_5$), tantalum oxide (e.g., $Ta_2O_5$), and combinations thereof.

In some examples, including any of the foregoing, the heating is in air.

In some examples, including any of the foregoing, the heating is in argon or nitrogen.

In some examples, including any of the foregoing, the heating is to 800-1000° C. for two to ten hours.

In some examples, including any of the foregoing, before step (b), the process includes step (a)(1) providing a green film by making a slurry of the composition and casting the slurry onto a substrate. In some examples, the green film includes secondary phases in addition to lithium-stuffed garnet and the chemical precursors to lithium-stuffed garnet.

In some examples, including any of the foregoing, the green film comprises secondary phase inclusions.

In some examples, including any of the foregoing, the process includes step (c) sintering the green film. In some examples, including any of the foregoing, the sintering is assisted by the presence of secondary phases. For example, in some examples, the sintering results in a denser film when secondary phases are present in the green film that is sintered as compared to green film sintered which does not include secondary phases. In some examples, the secondary phases are present because the amount of Al or $Al_2O_3$ in the green film exceeds a threshold amount. In some examples, this threshold amount is the solubility limit of either Al or $Al_2O_3$ in LLZO, e.g., $Li_7La_3Zr_2O_{12}$. Because Al exceeds the solubility limit, the Al precipitates out as a new phase or causes other phases to precipitate out in addition to the cubic lithium-stuffed garnet phase.

In some examples, including any of the foregoing, the sintering the green film includes sintering between setter plates. In some examples, the sintering includes any sintering process set forth in International PCT Patent Application No. PCT/US2016/027922, filed Apr. 15, 2016, SETTER PLATES FOR SOLID ELECTROLYTE FABRICATION AND METHODS OF USING THE SAME TO PREPARE DENSE SOLID ELECTROLYTES, the contents of which are herein incorporated by reference in their entirety for all purposes. In some of the processes disclosed herein, the sintering occurs between inert setter plates, meaning setter plates that do not react with or stick to the film. In some examples, when the sintering occurs between inert setter plates, a pressure is applied by the setter plates onto the sintering film. In certain examples, the pressure is between 0.1 and 1000 pounds per square inch (PSI). In some examples, the pressure is 0.1 PSI. In some examples, the pressure is 0.2 PSI. In some examples, the pressure is 0.3

PSI. In some examples, the pressure is 0.4 PSI. In some examples, the pressure is 0.5 PSI. In some examples, the pressure is 1 PSI. In some examples, the pressure is 2 PSI. In other examples, the pressure is 10 PSI. In still others, the pressure is 20 PSI. In some other examples, the pressure is 30 PSI. In certain examples, the pressure is 40 PSI. In yet other examples, the pressure is 50 PSI. In some examples, the pressure is 60 PSI. In yet other examples, the pressure is 70 PSI. In certain examples, the pressure is 80 PSI. In other examples, the pressure is 90 PSI. In yet other examples, the pressure is 100 PSI. In some examples, the pressure is 110 PSI. In other examples, the pressure is 120 PSI. In still others, the pressure is 130 PSI. In some other examples, the pressure is 140 PSI. In certain examples, the pressure is 150 PSI. In yet other examples, the pressure is 160 PSI. In some examples, the pressure is 170 PSI. In yet other examples, the pressure is 180 PSI. In certain examples, the pressure is 190 PSI. In other examples, the pressure is 200 PSI. In yet other examples, the pressure is 210 PSI.

In some of the above examples, the pressure is 220 PSI. In other examples, the pressure is 230 PSI. In still others, the pressure is 240 PSI. In some other examples, the pressure is 250 PSI. In certain examples, the pressure is 260 PSI. In yet other examples, the pressure is 270 PSI. In some examples, the pressure is 280 PSI. In yet other examples, the pressure is 290 PSI. In certain examples, the pressure is 300 PSI. In other examples, the pressure is 310 PSI. In yet other examples, the pressure is 320 PSI. In some examples, the pressure is 330 PSI. In other examples, the pressure is 340 PSI. In still others, the pressure is 350 PSI. In some other examples, the pressure is 360 PSI. In certain examples, the pressure is 370 PSI. In yet other examples, the pressure is 380 PSI. In some examples, the pressure is 390 PSI. In yet other examples, the pressure is 400 PSI. In certain examples, the pressure is 410 PSI. In other examples, the pressure is 420 PSI. In yet other examples, the pressure is 430 PSI. In some other examples, the pressure is 440 PSI. In certain examples, the pressure is 450 PSI. In yet other examples, the pressure is 460 PSI. In some examples, the pressure is 470 PSI. In yet other examples, the pressure is 480 PSI. In certain examples, the pressure is 490 PSI. In other examples, the pressure is 500 PSI. In yet other examples, the pressure is 510 PSI.

In some of the above examples, the pressure is 520 PSI. In other examples, the pressure is 530 PSI. In still others, the pressure is 540 PSI. In some other examples, the pressure is 550 PSI. In certain examples, the pressure is 560 PSI. In yet other examples, the pressure is 570 PSI. In some examples, the pressure is 580 PSI. In yet other examples, the pressure is 590 PSI. In certain examples, the pressure is 600 PSI. In other examples, the pressure is 610 PSI. In yet other examples, the pressure is 620 PSI. In some examples, the pressure is 630 PSI. In other examples, the pressure is 640 PSI. In still others, the pressure is 650 PSI. In some other examples, the pressure is 660 PSI. In certain examples, the pressure is 670 PSI. In yet other examples, the pressure is 680 PSI. In some examples, the pressure is 690 PSI. In yet other examples, the pressure is 700 PSI. In certain examples, the pressure is 710 PSI. In other examples, the pressure is 720 PSI. In yet other examples, the pressure is 730 PSI. In some other examples, the pressure is 740 PSI. In certain examples, the pressure is 750 PSI. In yet other examples, the pressure is 760 PSI. In some examples, the pressure is 770 PSI. In yet other examples, the pressure is 780 PSI. In certain examples, the pressure is 790 PSI. In other examples, the pressure is 800 PSI. In yet other examples, the pressure is 810 PSI.

In other examples, the pressure is 820 PSI. In certain aforementioned examples, the pressure is 830 PSI. In still others, the pressure is 840 PSI. In some other examples, the pressure is 850 PSI. In certain examples, the pressure is 860 PSI. In yet other examples, the pressure is 870 PSI. In some examples, the pressure is 880 PSI. In yet other examples, the pressure is 890 PSI. In certain examples, the pressure is 900 PSI. In other examples, the pressure is 910 PSI. In yet other examples, the pressure is 920 PSI. In some examples, the pressure is 930 PSI. In other examples, the pressure is 940 PSI. In still others, the pressure is 950 PSI. In some other examples, the pressure is 960 PSI. In certain examples, the pressure is 970 PSI. In yet other examples, the pressure is 980 PSI. In some examples, the pressure is 990 PSI. In yet other examples, the pressure is 1000 PSI.

In some examples, the garnet-based setter plates are useful for imparting beneficial surface properties to the sintered film. These beneficial surface properties include flatness and conductivity useful for battery applications. These beneficial properties also include preventing Li evaporation during sintering. These beneficial properties may also include preferencing a particular garnet crystal structure.

In certain processes disclosed herein, the inert setter plates are selected from porous zirconia, graphite or conductive metal plates. In some of these processes, the inert setter plates are porous zirconia. In some other of these processes, the inert setter plates are graphite. In yet other processes, the inert setter plates are conductive metal plates. Setter plates include, but are not limited to, the setter plates set forth in International Patent Application No. PCT/US2016/027886, entitled LITHIUM STUFFED GARNET SETTER PLATES FOR SOLID ELECTROLYTE FABRICATION, filed Apr. 15, 2016; also International Patent Application No. PCT/US2016/027922, entitled SETTER PLATES FOR SOLID ELECTROLYTE FABRICATION AND METHODS OF USING THE SAME TO PREPARE DENSE SOLID ELECTROLYTES, filed Apr. 15, 2016; also U.S. patent application Ser. No. 15/286,509, entitled LITHIUM STUFFED GARNET SETTER PLATES FOR SOLID ELECTROLYTE FABRICATION, filed Oct. 5, 2016; also U.S. patent application Ser. No. 15/431,645, entitled SETTER PLATES FOR SOLID ELECTROLYTE FABRICATION AND METHODS OF USING THE SAME TO PREPARE DENSE SOLID ELECTROLYTES, filed Feb. 13, 2017, the contents of each of which are herein incorporated by reference in their entirety for all purposes.

In some examples, including any of the foregoing, the process includes step (d) annealing the green film. In some examples, the annealing includes any annealing method set forth in U.S. patent application Ser. No. 15/007,908, filed Jan. 27, 2016, entitled ANNEALED GARNET ELECTROLYTE SEPARATORS, the contents of which are herein incorporated by reference in their entirety for all purposes.

In some examples, provided herein is a thin film made by a process disclosed herein. In some other examples, provided herein is an electrochemical device which includes a thin film made by a process disclosed herein.

Also included herein is an electric vehicle that includes any electrochemical device described herein.

a. Milling & Calcining Processes

In some examples, the processes herein include providing chemical precursor to a lithium-stuffed garnet at a specified quantity and density. In certain examples, the chemical precursors are characterized by, or milled to, a median particle size of about 100 nm to 10 µm. In some examples, the median particle size is 800 nm to 2 µm.

In some examples, the processes herein include providing a lithium-stuffed garnet at a specified quantity and density. In certain examples, the powder is characterized by, or milled to, a median particle size of about 100 nm to 10 µm. In some examples, the median particle size is 800 nm to 2 µm.

As described herein, some processes include steps related to mixing and, or, process steps related to milling. Milling includes ball milling. Milling also includes milling processes that use inert solvents such as, but not limited to, ethanol, isopropanol, toluene, ethyl acetate, methyl acetate, THF, MEK, DME, acetone, acetonitrile, or combinations thereof.

In some examples, the milling is ball milling. In some examples, the milling is horizontal milling. In some examples, the milling is attritor milling. In some examples, the milling is immersion milling. In some examples, the milling is high energy milling. In some examples, the high energy milling process results in a milled particle size distribution with $d_{50}$ of 10 nm. In some examples, the high energy milling process results in a milled particle size distribution with $d_{50}$ of 10 µm. In some examples, the high energy milling process results in a milled particle size distribution with $d_{50}$ of 1 µm. In some examples, the high energy milling process results in a milled particle size distribution with $d_{50}$ of 100 nm. In some examples, the high energy milling process results in a milled particle size distribution with $d_{50}$ of 100 µm. In some examples, the milling is immersion milling.

In some examples, the milling includes high energy wet milling process with 0.3 mm yttria stabilized zirconium oxide grinding media beads. In some other examples, ball milling, horizontal milling, attritor milling, or immersion milling can be used. In some examples, using a high energy milling process produces a particle size distribution of about $d_{50}$~100 nm. In some examples, a milling process produces a particle size distribution with $d_{50}$ between 100-200 nm. In some examples, a milling process produces a particle size distribution with $d_{50}$ between 200-300 nm. In some examples, a milling process produces a particle size distribution with $d_{50}$ between 300-400 nm. In some examples, a milling process produces a particle size distribution with $d_{50}$ between 400-500 nm. In some examples, a milling process produces a particle size distribution with $d_{50}$ between 500-600 nm. In some examples, a milling process produces a particle size distribution with $d_{50}$ between 600-700 nm. In some examples, a milling process produces a particle size distribution with $d_{50}$ between 700-800 nm. In some examples, a milling process produces a particle size distribution with $d_{50}$ between 800-900 nm. In some examples, a milling process produces a particle size distribution with $d_{50}$ between 900-1000 nm.

In some examples, the mixture of chemical precursors to a lithium-stuffed garnet is calcined at temperatures of 600° C., 650° C., 700° C., 750° C., 800° C., 850° C., 900° C., 950° C., 1000° C., 1050° C., 1100° C., 1150° C., 1200° C., 1250° C., 1300° C., 1350° C., 1400° C., or 1450° C. In some examples, the mixture of chemical precursors to a lithium-stuffed garnet is calcined at 800° C., 850° C., 900° C., 950° C., 1000° C., 1050° C., or 1100° C. In some examples, the mixture of chemical precursors to a lithium-stuffed garnet is calcined at 800° C. In some examples, the mixture of chemical precursors to a lithium-stuffed garnet is calcined at 850° C. In some examples, the mixture of chemical precursors to a lithium-stuffed garnet is calcined at 900° C. In some examples, the mixture of chemical precursors to a lithium-stuffed garnet is calcined at 950° C. In some examples, the mixture of chemical precursors to a lithium-stuffed garnet is calcined at 1000° C. In some examples, the mixture of chemical precursors to a lithium-stuffed garnet is calcined at 1050° C. In some examples, the mixture of chemical precursors to a lithium-stuffed garnet is calcined at 1100° C. In some of these examples, the mixture of chemical precursors to a lithium-stuffed garnet is calcined for 1, 2, 3, 4, 5, 6, 7, 8, 9, or 10 hours. In some examples, the mixture is calcined for 4, 5, 6, 7, or 8 hours. In some examples, the mixture of chemical precursors to a lithium-stuffed garnet is calcined for 4 hours. In some examples, the mixture of chemical precursors to a lithium-stuffed garnet is calcined for 5 hours. In some examples, the mixture of chemical precursors to a lithium-stuffed garnet is calcined for 6 hours. In some examples, the mixture of chemical precursors to a lithium-stuffed garnet is calcined for 7 hours. In some of these examples, the calcination temperature is achieved by a heating ramp rate of about 1° C./min, 2° C./min, 5° C./min, or about 10° C./min. In some of these examples, the calcined mixture is then milled to break-up any agglomerates. In some of these examples, the calcined mixture is then milled to reduce the mean primary particle size. In certain examples, the milled calcined mixture is then sintered at temperatures of about 600° C., 650° C., 700° C., 750° C., 800° C., 850° C., 900° C., 950° C., 1000° C., 1050° C., 1100° C., 1150° C., 1200° C., 1250° C., 1300° C., 1350° C., 1400° C., or 1450° C. In some examples, the sintering is at temperatures of 1000° C., 1050° C., 1100° C., 1150° C., 1200° C., 1250° C., 1300° C., 1350° C., 1400° C., or 1450° C. In some examples, the sintering is at temperatures of 1000° C., 1200° C., or 1400° C. In these examples, the sintering is for 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 minutes. In some examples, the sintering is for 1, 2, 3, 4, 5, 6, 7, 8, 9, 10, 11, 12, 13, or 14 hours.

In some examples, the calcined powders (e.g., any of the aforementioned examples of calcined lithium-stuffed garnet) are provided in a slurry with solvents and additional components such as binders and dispersants. In some examples, the slurry is then cast onto a substrate to form a film having a thickness between about 10 nm and about 250 µm. This film is referred to as a green film. In some examples, the casting onto a substrate is accomplished through slot casting, doctor blade casting, or by dip coating a substrate into the flux. The slurry is then dried to remove the solvent. In some examples, the heating is accomplished at 1° C./min and to a temperature of about 200° C., or about 250° C., or about 300° C., or about 350° C., or about 350° C., or about 400° C., or about 450° C., or about 500° C. The dried, unsintered slurry is referred to herein as a green film.

In some examples, positive electrode active materials are mixed with garnet powders and also flux components to form a mixture. This mixture can be deposited onto one, two, or more sides of a current collector. Once the flux is processed, as set forth herein, and eventually removed, an intimate mixture of garnet materials and active materials remain in direct contact with a current collector.

In any of these examples, the substrate, e.g., current collector, can be coated with a garnet material optionally including a positive electrode active material by dip coating the substrate into a flux having the garnet, garnet precursors, active material, or combinations thereof. In any of these examples, the substrate, e.g., current collector, can be coated with a garnet material optionally including a positive electrode active material by casting the flux having the garnet, garnet precursors, active material, or combinations thereof onto the substrate. In these examples, casting can be doctor blade casting. In these examples, casting can be slot casting. In these examples, casting can be dip coating.

Additional details, examples, and embodiments of these processes of making garnet materials is found, for example, in International PCT Patent Application No. PCT/US2014/059578, entitled GARNET MATERIALS FOR LI SECONDARY BATTERIES, filed Oct. 7, 2014, or in International PCT Patent Application No. PCT/US2014/059575, entitled GARNET MATERIALS FOR LI SECONDARY BATTERIES, also filed Oct. 7, 2014, the contents of each of which are herein incorporated by reference in their entirety for all purposes.

In some examples precursors are, optionally milled and, mixed with a flux (step a) and heated to dissolve the precursors in the flux (step b). The flux with dissolved precursors is cast (step c) and calcined (step d) to react the precursors and for larger and more crystalline particles (step e) which are densified by the flux. In some examples, the flux is removed (step f).

b. Fluxes

In some examples, set forth herein is a process that includes a mixture of chemical precursors to a lithium-stuffed garnet powder or film, wherein one or more flux materials, having a melting point lower than 400° C. is used to mix, dissolve, and, or, density the ceramic onto or around a substrate.

In some examples, a mixture of chemical precursors to a lithium-stuffed garnet is mixed with two or more flux materials at a temperature of less than 400° C. to form a fluxed powder material. This fluxed powder material is shaped and heated again at a temperature less than 400° C. to form a dense lithium conducting material.

In some examples, the processes herein include providing a mixture of chemical precursors to a lithium-stuffed garnet at a specified quantity and density. In certain examples, the mixture is characterized by, or milled to, a median particle size of about 100 nm to 10 µm. In some examples, the median particle size is 800 nm to 2 µm. In some of these examples, a flux material is provided at a second specified quantity and density. In certain examples, the secondly provided flux material is less than 51% (w/w) of the mixture. This flux material is typically a lithium-containing material which melts between about 500° C. to 900° C. Additional flux materials may also be provided in the reaction mixture. In some examples, the powders and flux materials, in various combinations, are mixed to form eutectic mixtures. In some of these examples, the eutectic mixtures have a melting point less than 500° C. In some further examples, the eutectic mixtures are heated to temperature of about 400 to 800° C. In some examples, the heated mixtures are mixed. In still other examples, the mixtures are then heated and formed into shapes, such as but not limited to, sheets, thick films (greater than 100 µm thick), thin films (less than 100 µm thick) rolls, spheres, discs, sheets, pellets, and cylinders. Following a reaction time and, or, additional heating, the powders and flux materials are optionally cooled. In some examples, the flux is separated or removed from the products formed therein using a solvent such as, but not limited to, water, acetone, ethanol, THF, IPA, toluene, or combinations thereof. In some examples, the additional heating is to temperatures less than 500° C. This method, and variants thereof, result in dense lithium conducting ceramic powders, which are often 20% more dense than the starting density of the reactants and, or, fluxes. In certain examples, the powders and flux materials include, but are not limited to, formed garnets, such as $Li_7La_3Zr_2O_{12}$, and oxides, such as LiOH, $La_2O_3$, $ZrO_2$. In certain examples, the garnet powders are formed by mixing garnet precursors such as, but not limited to, LiOH, $Li_2CO_3$, $La_2O_3$, $ZrO_2$, $Nb_2O_5$, boehmite, gibbsite, bayerite, doyleite, nordstrandite, bauxite, corundum, $Al_2O_3$, Al-nitrate, or combinations thereof.

c. Solutions and Slurries

In some examples, the processes herein include the use of solutions and slurries which are cast or deposited onto substrates. In certain examples, garnet precursors in the slurries are milled according to the milling processes set forth herein. In some examples, these precursors are formulated into a slurry. In some examples, these milled precursors are formulated into a slurry. After milling, in some examples, the precursors are formulated into coating formulations, e.g., slurries with binders and solvents. These slurries and formulations solvents, binders, dispersants, and surfactants. In some examples, the binder polyvinyl butyral (PVB) and the solvent is toluene and/or ethanol and/or diacetone alcohol. In some examples, PVB is both a binder and a dispersant. In some examples, the binders also include PVB, PVP, Ethyl Cellulose, Celluloses, acetate, PVA, and PVDF. In some examples, the dispersants include surfactants, fish oil, fluorosurfactants, Triton, oleyl alcohol, oleic acid, oleyl amine, PVB, and PVP. In some slurries, 10% to 60% by weight (w/w) of the slurry is solid precursors. Binders and dispersants can each, in some slurries, make up 50% w/w of the slurry, with solvents comprising the remainder weight percentages.

In some examples, the solvent is selected from MEK, DME, toluene, ethanol, toluene:ethanol, or combinations thereof. In certain embodiments disclosed herein, the binder is polyvinyl butyral (PVB). In certain embodiments disclosed herein, the binder is polypropylene carbonate. In certain embodiments disclosed herein, the binder is a polymethylmethacrylate.

In some examples, the solvent is toluene, ethanol, toluene:ethanol, or combinations thereof. In some examples, the binder is polyvinyl butyral (PVB). In other examples, the binder is polypropylene carbonate. In yet other examples, the binder is a polymethylmethacrylate.

In some embodiments disclosed herein, the removing the solvent includes evaporating the solvent. In some of these embodiments, the removing the solvent includes heating the film. In some embodiments, the removing includes using a reduced atmosphere. In still other embodiments, the removing includes using a vacuum to drive off the solvent. In yet other embodiments, the removing includes heating the film and using a vacuum to drive off the solvent.

In some examples, the slurries set forth herein are deposited onto substrates using casting techniques including slot die coating, slot casting, doctor blade casting, mold casting, roll coating, gravure, microgravure, screen printing, flexoprinting, and/or other related processes.

Other casting processes are set forth in International PCT Patent Application No. PCT/US2014/059578, entitled GARNET MATERIALS FOR LI SECONDARY BATTERIES, filed Oct. 7, 2014, or in International PCT Patent Application No. PCT/US2014/059575, entitled GARNET MATERIALS FOR LI SECONDARY BATTERIES, also filed Oct. 7, 2014, the entire contents of each of which are incorporated by reference herein for all purposes in their entirety.

In some examples, the slurries of garnet precursors, set forth here, are layered, deposited, or laminated to uncalcined green films of lithium-stuffed garnets in order to build up several layers of lithium-stuffed garnets. In some examples, a slurry is deposited by doctor-blading and then then deposited slurry is allowed to dry. Once dry, another layer of slurry is deposited onto the dried first deposited slurry. In some examples, slurries of garnet precursors, set forth below, are layered, deposited, or laminated to calcined films of lithium-stuffed garnets in order to infiltrate vacant or porous space within uncalcined lithium-stuffed garnets. These dried slurries are referred to as green films.

In some examples, the green films also include at least one member selected from a binder, a solvent, a dispersant, or combinations thereof. In some examples, the garnet solid loading is at least 30% by weight (w/w). In some examples, the film thickness is less than 100 μm.

In certain examples, the dispersants are BYK-R™ 607, Rhodaline, DISPERBYK-2013™, BYK-300™, BYK-081™, SOLSPERSE™ M387, fish oil and Oleyl alcohol.

In some examples, the films include a substrate adhered thereto. In certain examples, the substrate is a polymer, a metal foil, or a metal powder. In some of these examples, the substrate is a metal foil. In some examples, the substrate is a metal powder. In some of these examples, the metal is selected from Ni, Cu, Al, steel, alloys, or combinations thereof.

In some examples, the solid loading in the green film is at least 35% w/w. Herein, solid loading refers to the amount of inorganic material which will remain in a film once the solvents, volatile components, and organic components are removed from the film through evaporation, calcination processes, or sintering processes, or any combination thereof. In some examples, the green films have a solid loading of at least 40% w/w. In some examples, the green films have a solid loading of at least 45% w/w. In some examples, the green films have a solid loading of at least 50% w/w. In other examples, the solid loading is at least 55% w/w. In some other examples, the solid loading is at least 60% w/w. In some examples, the solid loading is at least 65% w/w. In some other examples, the solid loading is at least 70% w/w. In certain other examples, the solid loading is at least 75% w/w. In some examples, the solid loading is at least 80% w/w.

In some examples, the uncalcined green films have a film thickness less than 75 μm and greater than 10 nm. In some examples, the uncalcined green films have a thickness less than 50 μm and greater than 10 nm. In some examples, the uncalcined green films have particles with a $d_{50}$ of less than 1 μm at the particle maximum physical dimension. In some examples, the uncalcined green films have a median grain size of between 0.1 μm to 10 μm. In some examples, the uncalcined green films is not adhered to any substrate.

The uncalcined green films set forth herein may be calcined by heating the green films to about 200° C. to 1200° C. for about 20 minutes to 10 hours or until crystallization occurs.

In some examples, the green films are unsintered and are centimeters in length.

In some examples, the green films are unsintered and are meters in length.

In some examples, the green films are unsintered and are kilometers in length.

In an embodiment, the disclosure sets forth herein a process including providing an unsintered thin film; wherein the unsintered thin film comprises at least one member selected from the group consisting of a Garnet-type electrolyte, an active electrode material, a conductive additive, a solvent, a binder, and combinations thereof; removing the solvent, if present in the unsintered thin film; optionally laminating the film to a surface; removing the binder, if present in the film; sintering the film, wherein sintering comprises heat sintering or field assisted sintering (FAST); wherein heat sintering includes heating the film in the range from about 700° C. to about 1200° C. for about 1 to about 600 minutes and in atmosphere having an oxygen partial pressure between $10^{-1}$ atm to $10^{-15}$ atm; and wherein FAST sintering includes heating the film in the range from about 500° C. to about 900° C. and applying a D.C. or A.C. electric field to the thin film.

In some of the processes disclosed herein, the unsintered thin film has a thickness from about 10 μm to about 100 μm. In some other of the processes disclosed herein, the unsintered thin film has a thickness from about 20 μm to about 100 μm. In certain of the processes disclosed herein, the unsintered thin film has a thickness from about 30 μm to about 100 μm. In certain other of the processes disclosed herein, the unsintered thin film has a thickness from about 40 μm to about 100 μm. In yet other processes disclosed herein, the unsintered thin film has a thickness from about 50 μm to about 100 μm. In still other processes disclosed herein, the unsintered thin film has a thickness from about 60 μm to about 100 μm. In yet some other processes disclosed herein, the unsintered thin film has a thickness from about 70 μm to about 100 μm. In some of the processes disclosed herein, the unsintered thin film has a thickness from about 80 μm to about 100 μm. In some other of the processes disclosed herein, the unsintered thin film has a thickness from about 90 μm to about 100 μm.

In some of the processes disclosed herein, the unsintered thin film has a thickness from about 10 μm to about 90 μm. In some other of the processes disclosed herein, the unsintered thin film has a thickness from about 20 μm to about 80 μm. In certain of the processes disclosed herein, the unsintered thin film has a thickness from about 30 μm to about 70 μm. In certain other of the processes disclosed herein, the unsintered thin film has a thickness from about 40 μm to about 60 μm. In yet other processes disclosed herein, the unsintered thin film has a thickness from about 50 μm to about 90 μm. In still other processes disclosed herein, the unsintered thin film has a thickness from about 60 μm to about 90 μm. In yet some other processes disclosed herein, the unsintered thin film has a thickness from about 70 μm to about 90 μm. In some of the processes disclosed herein, the unsintered thin film has a thickness from about 80 μm to about 90 μm. In some other of the processes disclosed herein, the unsintered thin film has a thickness from about 30 μm to about 60 μm.

In some examples, the unsintered films are about 50 percent larger by volume than the sintered films. In some examples, the sintered films have a thickness of about 1-150 μm. In some of these examples, the sintered film has a thickness of about 1 μm. In some other examples the sintered film has a thickness of about 2 μm. In certain examples, the sintered film has a thickness of about 3 μm. In certain other examples, the sintered film has a thickness of about 4 μm. In some other examples, the sintered film has a thickness of about 5 μm. In some examples, the sintered film has a thickness of about 6 μm. In some of these examples, the sintered film has a thickness of about 7 μm. In some examples, the sintered film has a thickness of about 8 μm. In some other examples, the sintered film has a thickness of about 9 μm. In certain examples, the sintered film has a thickness of about 10 μm.

d. Making Certain Compositions

In some examples, provided herein are processes for making a lithium-stuffed garnet doped with aluminum, the processes comprising providing garnet precursors at predetermined combination. In some examples, the processes further include milling the combination for 5 to 10 hours. In other examples, the processes further comprising calcining the combination in vessels at about 500° C. to about 1200° C. for about 4 to about 10 hours to form a garnet. In other examples, the processes further include milling the formed garnet until the $d_{50}$ particle size is between 200 and 400 nm. In still other examples, the processes further include mixing the milled forming garnet with a binder to form a slurry. In some of these examples, before the slurry is sintered, the processes include providing a green film by casting the slurry as a film. In other examples, the processes further include filtering the slurry. In still other examples, the processes further include optionally providing pellets of filtered slurry. In some of these examples, before the slurry is sintered, the processes include providing a green film by casting the slurry. In still other examples, the processes further include sintering the filtered slurry. In the examples, wherein the slurry is sintered, sintering includes applying pressure to the slurry with setting plates, heating the slurry under flowing inert gas between 140° C. and 400° C. for about 1 to about 6 hours, and either heat sintering or field assisted sintering for about 10 minutes to about 10 hours.

In certain examples, the garnet precursors are selected from LiOH, $La_2O_3$, $ZrO_2$ and $Al(NO_3)_3 \cdot 9H_2O$.

In some examples, the garnet precursors are calcined in vessels is at 900° C. for 6 hours. In certain examples, the vessels are Alumina (i.e., $Al_2O_3$) vessels.

In certain examples, the milling is until the $d_{50}$ particle size of the formed garnet is about 300 nm. In certain other examples, the milling is conducted until the $d_{50}$ particle size of the formed garnet is about 100 nm. In some examples, the milling is conducted until the $d_{50}$ particle size of the formed garnet is about 200 nm. In certain examples, the milling is conducted until the $d_{50}$ particle size of the formed garnet is about 250 nm. In certain examples, the is conducted until the $d_{50}$ particle size of the formed garnet is about 350 nm. In certain examples, the milling is conducted until the $d_{50}$ particle size of the formed garnet is about 400 nm.

In some examples, the mixing the milled forming garnet with a binder to form a slurry includes about 4% w/w binder. In some examples, the binder is polyvinyl butyral.

In some examples, the filtering the slurry includes filtering with an 80-mesh sieve. In some examples, the filtering the slurry includes filtering with a 100-mesh sieve. In some examples, the filtering the slurry includes filtering with a 120-mesh sieve. In some examples, the filtering the slurry includes filtering with a 140-mesh sieve. In some examples, the filtering the slurry includes filtering with a 170-mesh sieve. In some examples, the filtering the slurry includes filtering with a 200-mesh sieve.

In some examples, provided herein are pellets of filtered, dried slurry that are 13 mm in diameter. In some examples, the pellets have a 10 mm, 11 mm, 12 mm, 13 mm, 14 mm, 15 mm, 16 mm, 17 mm, 18 mm, 19 mm, or 20 mm diameter.

In some examples, the applying pressure to the pellet with setting plates includes applying a pressure of 3 metric tons. In some other examples, the applying pressure to the pellet with setting plates includes applying a pressure of 2 metric tons. In some examples, the applying pressure to the pellet with setting plates includes applying a pressure of 1 metric tons. In some examples, the applying pressure to the pellet with setting plates includes applying a pressure of 3.5 metric tons.

In some examples, the setter plates are Pt setter plates. In other examples, the setter plates are garnet setter plates. In certain examples, the setter plates are porous setter plates. In yet other examples, the setter plates are porous garnet setter plates. In yet other examples, the setter plates are porous zirconia setter plates.

In some examples, the processes include flowing inert gas as an Argon gas flowing at a flow rate of 315 sccm.

In some examples, the processes set forth herein include heating the slurry under flowing inert gas including separate dwells at 100-200° C. and 300-400° C. for 2 hours (hrs) each under a humidified Argon flow.

e. Making Fine Grain Lithium-Stuffed Garnets

In some examples, provided herein are processes of making thin films with fine grains of lithium-stuffed garnets doped with alumina. In some examples, in order to make these fine grains, the films described herein are heat sintered at a maximum temperature of 1150° C. In some examples, in order to make these fine grains, the films described herein are heat sintered at a maximum temperature of 1150° C. for no more than 6 hours. In some examples, in order to make these fine grains, the films described herein are heat sintered at a maximum temperature of 1075° C. In some examples, in order to make these fine grains, the films described herein are heat sintered at a maximum temperature of 1075° C. for no more than 6 hours. In certain examples, when the films are only sintered for 15 minutes, heat sintering temperatures of 1200° C., at a maximum, are used.

Grains grow larger as temperature is increased. Also, grains grow larger at a given temperature while the dwell time at that temperature is increased. For this reason, the processes set forth herein include heat sintering at temperatures less than 1200° C., or less than 1150° C., or less than 1075° C. In some of these examples, the processes set forth herein include heat sintering at these temperatures for no more than 6 hours. In some examples, the processes set forth herein include heating sintering for no more than 15 minutes. In some other examples, the processes set forth herein include heat sintering at 1050° C. In some other examples, the processes set forth herein include heat sintering at 1000° C. In some other examples, the processes set forth herein include heat sintering at 950° C. In some other examples, the processes set forth herein include heat sintering at 900° C. In some other examples, the processes set forth herein include heat sintering at 850° C. In some other examples, the processes set forth herein include heat sintering at 800° C. In some other examples, the processes set forth herein include heat sintering at 750° C. In some other examples, the processes set forth herein include heat sintering at 700° C. In some other examples, the processes set forth herein include heat sintering at 650° C. In some other examples, the processes set forth herein include heat sintering at 600° C. In some other examples, the processes set forth herein include heat sintering at 550° C. In some other examples, the processes set forth herein include heat sintering at 500° C.

In some examples, smaller amounts of Li in the lithium-stuffed garnet lead to smaller grains in the films set forth herein f. Sintering Processes While certain solid-state ionic conductors can be sintered in a conventional process by pressing small pellets, which are approximately 10 mm in diameter and 2 mm thick in thickness, known processes for making thin films of garnet based materials are insufficient for battery applications, which require film dimensions of approximately 10 cm, and which are 100 nm to 50 μm in thickness.

Sintering thin films, particularly films that include garnet (e.g., lithium-stuffed garnet), using applied electrical currents and voltages is inherently challenging. In part, this is related to the resistive heating that occurs in the garnet material when current flows there-through and thereby causes a sintering effect. For example, when electricity is used to sinter garnet, as is done with FAST sintering, the electricity resistively heats and sinters the garnet material primarily where the impedance is the greatest. As the garnet is sintered and the impedance decreases, the resistive heat associated with an electrical current passing through the garnet also decreases. As the impedance decreases in certain portions of the garnet material, the passed electrical current primarily takes the path of least resistance (i.e., the path where the impedance is lowest) and does not resistively heat the unsintered portions of the garnet where the impedance is significantly higher. As more garnet sinters, and the impedance decreases, it becomes more difficult to sinter the remaining unsintered portions of the garnet and particularly so where the impedance is greatest due to the garnet portions where the impedance is smallest.

In order to overcome this challenge, a cylindrical form factor may be used. By directing an applied electrical current between electrodes spaced at the extreme longitudinal ends of a cylinder, the cylindrical form factor overcomes the aforementioned challenges since the electrical current passes through the longest portion of the sintering material. However, for several of the applications considered herein and with the instant patent application, a form factors that is a thin film is required. In some examples, this form factor is rectangular with respect to its shape. In some other examples, this form factor is rectangular-like with respect to its shape. These films, thin films, and rectangular-like form factors are difficult to sinter in part because the electrodes, through which an electrical current is applied, do not transmit electricity through the longest portion of the film sample. For thin films, the applied electrical current passes through the z-direction of the film, which is one of the shorter paths through the bulk of the material.

In addition to the aforementioned challenges, for many applications it is preferable that the thin film densify primarily in the z-direction and not in the x- or y-directions. This means that the shrinkage of the film is primarily in the z-direction and more so than in either the x- or the y-direction. Accomplishing this type of densification and shrinkage is also a challenge met by the instant application. The present application sets forth several sintering processes for overcoming these and other sintering challenges.

An example sintering processes includes placing electrodes on a thin film form factor so that an applied electrical current passes through the z-direction of the film. In this orientation, FAST sintering is employed according to a sintering processes set forth herein.

Another example sintering process includes using sintering plates. In some examples, the applied electrical current passes through the sintering plates. In some other examples, the applied electrical current passes through the sintering plates while a pressure is applied according to the pressure values recited in this application herein and above. In certain other examples, the applied electrical current is applied directly to the thin film while the setter plates independently apply a pressure according to a pressure value recited in this application, herein and above. In yet certain other examples, one or more metal foil layers are inserted between a setter plate and the thin film and the applied electrical current is applied to the inserted metal foil.

In some examples, a metal powder is inserted between the setter plates and the garnet film to be sintered. In some of these examples, as the garnet film is sintered, the metal powder also sinters and adheres to the sintering film.

In some of these examples, the setter plate is a porous setter plate. In some of these examples, the setter plate is a garnet-based setter plate. In some of these examples, the setter plate is a porous garnet-based setter plate. In some of these examples, the setter plate is a metallic setter plate. As used herein, garnet-based setter plates include a setter plate that comprises a garnet material described herein.

In some examples, the plates used for sintering and optionally for applying pressure can have individually addressable contact points so that the applied electrical current is directed to specific positions on the sintering film. The tapered ended of the plurality of trapezoid-like shapes (100) indicates these individually addressable contacts points. As used herein, individually addressable refers to the ability to controllable and individually apply a current or a voltage to one contact point that may be different from the controllably applied current or voltage applied to another contact point.

In some examples, the plates used for sintering and optionally for applying pressure can have grid structure. In some examples, this grid structure is movable so that it can be placed on the sintering film at different positions during the sintering process.

In some examples, the thin film form factor is sintered while it moves through calender rollers. In these examples, the calender rollers apply a pressure according to a pressure value set forth herein and also provide a conduit for an applied electrical current or voltage as necessary for sintering, e.g., FAST sintering. The larger arrow, which is not surrounded by a circle and is parallel to the x-direction of the film, indicates the direction of movement of the sintering film as it moves through the calender rollers.

In some of the examples, where a thin film form factor is sintered while it moves through calender rollers, the calender rollers have individually addressable contact points (200) so that an electrical current or voltage can be applied controllably and individually to the sintering film at different positions.

In some of the examples where a thin film form factor is sintered while it moves through calender rollers, one of the calender rollers is a ground electrode.

In some of the examples wherein a thin film form factor is sintered while it moves through calender rollers, one of the calender rollers is a spiral design that can rotate about its longitudinal axis and also move parallel to its longitudinal axis. This spiral design allows for the Applied Electrical Current or Voltage to be Directed to the Sintering Film.

i. Reactive Sintering

In some examples, the set forth herein are reactive sintering processes. In these examples, garnet precursors are mixed to form a mixture. In these examples, the precursors include the garnet precursors set forth in the instant patent application. In some examples, the mixture is milled according to the milling processes set forth in the instant patent application. In some examples, the mixture is formulated as a slurry of milled precursor materials to form a slurry. In some examples, the slurry is then coated onto a substrate by processes such as, but not limited to, doctor blade casting, slot casting, or dip coating. In some other examples, the slurry is cast onto a substrate according to a casting process set forth in the instant patent application. In some of these examples, the slurry is then dried to remove the solvent or liquid therein. In some examples, the dried slurry is calendered. In some additional examples, the dried slurry is laminated to other layers of battery components. In some of these examples, pressure is applied to adhere or bond the laminated layers together. In certain examples, the dried slurry layers to which pressure is applied are sintered according to the processes set forth herein. In those examples, wherein sintering occurs with garnet precursors in a slurry or dried slurry format, the sintering occurs simultaneous with a chemical reaction of the garnet precursors to form sintered garnet.

ii. Hot Pressing

In some examples, set forth herein are hot pressing processes of making thin garnet films. In these examples, green tapes, as described above, are sintered under an applied uniaxial pressure. In certain examples, the binder is first removed before the sintering is conducted. In these particular examples, the binder can be removed by burning the binder at a temperature of about 200, 300, 400, 500, or 600° C. In some examples, the sintering is conducted by heating the film to sintering temperature of about 800° C. to about 1200° C. under an uniaxial load pressure of about 10 to about 100 MPa. In these examples, the applied pressure prevents the film from deforming or warping during sintering and provides an additional driving force for sintering in the direction perpendicular to the film surface and for preparing a dense film.

In some examples, the green film can be sintered by first casting the film onto a metal foil. In some examples, the binder is burned out before the sintering is conducted. In some of these examples, the sintering includes heating the film under an applied pressure to a temperature lower than the melting point of the metal or metals comprising the metal foil substrate. As such, higher sintering temperatures can be used when Ni-substrates are used as compared to when Cu-substrates are used.

iii. Constrained Sintering

In some examples, the green film may be sintered by placing it between setter plates but only applied a small amount of pressure to constrain the film and prevent inhomogeneities that stress and warp the film during the sintering process. In some of these examples, it is beneficial to make the setter plates that are porous, e.g., porous yttria-stabilized zirconia. These porous plates in these examples allow the binder to diffuse away from the film during the burning out or the sintering step. In some of these examples, the burning out and sintering step can be accomplished simultaneously in part because of these porous setter plates. In some examples, the small amount of pressure is just the pressure applied by the weight of the setter plate resting on top of the green film during the sintering process with no additional pressure applied externally.

iv. Vacuum Sintering

In some examples, the sintering is conducted as described above but with the sintering film in a vacuum chamber. In this example, a vacuum is provided to withdraw gases trapped within the ceramic that is sintering. In some of these examples, gases trapped within the ceramic prevent the ceramic from further sintering by applying a pressure within pore spaces which can be prevent the sintering ceramic from densifying beyond a certain point. By removing trapped gases using a vacuum system, pores that did contain gas can be sintered and densified more so than they could if the vacuum system did not withdraw the trapped gases.

v. Field Assisted, Flash, and Fast Sintering

The field assisted sintering technique (FAST) sintering is capable of enhancing sintering kinetics. The application of a field will move electrons, holes, and/or ions in the sintering material, which then heat the material via Joule heating. The heating is focused at spots where resistance is highest ($P=I^2R$, wherein I is current, and R is resistance) which tend to be at the particle-particle necks. These spots are precisely where sintering is desired, so FAST sintering can be especially effective. A standard garnet sintering procedure can, in some examples, take 6-36 hours at 1050-1200° C. In contrast, FAST sintering of garnets can occur at 600° C. and less than 5 minutes. The advantages are lower cost processing (higher throughput), lower reactivity (at lower temperature, the garnet is less likely to react with other components), and lower lithium loss (lithium evaporation is a dominant failure mode preventing effective sintering). FAST sintering of garnets is most effective at low current and for short time. Since garnet material has high ion conductivity, low current is preferable, as is AC current, so that bulk transport of ions does not occur. Parameters may span: 1 min<time<1hr, 500<temp<1050° C., 1 Hz<frequency<1 MHz, 1V<VAC rms<20V. In some examples, FAST sintering is used in conjunction with hot pressing, which includes applying a uniaxial pressure to the film during sintering. In some examples, FAST sintering is used in conjunction with hot pressing onto a permanent substrate, such as a metal, e.g., a current collector. In some examples, FAST sintering is used in conjunction with constrained sintering, in which the film is pinned, or constrained physically, but without a significant amount of pressure. In some examples, FAST sintering is used in conjunction with bilayer sintering (and tri-layer sintering, e.g., electrolyte-metal-electrolyte), to both provide mechanical support and to simultaneously form a current collector in one step. In some examples, FAST sintering is used in conjunction with vacuum sintering, in which sintering occurs in a low absolute pressure to promote pore removal.

In some embodiments, disclosed herein is a process of making thin films, including providing an unsintered thin film; wherein the unsintered thin film includes at least one member selected from the group consisting of a Garnet-type electrolyte, an active electrode material, a conductive additive, a solvent, a binder, and combinations thereof. In some examples, the processes further include removing the solvent, if present in the unsintered thin film. In some examples, the process optionally includes laminating the film to a surface. In some examples, the process includes removing the binder, if present in the film. In some examples, the process includes sintering the film, wherein sintering comprises heat sintering or field assisted sintering (FAST). In some of these examples, heat sintering includes heating the film in the range from about 700° C. to about 1200° C. for about 1 to about 600 minutes and in atmosphere having an oxygen partial pressure in the range $1*10^{-1}$ to $1*10^{-15}$ atm. In other examples, FAST sintering includes heating the film in the range from about 500° C. to about 900° C. and applying a D.C. or A.C. electric field to the thin film.

In some embodiments, disclosed herein is a process of making a film, including providing an unsintered thin film; wherein the unsintered thin film includes at least one member selected from the group consisting of a Garnet-type electrolyte, an active electrode (e.g., cathode) material, a conductive additive, a solvent, a binder, and combinations thereof. In some examples, the processes further include removing the solvent, if present in the unsintered thin film. In some examples, the process optionally includes laminating the film to a surface. In some examples, the process includes removing the binder, if present in the film. In some examples, the process includes sintering the film, wherein sintering comprises heat sintering. In some of these examples, heat sintering includes heating the film in the range from about 700° C. to about 1200° C. for about 1 to about 600 minutes and in atmosphere having an oxygen partial pressure in the range of $1*10^1$ atm to $1*10^{-15}$ atm.

In some embodiments, disclosed herein is a process of making a film, including providing an unsintered thin film;

wherein the unsintered thin film includes at least one member selected from the group consisting of a Garnet-type electrolyte, an active electrode material, a conductive additive, a solvent, a binder, and combinations thereof. In some examples, the processes further include removing the solvent, if present in the unsintered thin film. In some examples, the process optionally includes laminating the film to a surface. In some examples, the process includes removing the binder, if present in the film. In some examples, the process includes sintering the film, wherein sintering includes field assisted sintering (FAST). In some of these examples, FAST sintering includes heating the film in the range from about 500° C. to about 900° C. and applying a D.C. or A.C. electric field to the thin film.

In any of the processes set forth herein, the unsintered thin film may include a lithium-stuffed garnet electrolyte or precursors thereto. In any of the processes set forth herein, the unsintered thin film may include a lithium-stuffed garnet electrolyte doped with alumina.

In any of the processes set forth herein, heat sintering may include heating the film in the range from about 400° C. to about 1200° C.; or about 500° C. to about 1200° C.; or about 900° C. to about 1200° C.; or about 1000° C. to about 1200° C.; or about 1100° C. to about 1200° C.

In any of the processes set forth herein, the processes may include heating the film for about 1 to about 600 minutes. In any of the processes set forth herein, the processes may include heating the film for about 20 to about 600 minutes. In any of the processes set forth herein, the processes may include heating the film for about 30 to about 600 minutes. In any of the processes set forth herein, the processes may include heating the film for about 40 to about 600 minutes. In any of the processes set forth herein, the processes may include heating the film for about 50 to about 600 minutes. In any of the processes set forth herein, the processes may include heating the film for about 60 to about 600 minutes. In any of the processes set forth herein, the processes may include heating the film for about 70 to about 600 minutes. In any of the processes set forth herein, the processes may include heating the film for about 80 to about 600 minutes. In any of the processes set forth herein, the processes may include heating the film for about 90 to about 600 minutes. In any of the processes set forth herein, the processes may include heating the film for about 100 to about 600 minutes. In any of the processes set forth herein, the processes may include heating the film for about 120 to about 600 minutes. In any of the processes set forth herein, the processes may include heating the film for about 140 to about 600 minutes. In any of the processes set forth herein, the processes may include heating the film for about 160 to about 600 minutes. In any of the processes set forth herein, the processes may include heating the film for about 180 to about 600 minutes. In any of the processes set forth herein, the processes may include heating the film for about 200 to about 600 minutes. In any of the processes set forth herein, the processes may include heating the film for about 300 to about 600 minutes. In any of the processes set forth herein, the processes may include heating the film for about 350 to about 600 minutes. In any of the processes set forth herein, the processes may include heating the film for about 400 to about 600 minutes. In any of the processes set forth herein, the processes may include heating the film for about 450 to about 600 minutes. In any of the processes set forth herein, the processes may include heating the film for about 500 to about 600 minutes. In any of the processes set forth herein, the processes may include heating the film for about 1 to about 500 minutes. In any of the processes set forth herein, the processes may include heating the film for about 1 to about 400 minutes. In any of the processes set forth herein, the processes may include heating the film for about 1 to about 300 minutes. In any of the processes set forth herein, the processes may include heating the film for about 1 to about 200 minutes. In any of the processes set forth herein, the processes may include heating the film for about 1 to about 100 minutes. In any of the processes set forth herein, the processes may include heating the film for about 1 to about 50 minutes.

In any of the processes set forth herein, the FAST sintering may include heating the film in the range from about 400° C. to about 1200° C. and applying a D.C. or A.C. electric field to the thin film. In some examples, FAST sintering includes heating the film in the range from about 400° C. to about 900° C. and applying a D.C. or A.C. electric field to the thin film. In some examples, FAST sintering includes heating the film in the range from about 600° C. to about 1150° C. and applying a D.C. or A.C. electric field to the thin film. In some examples, FAST sintering includes heating the film in the range from about 700° C. to about 900° C. and applying a D.C. or A.C. electric field to the thin film. In some examples, FAST sintering includes heating the film in the range from about 800° C. to about 900° C. and applying a D.C. or A.C. electric field to the thin film. In some examples, FAST sintering includes heating the film in the range from about 500° C. to about 800° C. and applying a D.C. or A.C. electric field to the thin film. In some examples, FAST sintering includes heating the film in the range from about 500° C. to about 700° C. and applying a D.C. or A.C. electric field to the thin film. In some examples, FAST sintering includes heating the film in the range from about 500° C. to about 600° C. and applying a D.C. or A.C. electric field to the thin film.

In any of the processes set forth herein, the FAST sintering may include heating the film in the range from about 400° C. to about 1000° C. and applying a D.C. electric field to the thin film. In some examples, FAST sintering includes heating the film in the range from about 600° C. to about 900° C. and applying a D.C. electric field to the thin film. In some examples, FAST sintering includes heating the film in the range from about 600° C. to about 900° C. and applying a D.C. electric field to the thin film. In some examples, FAST sintering includes heating the film in the range from about 700° C. to about 900° C. and applying a D.C. electric field to the thin film. In some examples, FAST sintering includes heating the film in the range from about 800° C. to about 900° C. and applying a D.C. electric field to the thin film. In some examples, FAST sintering includes heating the film in the range from about 500° C. to about 800° C. and applying a D.C. electric field to the thin film. In some examples, FAST sintering includes heating the film in the range from about 500° C. to about 700° C. and applying a D.C. electric field to the thin film. In some examples, FAST sintering includes heating the film in the range from about 500° C. to about 600° C. and applying a D.C. electric field to the thin film.

In any of the processes set forth herein, the FAST sintering may include heating the film in the range from about 400° C. to about 1000° C. and applying an A.C. electric field to the thin film. In any of the processes set forth herein, the FAST sintering may include heating the film in the range from about 500° C. to about 900° C. and applying an A.C. electric field to the thin film. In some examples, FAST sintering includes heating the film in the range from about 600° C. to about 900° C. and applying an A.C. electric field to the thin film. In some examples, FAST sintering includes heating the film in the range from about 700° C. to about 900° C. and applying an A.C. electric field to the thin film. In some examples, FAST sintering includes heating the film in the range from about 800° C. to about 900° C. and applying an A.C. electric field to the thin film. In some examples, FAST sintering includes heating the film in the range from about 500° C. to about 800° C. and applying an A.C. electric field to the thin film. In some examples, FAST sintering includes heating the film in the range from about 500° C. to about 700° C. and applying an A.C. electric field to the thin film. In some examples, FAST sintering includes heating the film in the range from about 500° C. to about 600° C. and applying an A.C. electric field to the thin film.

In certain examples, the processes set forth herein include providing an unsintered thin film by casting a film according to a casting processes set forth in the instant disclosure.

In some of the processes disclosed herein, the sintering occurs between inert setter plates. In some examples, when the sintering occurs between inert setter plates, a pressure is applied by the setter plates onto the sintering film. In certain examples, the pressure is between 0.1 and 1000 pounds per square inch (PSI). In some examples, the pressure is 0.1 PSI. In some examples, the pressure is 0.2 PSI. In some examples, the pressure is 0.3 PSI. In some examples, the pressure is 0.4 PSI. In some examples, the pressure is 0.5 PSI. In some examples, the pressure is 0.6 PSI. In some examples, the pressure is 0.7 PSI. In some examples, the pressure is 0.8 PSI. In some examples, the pressure is 0.9 PSI. In some examples, the pressure is 1 PSI. In some examples, the pressure is 2 PSI. In other examples, the pressure is 10 PSI. In still others, the pressure is 20 PSI. In some other examples, the pressure is 30 PSI. In certain examples, the pressure is 40 PSI. In yet other examples, the pressure is 50 PSI. In some examples, the pressure is 60 PSI. In yet other examples, the pressure is 70 PSI. In certain examples, the pressure is 80 PSI. In other examples, the pressure is 90 PSI. In yet other examples, the pressure is 100 PSI. In some examples, the pressure is 110 PSI. In other examples, the pressure is 120 PSI. In still others, the pressure is 130 PSI. In some other examples, the pressure is 140 PSI. In certain examples, the pressure is 150 PSI. In yet other examples, the pressure is 160 PSI. In some examples, the pressure is 170 PSI. In yet other examples, the pressure is 180 PSI. In certain examples, the pressure is 190 PSI. In other examples, the pressure is 200 PSI. In yet other examples, the pressure is 210 PSI. In some of the above examples, the pressure is 220 PSI. In other examples, the pressure is 230 PSI. In still others, the pressure is 240 PSI. In some other examples, the pressure is 250 PSI. In certain examples, the pressure is 260 PSI. In yet other examples, the pressure is 270 PSI. In some examples, the pressure is 280 PSI. In yet other examples, the pressure is 290 PSI. In certain examples, the pressure is 300 PSI. In other examples, the pressure is 310 PSI. In yet other examples, the pressure is 320 PSI. In some examples, the pressure is 330 PSI. In other examples, the pressure is 340 PSI. In still others, the pressure is 350 PSI. In some other examples, the pressure is 360 PSI. In certain examples, the pressure is 370 PSI. In yet other examples, the pressure is 380 PSI. In some examples, the pressure is 390 PSI. In yet other examples, the pressure is 400 PSI. In certain examples, the pressure is 410 PSI. In other examples, the pressure is 420 PSI. In yet other examples, the pressure is 430 PSI. In some other examples, the pressure is 440 PSI. In certain examples, the pressure is 450 PSI. In yet other examples, the pressure is 460 PSI. In some examples, the pressure is 470 PSI. In yet other examples, the pressure is 480 PSI. In certain examples, the pressure is 490 PSI. In other examples, the pressure is 500 PSI. In yet other examples, the pressure is 510 PSI. In some of the above examples, the pressure is 520 PSI. In other examples, the pressure is 530 PSI. In still others, the pressure is 540 PSI. In some other examples, the pressure is 550 PSI. In certain examples, the pressure is 560 PSI. In yet other examples, the pressure is 570 PSI. In some examples, the pressure is 580 PSI. In yet other examples, the pressure is 590 PSI. In certain examples, the pressure is 600 PSI. In other examples, the pressure is 610 PSI. In yet other examples, the pressure is 620 PSI. In some examples, the pressure is 630 PSI. In other examples, the pressure is 640 PSI. In still others, the pressure is 650 PSI. In some other examples, the pressure is 660 PSI. In certain examples, the pressure is 670 PSI. In yet other examples, the pressure is 680 PSI. In some examples, the pressure is 690 PSI. In yet other examples, the pressure is 700 PSI. In certain examples, the pressure is 710 PSI. In other examples, the pressure is 720 PSI. In yet other examples, the pressure is 730 PSI. In some other examples, the pressure is 740 PSI. In certain examples, the pressure is 750 PSI. In yet other examples, the pressure is 760 PSI. In some examples, the pressure is 770 PSI. In yet other examples, the pressure is 780 PSI. In certain examples, the pressure is 790 PSI. In other examples, the pressure is 800 PSI. In yet other examples, the pressure is 810 PSI. In other examples, the pressure is 820 PSI. In certain aforementioned examples, the pressure is 830 PSI. In still others, the pressure is 840 PSI. In some other examples, the pressure is 850 PSI. In certain examples, the pressure is 860 PSI. In yet other examples, the pressure is 870 PSI. In some examples, the pressure is 880 PSI. In yet other examples, the pressure is 890 PSI. In certain examples, the pressure is 900 PSI. In other examples, the pressure is 910 PSI. In yet other examples, the pressure is 920 PSI. In some examples, the pressure is 930 PSI. In other examples, the pressure is 940 PSI. In still others, the pressure is 950 PSI. In some other examples, the pressure is 960 PSI. In certain examples, the pressure is 970 PSI. In yet other examples, the pressure is 980 PSI. In some examples, the pressure is 990 PSI. In yet other examples, the pressure is 1000 PSI.

In some examples, the setter plates can be porous. In some other examples, the setter plates are not porous. In other instance, the setter plates may be made of a garnet material described herein. In some examples, the setter plates can be porous garnet setter plates. In other instance, the setter plates may be made of zirconia. In some examples, the setter plates can be porous zirconia setter plates. In other instance, the setter plates may be made of a metal material described herein. In some examples, the setter plates can be porous metal setter plates.

In some examples, the garnet-based setter plates are useful for imparting beneficial surface properties to the sintered film. These beneficial surface properties include flatness and conductivity useful for battery applications. These beneficial properties also include preventing Li evaporation during sintering. These beneficial properties may also include preferencing a particular garnet crystal structure. In certain processes disclosed herein, the inert setter plates are selected from porous zirconia, graphite or conductive metal plates. In some other of these processes, the inert setter plates are graphite. In yet other processes, the inert setter plates are conductive metal plates.

vi. Bilayer and Trilayer Sintering

In some examples, the films which are sintered are provided as layers of a garnet-based electrolyte in contact with a metal layer which is then in contact with another garnet-based electrolyte layer.

vii. Heat Sintering

In some embodiments, disclosed herein is a process of making an energy storage electrode, including providing an unsintered thin film; wherein the unsintered thin film includes at least one member selected from the group consisting of a garnet-based electrolyte, an active electrode material, a conductive additive, a solvent, a binder, and combinations thereof. In some examples, the processes further include removing the solvent, if present in the unsintered thin film. In some examples, the process optionally includes laminating the film to a surface. In some examples, the process includes removing the binder, if present in the film. In some examples, the process includes sintering the film, wherein sintering comprises heat sintering. In some of these examples, heat sintering includes heating the film in the range from about 700° C. to about 1200° C. for about 1 to about 600 minutes and in atmosphere having an oxygen partial pressure in the range of $10^{-1}$ atm to $10^{-21}$ atm.

In some embodiments, disclosed herein is a process of making an energy storage electrode, including providing an unsintered thin film; wherein the unsintered thin film includes at least one member selected from the group consisting of a Garnet-type electrolyte, an active electrode material, a conductive additive, a solvent, a binder, and combinations thereof. In some examples, the processes further include removing the solvent, if present in the unsintered thin film. In some examples, the process optionally includes laminating the film to a surface. In some examples, the process includes removing the binder, if present in the film. In some examples, the process includes sintering the film, wherein sintering includes field assisted sintering (FAST). In some of these examples, FAST sintering includes heating the film in the range from about 500° C. to about 900° C. and applying a D.C. or A.C. electric field to the thin film.

In any of the processes set forth herein, the unsintered thin film may include a Garnet-type electrolyte. In other processes, the unsintered thin film may include an active electrode material. In still other processes, the unsintered thin film may include a conductive additive. In certain processes, the unsintered thin film may include a solvent. In certain processes, the unsintered thin film may include a binder.

In any of the processes set forth herein, heat sintering may include heating the film in the range from about 700° C. to about 1200° C.; or about 800° C. to about 1200° C.; or about 900° C. to about 1200° C.; or about 1000° C. to about 1200° C.; or about 1100° C. to about 1200° C. In any of the processes set forth herein, heat sintering can include heating the film in the range from about 700° C. to about 1100° C.; or about 700° C. to about 1000° C.; or about 700° C. to about 900° C.; or about 700° C. to about 800° C. In any of the processes set forth herein, heat sintering can include heating the film to about 700° C., about 750° C., about 850° C., about 800° C., about 900° C., about 950° C., about 1000° C., about 1050° C., about 1100° C., about 1150° C., or about 1200° C. In any of the processes set forth herein, heat sintering can include heating the film to 700° C., 750° C., 850° C., 800° C., 900° C., 950° C., 1000° C., 1050° C., 1100° C., 1150° C., or 1200° C. In any of the processes set forth herein, heat sintering can include heating the film to 700° C. In any of the processes set forth herein, heat sintering can include heating the film to 750° C. In any of the processes set forth herein, heat sintering can include heating the film to 850° C. In any of the processes set forth herein, heat sintering can include heating the film to 900° C. In any of the processes set forth herein, heat sintering can include heating the film to 950° C. In any of the processes set forth herein, heat sintering can include heating the film to 1000° C. In any of the processes set forth herein, heat sintering can include heating the film to 1050° C. In any of the processes set forth herein, heat sintering can include heating the film to 1100° C. In any of the processes set forth herein, heat sintering can include heating the film to 1150° C. In any of the processes set forth herein, heat sintering can include heating the film to 1200° C.

In any of the processes set forth herein, the processes may include heating the film for about 1 to about 600 minutes. In any of the processes set forth herein, the processes may include heating the film for about 20 to about 600 minutes. In any of the processes set forth herein, the processes may include heating the film for about 30 to about 600 minutes. In any of the processes set forth herein, the processes may include heating the film for about 40 to about 600 minutes. In any of the processes set forth herein, the processes may include heating the film for about 50 to about 600 minutes. In any of the processes set forth herein, the processes may include heating the film for about 60 to about 600 minutes. In any of the processes set forth herein, the processes may include heating the film for about 70 to about 600 minutes. In any of the processes set forth herein, the processes may include heating the film for about 80 to about 600 minutes. In any of the processes set forth herein, the processes may include heating the film for about 90 to about 600 minutes. In any of the processes set forth herein, the processes may include heating the film for about 100 to about 600 minutes. In any of the processes set forth herein, the processes may include heating the film for about 120 to about 600 minutes. In any of the processes set forth herein, the processes may include heating the film for about 140 to about 600 minutes. In any of the processes set forth herein, the processes may include heating the film for about 160 to about 600 minutes. In any of the processes set forth herein, the processes may include heating the film for about 180 to about 600 minutes. In any of the processes set forth herein, the processes may include heating the film for about 200 to about 600 minutes. In any of the processes set forth herein, the processes may include heating the film for about 300 to about 600 minutes. In any of the processes set forth herein, the processes may include heating the film for about 350 to about 600 minutes. In any of the processes set forth herein, the processes may include heating the film for about 400 to about 600 minutes. In any of the processes set forth herein, the processes may include heating the film for about 450 to about 600 minutes. In any of the processes set forth herein, the processes may include heating the film for about 500 to about 600 minutes. In any of the processes set forth herein, the processes may include heating the film for about 1 to about 500 minutes. In any of the processes set forth herein, the processes may include heating the film for about 1 to about 400 minutes. In any of the processes set forth herein, the processes may include heating the film for about 1 to about 300 minutes. In any of the processes set forth herein, the processes may include heating the film for about 1 to about 200 minutes. In any of the processes set forth herein, the processes may include heating the film for about 1 to about 100 minutes. In any of the processes set forth herein, the processes may include heating the film for about 1 to about 50 minutes.

viii. Laminating

In some of the processes set forth herein the laminating includes applying a pressure less than 1000 pounds per square inch (PSI) and heating the film. In other embodiments, the laminating includes applying a pressure less than 750 pounds per square inch (PSI) and heating the film. In some other embodiments, laminating includes applying a pressure less than 700 pounds per square inch (PSI) and heating the film. In other embodiments, the laminating includes applying a pressure less than 650 pounds per square inch (PSI) and heating the film. In some other embodiments, laminating includes applying a pressure less than 600 pounds per square inch (PSI) and heating the film. In other embodiments, the laminating includes applying a pressure less than 550 pounds per square inch (PSI) and heating the film. In some other embodiments, laminating includes applying a pressure less than 500 pounds per square inch (PSI) and heating the film. In other embodiments, the laminating includes applying a pressure less than 450 pounds per square inch (PSI) and heating the film. In some other embodiments, laminating includes applying a pressure less than 400 pounds per square inch (PSI) and heating the film. In other embodiments, the laminating includes applying a pressure less than 350 pounds per square inch (PSI) and heating the film. In some other embodiments, laminating includes applying a pressure less than 300 pounds per square inch (PSI) and heating the film. In other embodiments, the laminating includes applying a pressure less than 250 pounds per square inch (PSI) and heating the film. In some other embodiments, laminating includes applying a pressure less than 200 pounds per square inch (PSI) and heating the film. In other embodiments, the laminating includes applying a pressure less than 150 pounds per square inch (PSI) and heating the film.

In some other embodiments, laminating includes applying a pressure less than 100 pounds per square inch (PSI) and heating the film. In other embodiments, the laminating includes applying a pressure less than 50 pounds per square inch (PSI) and heating the film. In some other embodiments, laminating includes applying a pressure less than 10 pounds per square inch (PSI) and heating the film. Some of the laminating processes set forth herein include heating the film is heated to about 80° C. Some of the laminating processes set forth herein include heating the film is heated to about 25° C. to about 180° C. Some of the laminating processes are substantially uniaxial, whereas some of the laminating processes set forth herein include substantially isostatic pressure application.

In some of the processes disclosed herein, the laminating step includes laminating an unsintered thin film electrolyte to a composite electrode; wherein the composite electrode includes at least one member selected from the group consisting of an electrolyte, an active electrode material, a conductive additive, and combinations thereof. In certain of these embodiments, the composite electrode includes an electrolyte. In certain other of these embodiments, the composite electrode includes an active electrode material. In some other of these embodiments, the composite electrode includes a conductive additive.

VIII. Applications

In some examples, including any of the foregoing, set forth herein is an electrochemical cell, which includes an electrolyte, powder, pellet, film, multiphase film, or monolith set forth herein.

In some examples, including any of the foregoing, set forth herein is a battery, which includes an electrochemical cell described herein.

In some examples, including any of the foregoing, set forth herein is an electric vehicle, which includes an electrochemical cell described herein.

In some examples, including any of the foregoing, set forth herein is a battery, which includes an electrolyte, powder, pellet, film, multiphase film, or monolith set forth herein.

In some examples, including any of the foregoing, set forth herein is an electric vehicle, which includes a battery described herein.

EXAMPLES

Scanning electron microscopy (SEM) was performed in a FEI Quanta 400 scanning electron microscope, a Helios 600i, or a Helios 660 FIB-SEM. XRD was performed in a Bruker D8 Advance ECO or a Rigaku Miniflex 2. Cross-section imaging was performed using a FEI Quanta 400F Scanning Electron Microscope (SEM). The cross-section was prepared by fracturing specimen and followed by a thin layer of Au coating. Electrical impedance spectroscopy (EIS) and conductivity measurements were performed with a Biologic VMP3, VSP, VSP-300, SP-150, or SP-200 instrument. DC cycling was performed with an Arbin BT-2043 or BT-G. Chemical reagents and solvents were purchased commercially and used without purification, unless otherwise noted. Electrochemical cells were constructed with blocking electrodes unless specified otherwise.

Example 1: Making a Powder Having a Primary Cubic Phase Lithium-Stuffed Garnet with Trace Amounts of Secondary Phase Inclusions This Example shows how to make a powder, which is primarily cubic phase lithium-stuffed garnet, but which includes trace amounts of secondary phase inclusions in the primary phase.

Figure 2:
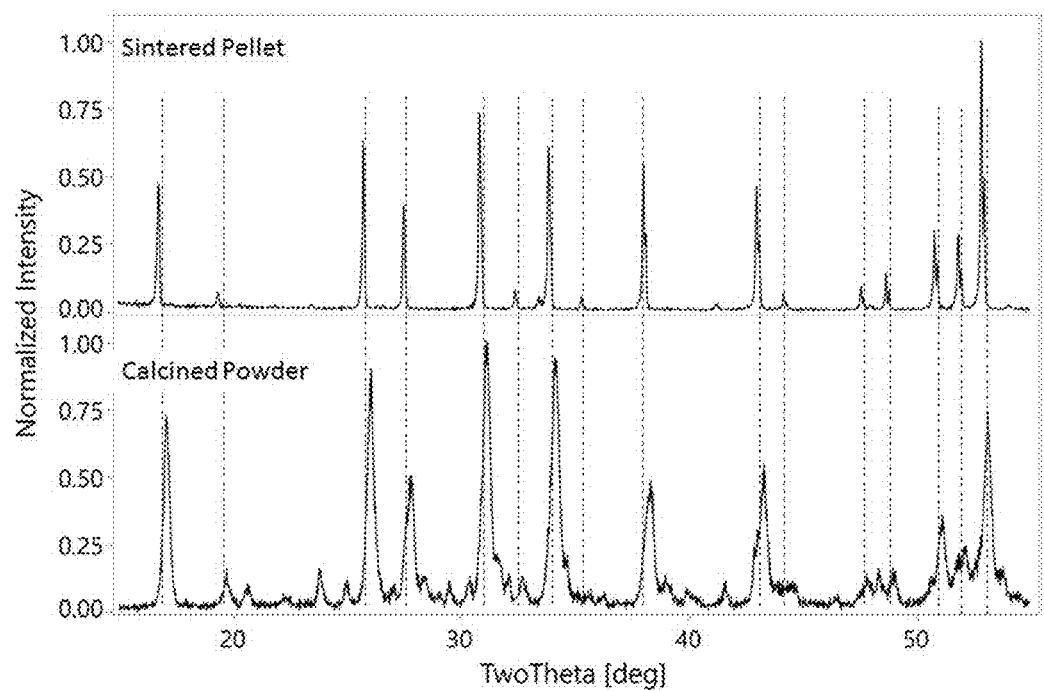
FIG. 2 shows overlaid x-ray powder diffraction (XRD) patterns of the calcined powder prepared in Example 1 (bottom plot) and a sintered pellet prepared in Example 2 (top plot).

In this example, a cubic phase lithium-stuffed garnet powder, characterized as $Li_7La_3Zr_2O_{12}$-(0.22-0.025)$Al_2O_3$, was prepared. A mixture was first prepared which included 61.4 g of lithium hydroxide, 195.5 g of lanthanum oxide, 99.6 g of zirconium oxide and 53.6 g of aluminum nitrate nonahydrate. This mixture was placed in a Nalgene jar with Yttria stabilized Zirconia media and 2-propanol. The mixture was ball milled for 18-28 hours to reduce the mixture particle size. 2-propanol was removed from the mixture using a roto-evaporation tool. The resulting powder was dried. Once the powder was dried, the powder was crushed and sieved through an 80-mesh sieve. The sieved powder was placed in an alumina ($Al_2O_3$) crucible and heated in a box furnace at the rate of 2-8° C./min to 700-1100° C. for a 4-8 hour dwell time. The resulting calcined powder was collected and analyzed by XRD, the results of which are shown in FIG. 2 (bottom plot labeled Calcined Powder). The vertical dash lines in FIG. 2 are a reference pattern which indicates the XRD peaks for lithium-stuffed garnet having the chemical formula $Li_7La_3Zr_2O_{12}(x)Al_2O_3$, wherein x represents the solubility range of $Al_2O_3$ in $Li_7La_3Zr_2O_{12}$. FIG. 2 shows that the calcined powder includes lithium-stuffed garnet and also includes secondary phases. The secondary phases are indicated by the XRD peaks which are not associated by the vertical dash reference pattern lines.

Example 2: Making a Sintered Pellet from the Powder of Example 1

This Example shows how to make a sintered pellet.

The calcined powder from Example 1 was further processed by attrition milling in a solvent to a median particle size of $d_{50}$=2.7 um. Into the milled particle slurry was dissolved poly-vinyl-butyryl polymeric binder in a proportion of 4% wt relative to the weight of inorganic solids (i.e., $Li_7La_3Zr_2O_{12}(x)Al_2O_3$, wherein x represents the solubility range of $Al_2O_3$ plus any secondary phases). This slurry was dried, and the resulting powder crushed and sieved, through an 80-mesh sieve. The sieved powder was pressed in a 13 mm die under 4000 lbs, and the resulting pellets were sintered at 1000-1250° C. for 4-8 hours. The resulting sintered pellet was analyzed by XRD, the results of which are shown in FIG. 2 (top plot labeled Sintered Pellet). FIG. 2 shows that in the sintered pellet, the entire XRD pattern is primarily $Li_7$—$La_3Zr_2O_{12}(x)Al_2O_3$, wherein x represents the solubility range of $Al_2O_3$ in $Li_7La_3Zr_2O_{12}$. The small peaks associated with the secondary phases in the calcined powder are less apparent (i.e., not present in large enough quantities) in the sintered pellet.

The metal composition of the sintered pellet was measured by inductively coupled plasma spectroscopy (ICP), the results of which are shown in Table 1 (below). The results show a slight deviation from the batched composition ($Li_{6.4}La_3Zr_2O_{12}$-$0.175Al_2O_3$). The slightly higher Al content observed in the sintered pellets is due to reaction with the Alumina crucibles used to process the material.

TABLE 1

| ICP Results | | | | |
|---|---|---|---|---|
| Element | Li | La | Zr | Al |
| Batched Molar ratio of mixture in Example 1 before calcination | 6.4 | 3.00 | 2.00 | 0.35 |
| ICP Molar ratio sintered pellet in Example 2 | 6.3 | 3.08 | 2.00 | 0.446 |

Example 3: Making a Pellet Using the Powder Having a Primary Cubic Phase Lithium-Stuffed Garnet with More Secondary Phase Inclusions than in Example 1

This Example shows how to make a powder which is primarily cubic phase lithium-stuffed garnet but which includes more secondary phase inclusions in the primary phase than in Example 1.

Figure 3:
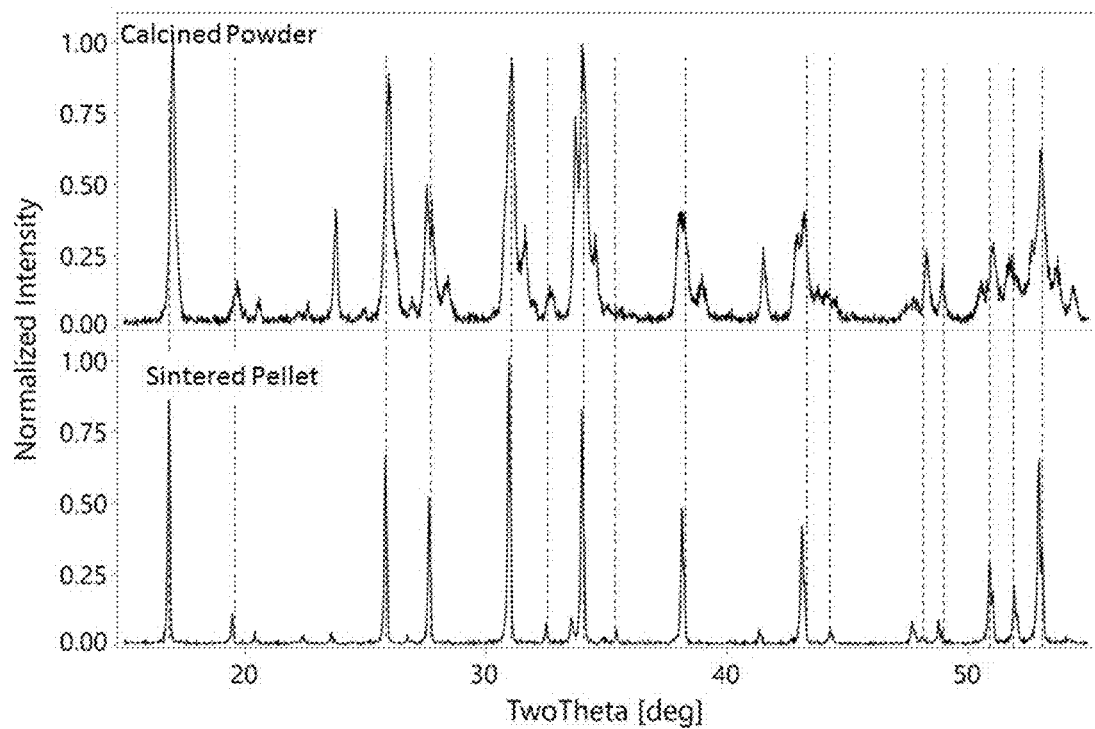
FIG. 3 shows overlaid x-ray powder diffraction (XRD) patterns of the calcined powder prepared in Example 3 (top plot) and a sintered pellet prepared in Example 4 (bottom plot).

In this example, a cubic phase lithium-stuffed garnet powder, characterized as $Li_7La_3Zr_2O_{12}(0.5)Al_2O_3$, was prepared. A mixture was first prepared which included 63.0 g of lithium hydroxide, 181.0 g of lanthanum oxide, 92.2 g of zirconium oxide and 141.8 g of aluminum nitrate nonahydrate. As batched, this mixture had the following empirical molar ratios of constituent atoms: $Li_{7.1}La_3Zr_2O_{12}$-$0.5Al_2O_3$. This mixture was placed in a Nalgene jar with Yttria stabilized Zirconia media and 2-propanol. The mixture was ball milled for 18-28 hours to reduce the mixture particle size. 2-propanol was removed from the mixture using a roto-evaporation tool. The resulting powder was dried. Once the powder was dried, the powder was crushed and sieved through an 80-mesh sieve. The sieved powder was placed in an alumina (Al-203) crucible and heated in a box furnace at the rate of 2-8° C./min to 700-1100° C. for a 4-8 hour dwell time. The resulting calcined powder was collected and analyzed by XRD, the results of which are shown in FIG. 3 (top plot labeled Calcined Powder). The vertical dash lines in FIG. 2 are a reference pattern which indicates the XRD peaks for lithium-stuffed garnet having the chemical formula $Li_7La_3Zr_2O_{12}(x)Al_2O_3$, wherein x represents the solubility range of $Al_2O_3$ in $Li_7La_3Zr_2O_{12}$. FIG. 2 shows that the calcined powder includes lithium-stuffed garnet and also includes secondary phases. The secondary phases are indicated by the XRD peaks which are not associated by the vertical dash reference pattern lines. In addition to the dashed lines, several other diffraction lines are observed corresponding to the secondary phases $LiAlO_2$, $LaAlO_3$, and $Li_2ZrO_3$.

After calcination the chemical composition of the powder was determined by inductively coupled plasma spectroscopy (ICP), the results of which are shown in Table 2 (below). A small amount of Li loss occurred during processing in addition to a relatively minor increase in aluminum content, due to reaction with the alumina crucibles.

Example 4: Making a Sintered Pellet from the Powder of Example 1

This Example shows how to make a sintered pellet.

The calcined powder from Example 3 was further processed by attrition milling in a solvent to a median particle size of $d_{50}$=2.7 um. Into the milled particle slurry was dissolved poly-vinyl-butyryl polymeric binder in a proportion of 2-4% wt relative to the weight of inorganic solids (i.e., $Li_7La_3Zr_2O_{12}(x)Al_2O_3$, wherein x represents the solubility range of $Al_2O_3$ plus any secondary phases). This slurry was dried, and the resulting powder crushed and sieved, through a 80-mesh sieve. The sieved powder was pressed in a 13 mm die under 4000 lbs, and the resulting pellets were sintered at 1000-1150° C. for 4-6 hours. The resulting sintered pellet was analyzed by XRD, the results of which are shown in FIG. 3 (bottom plot labeled Sintered Pellet)

The metal composition of the sintered pellet was measured by inductively coupled plasma spectroscopy (ICP), the results of which are shown in Table 2 (below).

TABLE 2

| ICP Results | | | | |
|---|---|---|---|---|
| Element | Li | La | Zr | Al |
| Batched Molar ratio of mixture in Example 3 before calcination | 7.1 | 3.0 | 2.0 | 1.00 |
| ICP Molar ratio of calcined powder in Example 3 | 6.97 | 3.0 | 2.0 | 1.05 |
| ICP Molar ratio sintered pellet in Example 4 | 6.74 | 3.0 | 2.0 | 1.04 |

FIG. 3 shows that the sintered pellet has less secondary phase inclusions than the calcined powder. However, there were more secondary phase inclusions in the calcined powder and sintered pellet from Examples 3 and 4, respectively, than in the calcined powder and sintered pellet from Examples 1 and 2, respectively.

Table 2 shows that the sintered pellet had an increased relative amount of lithium compared to the calcined powder, but little change in the amounts of the other components.

Example 5: Making a Pellet of Lithium-Stuffed Garnet and Secondary Phases

This Example shows how to make a sintered pellet.

In this example, the sieved, binder-coated, downsized powder from Example 3 was pressed in a uniaxial press at 5000 psi to form a 13 mm diameter green pellet. The green pellet was placed on platinum setters in a tube furnace. The binder was removed by heating the green pellet at a rate of 2-8° C./min to a maximum temperature of 120-200° C. for a 2-6 hour dwell time at the maximum temperature. Next, the heated pellet was further heated at a rate of 2-8° C./min to a maximum temperature of 200-500° C. for a 2-4 hour dwell time. The resulting pellet was then sintered by heating the pellet at a heating rate of 2-8° C./min to a maximum temperature of 1100-1175° C. for a dwell time of 2-6 hour dwell time at that maximum temperature. A series of these pellets was prepared. The density of each pellet was measured using the Archimedes process. The density for the lithium-stuffed garnet pellets prepared according to this Example ranged from greater than 95% to 98.5%, inclusive of lithium-stuffed garnet and the secondary phase inclusions.

Example 6: Making a Green Tape of Lithium-Stuffed Garnet with Secondary Phase Inclusions This Example shows how to make a green tape, which can be sintered to form a thin film which is primarily cubic phase lithium-stuffed garnet but which includes secondary phase inclusions in the primary phase.

In this example, the calcined garnet powder from Example 3 was downsized with an equal mass of solvent using attrition mill. The slurry was then dried using a roto-evaporation process. 50 g of the resulting downsized powder, 6 g of a dispersant, 18 g of 2-butanone and ethanol mixture were added to a Nalgene jar and ball milled for 24 hours. A binder solution of an acrylic in 2-butanone was prepared, and, along with a plasticizer, was added to the Nalgene jar from previous step. This mixture was placed on a roller mill on slow speed for 24 hours of ball milling.

The garnet slurry was cast on a silicone coated Mylar carrier using a doctor blade with a blade gap height set at 350 μm. The resulting green tape was dried at room temperature for one hour.

Example 7: Making a Green Tape of Lithium-Stuffed Garnet with Secondary Phase Inclusions This Example shows how to make a green tape, which can be sintered to form a thin film which is primarily cubic phase lithium-stuffed garnet but which includes secondary phase inclusions in the primary phase.

In this example, the calcined garnet powder from Example 3 was downsized with a solvent using attrition mill. The slurry was then dried using a roto-evaporation process. 50 g of the resulting downsized 4 μm sized powder, 6 g a dispersant, 18 g of a mineral spirits and 2-propanol mixture (2:1 ratio by weight mineral spirits:2-propanol) was added to a Nalgene jar and ball milled for 24 hours. A binder solution was prepared, which included polyvinylbutyral (PVB) binder in ethanol and xylenes.

This mixture was placed on a roller mill on slow speed for 24 hours of ball milling. The garnet slurry was cast on a silicone coated Mylar carrier using a doctor blade with a blade gap height set at 350 μm. The resulting green tape was dried at room temperature for one hour.

Example 8: Making a Sintered Lithium-Stuffed Garnet Thin Films with Secondary Phase Inclusions In this example, the garnet green tape from Example 6-7 was punched using a 16 mm diameter punch. The resulting circular shaped discs were placed between two square setter plates also composed of sintered garnet. The circular shaped discs were sintered in a 3" diameter tube furnace under the following protocols: heating rate was 1-5° C./min heating rate to 400° C.-700° C., followed by a dwell time for 2 hours under dry argon. This was followed by a 0.5-10° C./min heating rate to 1125° C. with a dwell time of 6 hour under dry argon $H_2$/argon. This process produced a sintered thin film having secondary phase inclusions. SEM of this sintered thin film is shown in FIGS. 1A, 1B and 9.

The green tape has more secondary phases than in the sintered film. The reaction to form garnet is driven to completion in the higher temperature and longer time during sintering.

In FIG. 1A, 101 indicates lithium-stuffed garnet particles. 102 indicates secondary phase inclusion lithium aluminate ($LiAlO_2$). 103 also shows an inclusion in lithium-stuffed garnet particles.

In FIG. 1B, 104 indicates lithium-stuffed garnet particles. 105 indicates secondary phase inclusion lithium aluminate ($LiAlO_2$). 106 also shows lithium zirconate ($LiZr_2O_3$) inclusion in lithium-stuffed garnet particles. Lanthanum aluminate is also likely present but it is nearly indistinguishable by back-scatter electron microscopy (BSE).

In FIGS. 9, 901, 902, 903, and 904, indicate four phases— lithium-stuffed garnet, lithium aluminate ($LiAlO_4$). lithium zirconate, and lanthanum aluminate.

The sintered films were annealed at 700-1000° C. as set forth in U.S. patent application Ser. No. 15/007,908, filed Jan. 27, 2016, entitled ANNEALED GARNET ELECTROLYTE SEPARATORS, the contents of which are herein incorporated by reference in their entirety for all purposes.

Figure 4:
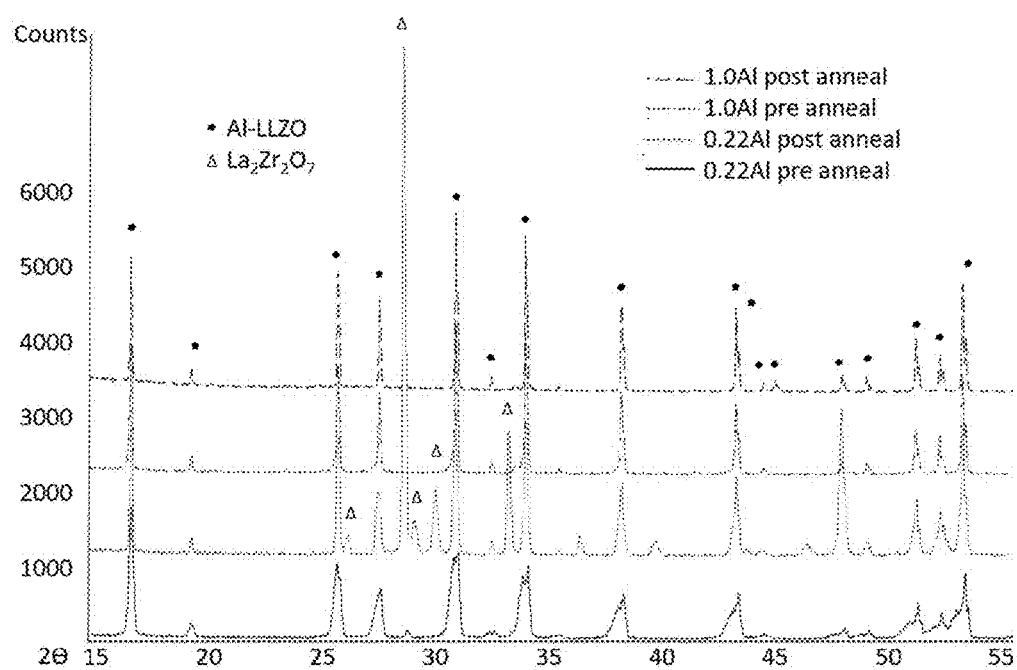
FIG. 4 shows overlayed x-ray diffraction (XRD) pattern results from the annealing experiment in Example 9.

XRD analysis of the films pre- and post-annealing is shown in FIG. 4. In FIG. 4, the top plot shows an XRD pattern for a thin film, batched as $Li_7La_3Zr_2O_{12}(1)Al_2O_3$, post-annealing. The plot second from the top plot shows an XRD pattern for a thin film, batched as $Li_7$—$La_3Zr_2O_{12}(1)Al_2O_3$, pre-annealing. The plot third from the top plot shows an XRD pattern for a thin film, batched as $Li_7La_3Zr_2O_{12}(0.22)Al_2O_3$, post-annealing. The bottom plot shows an XRD pattern for a thin film, batched as $Li_7La_3Zr_2O_{12}(0.22)Al_2O_3$, pre-annealing.

The results show pyrochlore ($La_2Zr_2O_7$) present in the post-annealed $Li_7$—$La_3Zr_2O_{12}(0.22)Al_2O_3$ but not in the post-annealed $Li_7La_3Zr_2O_{12}(1)Al_2O_3$.

The results show an improved thermal stability on account of the secondary phases present in $Li_7La_3Zr_2O_{12}(1)Al_2O_3$.

Figure 8:
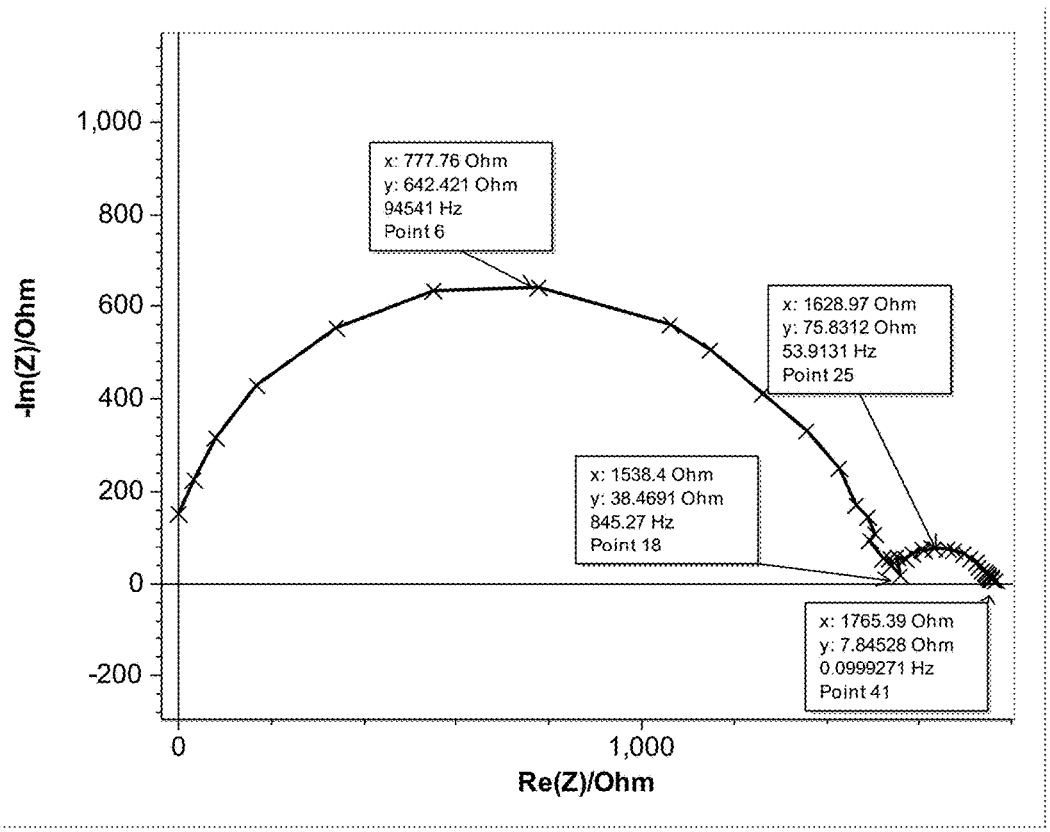
FIG. 8 shows the surface area specific resistance (ASR) for the sintered thin film prepared in Example 8.

The ASR of the film was measured by electrical impedance spectroscopy at negative 15° C. The results are shown in FIG. 8. A symmetric electrochemical stack was provided having Li metal electrodes and the sintered thin film electrolyte in this Example therebetween. This configuration is referred to a symmetric cell Li|garnet|Li cell. EIS spectroscopy was performed on this symmetric cell. The second semicircle in the Nyquist plot is the interfacial resistance, approximately 200Ω in the measurement shown (1765Ω-1538Ω); the ASR is area*resistance=0.5 $cm^2$×200 Ω=100 Ω$cm^2$.

The sintered thin film was analyzed by back-scattered electron (BSE) SEM microscopy. Focused ion beam was used to reveal a cross section. Back-scattered electron (BSE) imaging mode was used to identify chemical contrast between different phases. Both lithium-stuffed garnet and $LaAlO_3$, being rich in Lanthanum, appear very similar under BSE imaging and therefore were not easily separated. However, both $LiAlO_2$ and $Li_2ZrO_3$ appeared with differing contrast and were readily identified. Image processing software was used to quantify the relative proportion of these two phases in this image. See FIG. 12. The volume % results of this are shown below in Table 3:

TABLE 3

Quantification of Secondary Phases by Backscattered Electron Imaging in SEM. H

| Sample | % LiAlO$_2$ | % Li$_2$ZrO$_3$ | % LaAlO$_3$* |
|---|---|---|---|
| 1 | 7.48 | 1.52 | |
| 2 | 9.82 | 5.6 | |
| 3 | 7.19 | 2.48 | 0.15 |
| 4 | 11 | 1.91 | |
| Average | 8.76 | 2.32 | |

FIG. 12 shows an image used for BSE analysis.

Example 9: Properties of Garnet Thin Films with Secondary Phase Inclusions

Films of Example 6-7 were studied by a number of different techniques.

Figure 5:
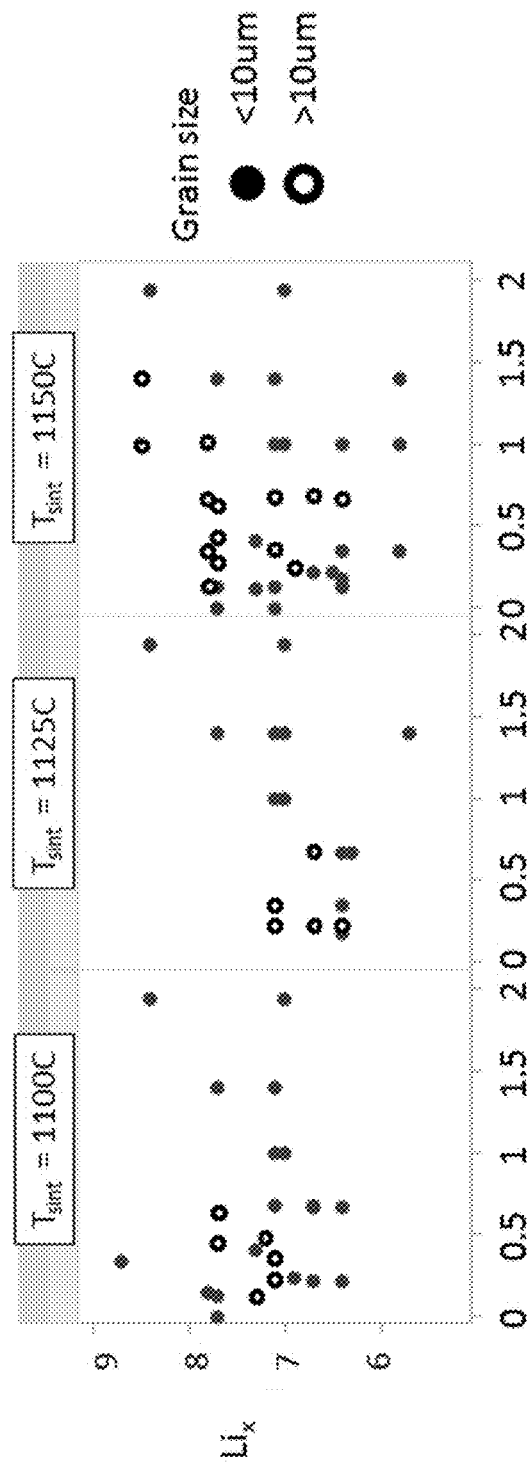
FIG. 5 shows a scatter plot of $d_{50}$ grain sizes for the sintered films prepared in Example 9, wherein grain size is plotted as a function of lithium (Li) content in the lithium-stuffed garnet and as a function of sintering temperature.
Figure 6:
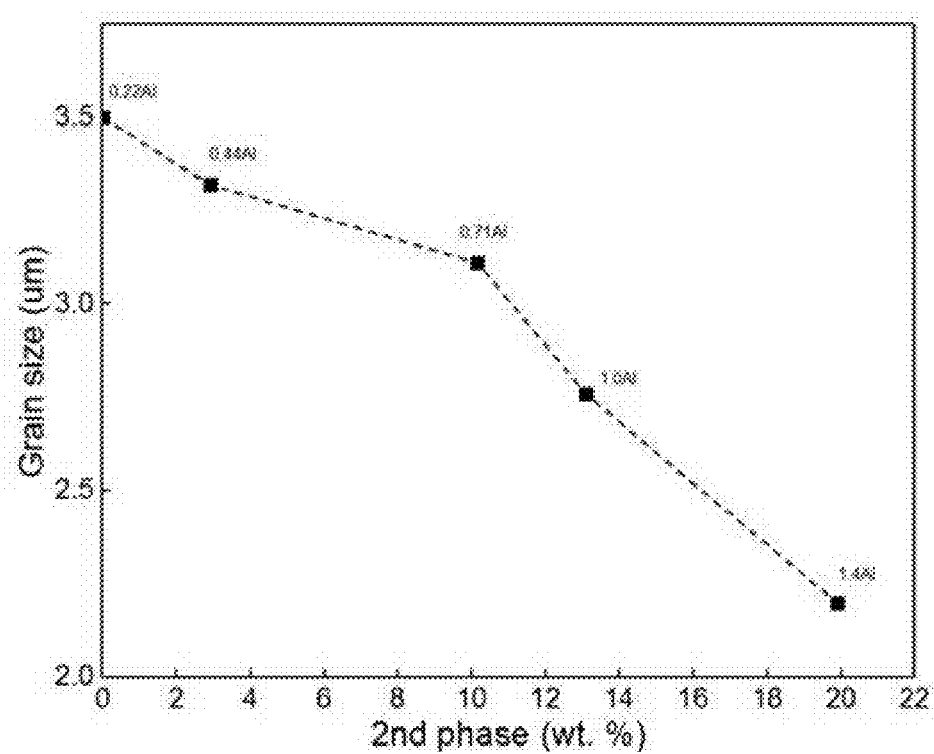
FIG. 6 shows a plot of $d_{50}$ grain size for the sintered films prepared in Example 9 as a function of the aluminum (Al) content in the lithium-stuffed garnet and of the weight percent of the secondary phase inclusions.

The $d_{50}$ grain size of the thin films was determined, the results of which are set forth in FIG. 5.

Figure 7:
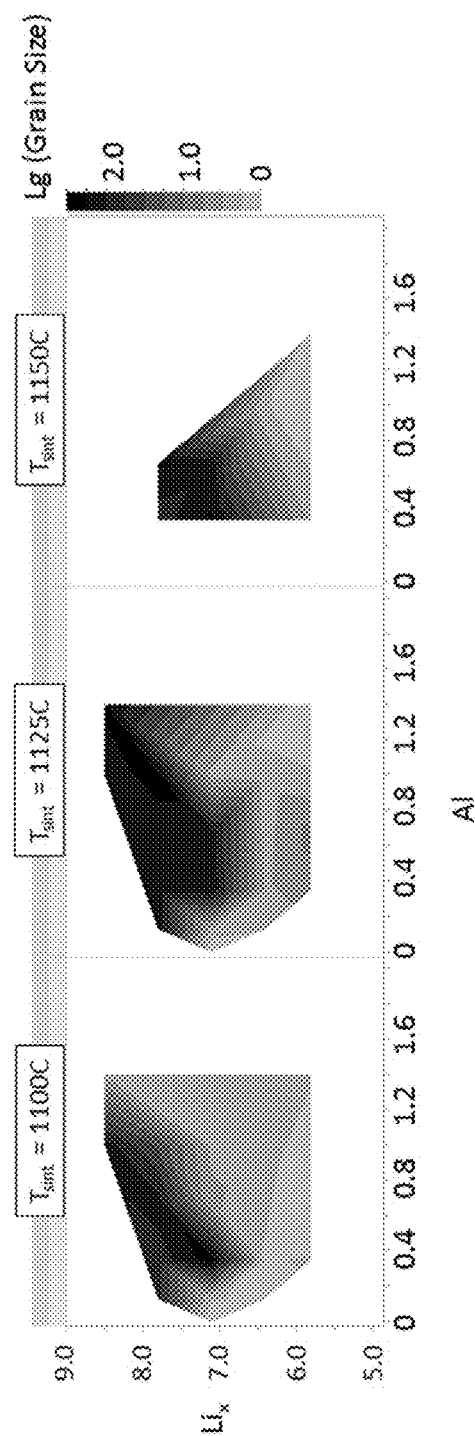
FIG. 7 shows bulk conductivity plots for the sintered films prepared in Example 9 as a function of the Li content in the lithium-stuffed garnet, also as a function of the Al content in the lithium-stuffed garnet, and as a function of the sintering temperature at which the lithium-stuffed garnet film was sintered. The y-axis shows the molar amount of Li in the lithium-stuffed garnet. The x-axis shows the molar amount of Al in the lithium-stuffed garnet. The top portion of each plot indicates the temperature at which the sintered film was sintered.

The conductivity of the thin films was determined, the results of which are set forth in FIG. 7.

FIG. 7 shows $d_{50}$ grain size on the left vertical axis. The molar amount of Li per LLZO is shown on the right vertical axis. The molar amount of Al per LLZO is shown on the y-axis. This plot shows large sintered grains at high Li amounts. The plot shows small sintered grains at high Al amounts. Smaller sintered grains are associated with a higher density since the smaller grains can pack together in a denser fashion than can larger grains.

These results show that at high Al amounts, wherein secondary phase inclusions are present, the thin films here have an improved sinterability property. The thin films herein, which have secondary phase inclusions, can be sintered denser than phase purse LLZO can be sintered.

Example 10: Testing a Lithium-Stuffed Garnet Thin Film

Figure 10:
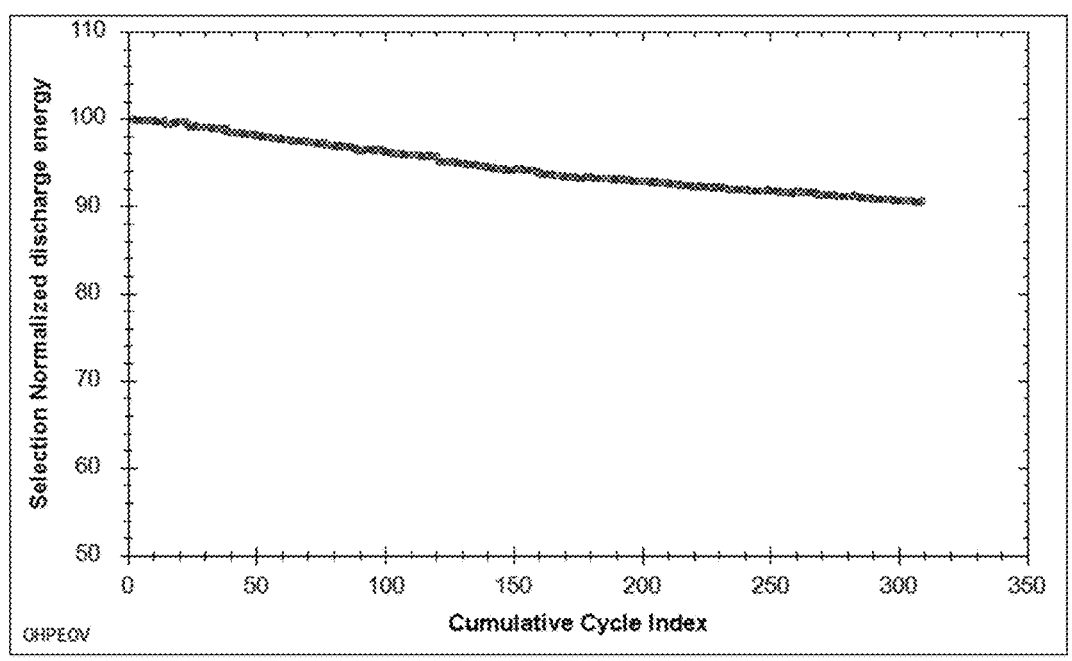
FIG. 10 shows a plot of Normalized Discharge Energy as a function of Cumulative Cycle Index for the electrochemical cell described in Example 10.

A full electrochemical cell was assembled having the sintered thin film of Example 8 as a solid-state electrolyte. The cathode included a nickel manganese cobalt oxide cathode active material. The anode included Li-metal foil. The electrochemical cell was cycled between 2.7-4.5V vs Li, at a C/3 rate, and at 45° C. The results of discharge energy versus cycle count are shown in FIG. 10.

The electrochemical cell included a gel catholyte. The cell was maintained at a pressure of about 20-300 psi. The gel electrolyte included ethylene carbonate:ethyl-methyl-carbonate (EC:EMC) in a 3:7 w/w ratio+1M LiPF6 at 2 w/w FEC.

Example 11: Testing Fracture Strength of a Lithium-Stuffed Garnet Thin Film

In this example, garnet films similar to the one in Example 6-7 was selected for strength measurements.

Figure 11:
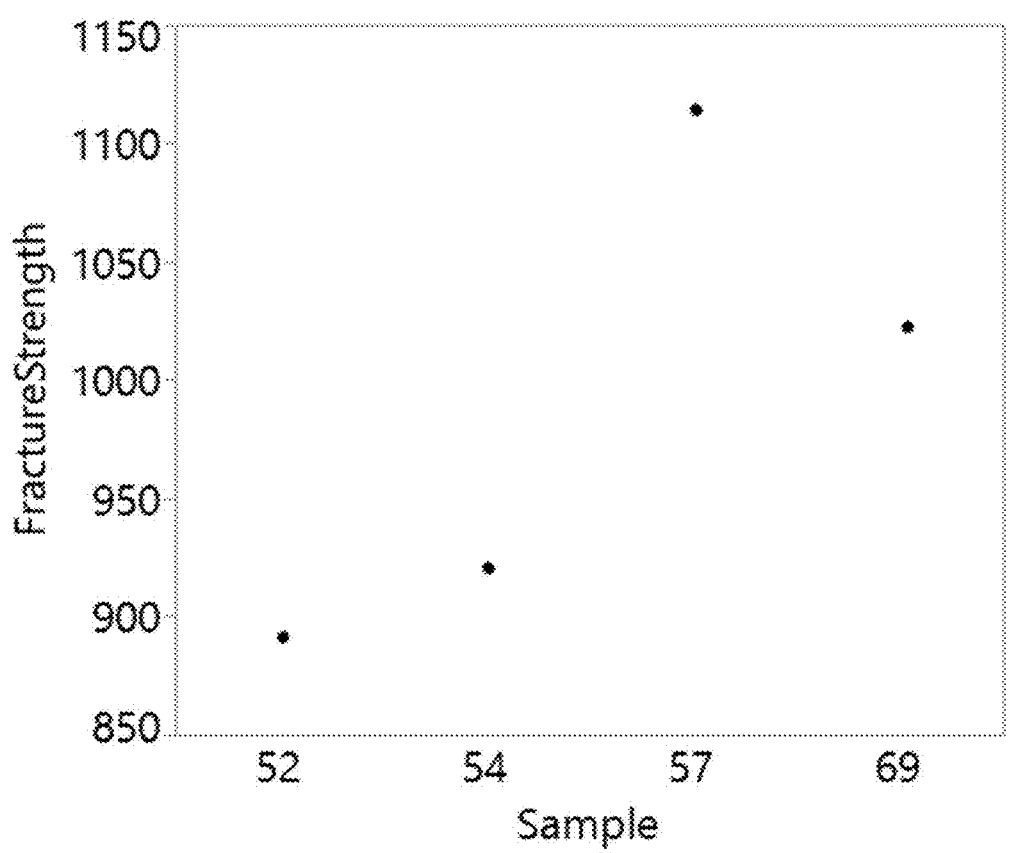
FIG. 11 shows the ring-on-ring flexural strength test results from the experiment Example 11. The y-axis shows fracture strength. The x-axis shows arbitrary sample reference numbers.

A ring-on-ring flexural strength test was performed on the series of sintered thin films. The results of which are shown in FIG. 11. FIG. 11 shows that high RoR strength was been achieved for these samples.

Example 12: Example Showing Quantitative XRD

Phases in sintered thin films were quantified by Quantitative XRD as follows: XRD diffraction patterns were analyzed using a software program called TOPAS developed by Bruker. This software preformed Rietveld refinement by comparing the measured pattern with a calculated pattern based on crystal structure(s) from ICDD PDF-4+ database. Mass fractions were determined using the physical properties of each phase and the peak intensity and crystal parameters from the calculated pattern.

The foregoing description of the embodiments of the disclosure has been presented for the purpose of illustration; it is not intended to be exhaustive or to limit the claims to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A multiphase thin film solid-state electrolyte comprising:
    a primary cubic phase lithium-stuffed garnet characterized by the chemical formula Li$_A$La$_B$Al$_C$M"$_D$Zr$_E$O$_F$, wherein 5<A<8, 1.5<B<4, 0.1<C<2, 0≤D<2; 1<E<3, 10<F<13, and M" is selected from the group consisting of Mo, W, Nb, Y, Ta, Ga, Sb, Ca, Ba, Sr, Ce, Hf, and Rb;
    a secondary phase inclusion in the primary cubic phase lithium-stuffed garnet;
wherein:
    the primary cubic phase lithium-stuffed garnet is present in the multiphase thin film solid-state electrolyte at about 70-95 vol % with respect to the volume of the multiphase thin film electrolyte; and
    the secondary phase inclusion is present in the multiphase thin film solid-state electrolyte at about 30-5 vol % with respect to the volume of the multiphase thin film electrolyte.

2. The multiphase thin film solid-state electrolyte of claim 1, wherein the secondary phase inclusion $d_{50}$ grain size is less than 10 μm.

3. The multiphase thin film solid-state electrolyte of claim 1, wherein the secondary phase inclusion $d_{50}$ grain size is from about 1 μm to about 10 μm.

4. The multiphase thin film solid-state electrolyte of claim 1, wherein the primary cubic phase lithium-stuffed garnet $d_{50}$ grain size is from about 10 μm to about 20 μm.

5. The multiphase thin film solid-state electrolyte of claim 1, wherein the primary cubic phase lithium-stuffed garnet grain size $d_{50}$ is from about 0.5 μm-10 μm.

6. The multiphase thin film solid-state electrolyte of claim 1, wherein the $d_{90}$ grain size of any phase in the multiphase thin film solid-state electrolyte is from about 1 μm to 5 μm.

7. The multiphase thin film solid-state electrolyte of any one of claim 1, wherein the secondary phase inclusions are homogenously distributed over a volume of 10000 μm$^3$ or more.

8. The multiphase thin film solid-state electrolyte of claim 1, wherein the ratio of the secondary phase inclusion $d_{50}$ grain size to the primary cubic phase lithium-stuffed garnet $d_{50}$ grain size is between 0.1 and 10.

9. The multiphase thin film solid-state electrolyte of claim 1, wherein the multiphase thin film solid-state electrolyte has a fracture strength of 200 MPa-2000 MPa as measured a ring-on-ring flexural strength test.

10. The multiphase thin film solid-state electrolyte of claim 1, wherein the thickness of the thin film solid-state electrolyte is between about 0.1 μm to about 200 μm.

11. The multiphase thin film solid-state electrolyte of any one of claim 1, wherein the thin film solid-state electrolyte has an area of at least 25 cm$^2$.

12. The solid electrolyte of any one of claim 1, wherein the secondary phase inclusion is a material selected from the group consisting of:
tetragonal phase garnet; $La_2Zr_2O_7$; $La_2O_3$; $LaAlO_3$; $La_2(Li_{0.5}Al_{0.5})O_4$; $LiLaO_2$; $LiZr_2O_3$;
$Li_aZr_bO_c$, wherein $1 \leq a \leq 8$, $1 \leq b \leq 2$, and $1 \leq c \leq 7$, and wherein subscripts a, b, and c are selected so that $Li_aZr_bO_c$ is charge neutral;
$Li_gAl_hO_i$, wherein $1 \leq g \leq 5$, $1 \leq h \leq 5$, and $2 \leq i \leq 8$, and wherein subscripts g, h, i are selected so that $Li_gAl_hO_i$ is charge neutral;
$La_dTa_eO_f$, wherein $1 \leq d \leq 3$, $1 \leq e \leq 7$, and $4 \leq f \leq 19$, and wherein subscripts d, e, and f are selected so that $La_dTa_eO_f$ is charge neutral;
$Li_rTa_sO_t$, wherein $1 \leq r \leq 2$, $1 \leq s \leq 3$, and $3 \leq t \leq 7$, and wherein subscripts r, s, and t are selected so that $Li_rTa_sO_t$ is charge neutral;
$La_nNb_pO_q$, wherein $1 \leq n \leq 3$, $1 \leq p \leq 7$, and $4 \leq q \leq 19$, and wherein subscripts n, p, and q are selected so that $La_nNb_pO_q$ is charge neutral;
$Li_uNb_vO_x$, wherein $1 \leq u \leq 3$, $1 \leq p \leq 3$, and $3 \leq x \leq 9$, and wherein subscripts u, v, and x are selected so that $Li_uNb_vO_x$ is charge neutral; and
combinations thereof.

13. The multiphase thin film solid-state electrolyte of any one of claim 1, wherein the total amount of secondary phase inclusion is 5, 6, 7, 8, 9, 10, 11, 12, 13, 14, 15, 16, 17, 18, 19, 20, 21, 22, 23, 24, 25, 26, 27, 28, 29, or 30 vol %.

14. The multiphase thin film solid-state electrolyte of claim 1, wherein the secondary phase inclusion comprises $La_2Zr_2O_7$; $LiAlO_2$; $LaAlO_3$; tetragonal garnet; and $Li_2ZrO_3$.

15. The multiphase thin film solid-state electrolyte of claim 1, wherein the secondary phase inclusion in the multiphase thin film solid-state electrolyte comprises $LiAlO_2$ present in the multiphase thin film solid-state electrolyte at about 3-8 vol %, $Li_2ZrO_3$ present in the multiphase thin film solid-state electrolyte at about 1-10 vol % and $LaAlO_3$ present in the multiphase thin film solid-state electrolyte at about 1-8 vol %, as measured by quantitative XRD.

16. The multiphase thin film solid-state electrolyte of claim 1, where the bulk conductivity is greater than $1 \times 10^{-4}$ S/cm at 20° C.

17. The multiphase thin film solid-state electrolyte of claim 1, wherein the interfacial area specific resistance (ASR) of the multiphase thin film solid-state electrolyte with lithium metal is 1-200 Ωcm$^2$ at −15° C.

18. The multiphase thin film solid-state electrolyte of claim 1, where the multiphase thin film solid-state electrolyte has a total porosity of less than 5 vol % as determined by SEM.

19. An electrochemical cell comprising the multiphase thin film solid-state electrolyte according to claim 1.

20. A composition comprising:
a primary cubic phase lithium-stuffed garnet characterized by the chemical formula $Li_ALa_BAl_CM''_DZr_EO_F$,
wherein $5<A<8$, $1.5<B<4$, $0.1<C<2$, $0 \leq D<2$; $1<E<3$, $10<F<13$, and M'' is selected from the group consisting of Mo, W, Nb, Y, Ta, Ga, Sb, Ca, Ba, Sr, Ce, Hf, and Rb;
a secondary phase inclusion in the primary cubic phase lithium-stuffed garnet;
wherein:
the primary cubic phase lithium-stuffed garnet is present at about 70-95 vol % with respect to the volume of the composition; and
the secondary phase inclusion is present at about 30-5 vol % with respect to the volume of the composition.

21. The composition of claim 20, wherein the secondary phase inclusion $d_{50}$ grain size is less than 10 μm.

22. The composition of claim 20, wherein the secondary phase inclusion $d_{50}$ grain size is from about 1 μm to about 10 μm.

23. The composition of claim 20, wherein the primary cubic phase lithium-stuffed garnet $d_{50}$ grain size is smaller than the secondary phase inclusion $d_{50}$ grain size.

24. The composition of claim 20, wherein the primary cubic phase lithium-stuffed garnet $d_{50}$ grain size is from about 10 μm to about 20 μm.

25. The composition of claim 20, wherein the primary cubic phase lithium-stuffed garnet grain size $d_{50}$ is from about 0.5 μm-10 μm.

26. The composition of claim 20, wherein the $d_{90}$ grain size of any phase in the composition is from about 1 μm to 5 μm.

27. The composition of claim 20, wherein the composition is present in a pellet.

28. The solid electrolyte of claim 20, wherein the secondary phase inclusion is a material selected from the group consisting of:
tetragonal phase garnet; $La_2Zr_2O_7$; $La_2O_3$; $LaAlO_3$; $La_2(Li_{0.5}Al_{0.5})O_4$; $LiLaO_2$; $LiZr_2O_3$;
$Li_aZr_bO_c$, wherein $1 \leq a \leq 8$, $1 \leq b \leq 2$, and $1 \leq c \leq 7$, and wherein subscripts a, b, and c are selected so that $Li_aZr_bO_c$ is charge neutral;
$Li_gAl_hO_i$, wherein $1 \leq g \leq 5$, $1 \leq h \leq 5$, and $2 \leq i \leq 8$, and wherein subscripts g, h, i are selected so that $Li_gAl_hO_i$ is charge neutral;
$La_dTa_eO_f$, wherein $1 \leq d \leq 3$, $1 \leq e \leq 7$, and $4 \leq f \leq 19$, and wherein subscripts d, e, and f are selected so that $La_dTa_eO_f$ is charge neutral;
$Li_rTa_sO_t$, wherein $1 \leq r \leq 2$, $1 \leq s \leq 3$, and $3 \leq t \leq 7$, and wherein subscripts r, s, and t are selected so that $Li_rTa_sO_t$ is charge neutral;
$La_nNb_pO_q$, wherein $1 \leq n \leq 3$, $1 \leq p \leq 7$, and $4 \leq q \leq 19$, and wherein subscripts n, p, and q are selected so that $La_nNb_pO_q$ is charge neutral;
$Li_uNb_vO_x$, wherein $1 \leq u \leq 3$, $1 \leq p \leq 3$, and $3 \leq x \leq 9$, and wherein subscripts u, v, and x are selected so that $Li_uNb_vO_x$ is charge neutral; and
combinations thereof.

29. The composition of claim 20, wherein the secondary phase inclusion in the composition comprises $LiAlO_2$ present in the composition at about 0.1-25 vol %, $Li_2ZrO_3$ present in the composition at about 0.1-15 vol % and $LaAlO_3$ present in the composition at about 0.1-15 vol %, as measured by quantitative XRD.

30. The composition of claim 20, where the composition has a total porosity of less than 5 vol % as determined by SEM.

* * * * *

UNITED STATES PATENT AND TRADEMARK OFFICE
CERTIFICATE OF CORRECTION

| | | |
|---|---|---|
| PATENT NO. | : 10,347,937 | Page 1 of 1 |
| APPLICATION NO. | : 15/631884 | |
| DATED | : July 9, 2019 | |
| INVENTOR(S) | : Beck et al. | |

It is certified that error appears in the above-identified patent and that said Letters Patent is hereby corrected as shown below:

On the Title Page

Should Read:
(73) QuantumScape Battery, Inc.

Signed and Sealed this
Twenty-seventh Day of September, 2022

Katherine Kelly Vidal
*Director of the United States Patent and Trademark Office*